(12) United States Patent
Suzuki et al.

(10) Patent No.: US 8,721,484 B2
(45) Date of Patent: May 13, 2014

(54) SPEED REDUCTION MECHANISM, AND MOTOR TORQUE TRANSMISSION DEVICE INCLUDING THE SAME

(71) Applicant: JTEKT Corporation, Osaka (JP)

(72) Inventors: Kunihiko Suzuki, Gamagori (JP); Hiroshi Takuno, Nukata-gun (JP); Keita Nomura, Kariya (JP); Kazutaka Matsukawa, Kariya (JP); Yasushi Kadota, Kitakatsuragi-gun (JP); Takeshi Yamamoto, Izumisano (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/692,130

(22) Filed: Dec. 3, 2012

(65) Prior Publication Data

US 2013/0143707 A1 Jun. 6, 2013

(30) Foreign Application Priority Data

Dec. 5, 2011 (JP) ................................. 2011-265591
Jun. 19, 2012 (JP) ................................. 2012-138084

(51) Int. Cl.
*F16H 1/32* (2006.01)

(52) U.S. Cl.
USPC .......................................... 475/178; 475/179

(58) Field of Classification Search
USPC ................................................. 475/178, 179
See application file for complete search history.

(56) References Cited

U.S. PATENT DOCUMENTS

| | | |
|---|---|---|
| 2,170,951 A | 8/1939 | Perry |
| 4,656,891 A | 4/1987 | Durand |
| 7,794,350 B2 * | 9/2010 | Akiyama et al. ............... 475/178 |
| 2002/0111243 A1 * | 8/2002 | Minegishi et al. ............. 475/178 |
| 2005/0059524 A1 * | 3/2005 | Hori et al. ...................... 475/180 |
| 2011/0259133 A1 | 10/2011 | Kobayashi et al. |
| 2012/0329596 A1 | 12/2012 | Nomura et al. |
| 2012/0329597 A1 | 12/2012 | Nomura et al. |

FOREIGN PATENT DOCUMENTS

| | | |
|---|---|---|
| EP | 2 381 130 A2 | 10/2011 |
| EP | 2 381 130 A3 | 10/2011 |
| JP | 2007-218407 | 8/2007 |

OTHER PUBLICATIONS

Extended European Search Report issued Mar. 22, 2013 in Patent Application No. 12194963.0.
U.S. Appl. No. 13/933,449, filed Jul. 2, 2013, Nomura, et al.
U.S. Appl. No. 13/732,534, filed Jan. 2, 2013, Takuno, et al.
U.S. Appl. No. 13/732,523, filed Jan. 2, 2013, Takuno, et al.

* cited by examiner

*Primary Examiner* — Edwin A Young
(74) *Attorney, Agent, or Firm* — Oblon, Spivak, McClelland, Maier & Neustadt, L.L.P.

(57) ABSTRACT

In a reduction-transmission mechanism, a plurality of output members are arranged at such positions that a size that is the sum of a fitting clearance formed between an outer periphery of each output member and a corresponding one of needle roller bearings, a fitting clearance formed between the needle roller bearing and an inner periphery of an input member, which defines a corresponding one of a plurality of pin insertion holes, and a radial internal clearance in the needle roller bearing is smaller than a size that is the sum of a fitting clearance formed between a ball bearing and an outer periphery of an eccentric portion, a fitting clearance formed between the ball bearing and an inner periphery of the input member, which defines a center hole, and a radial internal clearance in the ball bearing.

20 Claims, 32 Drawing Sheets

SPEED REDUCTION MECHANISM, AND MOTOR TORQUE TRANSMISSION DEVICE INCLUDING THE SAME

INCORPORATION BY REFERENCE

The disclosure of Japanese Patent Applications No. 2011-265591 filed on Dec. 5, 2011 and No. 2012-138084 filed on Jun. 19, 2012 including the specification, drawings and abstract, is incorporated herein by reference in its entirety.

BACKGROUND OF THE INVENTION

1. Field of the Invention

The invention relates to a speed reduction mechanism that is suitably used in, for example, an electric vehicle that has an electric motor as a driving source and a motor torque transmission device that includes the speed reduction mechanism.

2. Description of Related Art

There is a conventional motor torque transmission device that is mounted in an automobile, and that includes an electric motor and a reduction-transmission mechanism (see, for example, Japanese Patent Application Publication No. 2007-218407 (JP 2007-218407 A)). The electric motor generates motor torque. The reduction-transmission mechanism reduces the speed of rotation output from the electric motor and transmits driving force to a differential mechanism.

The electric motor has a motor shaft that is rotated by electric power from an in-vehicle battery. The motor shaft is arranged along the axis of the reduction-transmission mechanism. Eccentric portions are integrally formed on the outer periphery of the motor shaft. The central axis of each eccentric portion is an axis that is offset by a predetermined eccentric amount from the axis of the motor shaft.

The reduction-transmission mechanism has a pair of reduction-transmission units located around its axis and a housing that accommodates the reduction-transmission units. The reduction-transmission mechanism is interposed between the electric motor and the differential mechanism (differential case), and is coupled to the motor shaft and the differential case. One of the reduction-transmission units is coupled to the motor shaft, and the other one of the reduction-transmission units is coupled to the differential case.

With the above configuration, the motor shaft of the electric motor is rotated by electric power from the in-vehicle battery. The motor torque is transmitted from the electric motor to the differential mechanism via the reduction-transmission mechanism. The motor torque is distributed by the differential mechanism to right and left wheels.

The reduction-transmission units of the motor torque transmission device of this type have a pair of disc-shaped revolving members, a plurality of outer pins and a plurality of inner pins. The revolving members make revolving motions in accordance with the rotation of the motor shaft of the electric motor. The outer pins apply rotation force to the revolving members. The inner pins are arranged radially inward of the outer pins, and output the rotation force of the revolving members to the differential mechanism as driving force (torque), and the driving force is transmitted to a rotation member at wheel side.

The revolving members each have a center hole and a plurality of pin insertion holes. The revolving members are rotatably supported by the eccentric portions of the motor shaft via bearings (cam-side bearings). The central axis of each center hole coincides with the axis of a corresponding one of the eccentric portions of the motor shaft. The pin insertion holes are arranged at equal intervals around the central axis of each center hole.

The outer pins are arranged at equal intervals around the axis of the motor shaft, and are fitted to the housing of the reduction-transmission mechanism.

The inner pins are passed through the pin insertion holes of the revolving members. The inner pins are arranged at equal intervals on a circle around the axis of the rotation member at wheel side, and are fitted to the differential case. Bearings (pin-side bearings) are fitted to the inner pins. The bearings are used to reduce contact resistance between the inner pins and the inner peripheries which define the pin insertion holes of the revolving members.

In the motor torque transmission device described in JP 2007-218407 A, a plurality of outer pins needs to be prepared, and further, the outer peripheral portions of the revolving members need to be formed into a complex shape, which is uneconomical.

To avoid such a problem, external gears may be employed as revolving members, an internal gear may be employed as a rotation force applying member that applies rotation force to the revolving members, and the number of teeth of the internal gear may be set larger than the number of teeth of each of the external gears.

However, if a speed reducer formed of the above-described external gears and internal gear is used in a motor torque transmission device for an automobile, the revolving speed of each of the external gears that are the revolving members becomes relatively high. Accordingly, a load due to centrifugal force acts on the cam-side bearings from the revolving members when the torque is output. As a result, it is necessary to use bearings with high durability as the cam-side bearings, resulting in a cost increase. In addition, because a load due to centrifugal force acts on the cam-side bearings, the service life of each of the cam-side bearings is shortened.

SUMMARY OF THE INVENTION

It is an object of the invention to provide a speed reduction mechanism with which cost is reduced and the service life of bearings is extended, and a motor torque transmission device that includes the speed reduction mechanism.

An aspect of the invention relates to a speed reduction mechanism, including: a rotary shaft that rotates about a first axis and that has an eccentric portion of which a central axis is a second axis that is offset from the first axis; an input member that is arranged radially outward of the rotary shaft, that has a center hole of which a central axis is a third axis and a plurality of through-holes arranged at equal intervals around the third axis, and that is formed of an external gear provided with a first bearing interposed between an inner periphery of the input member, which defines the center hole, and an outer periphery of the eccentric portion; a rotation force applying member that is in mesh with the input member and that is formed of an internal gear having teeth the number of which is larger than the number of teeth of the external gear; and a plurality of output members that receive rotation force applied to the input member by the rotation force applying member, that output the rotation force to an output target as torque of the output target, and that are passed through the respective through-holes with second bearings provided radially outward of the respective output members. The output members are arranged at such positions that a size S' that is a sum of a fitting clearance formed between an outer periphery of each of the output members and a corresponding one of the second bearings, a fitting clearance formed between the second bearing and an inner periphery of the input member, which defines a corresponding one of the through-holes, and a radial internal clearance in the second bearing is smaller than a size S that is a sum of a fitting clearance formed between the first bearing and the outer periphery of the eccentric portion, a fitting clearance formed between the first bearing and the inner periphery of the input member, which defines the center hole, and a radial internal clearance in the first bearing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6A and FIG. 6B are simplified sectional views showing states of operations of each input member of the speed reduction mechanism with respect to the output members of the speed reduction mechanism in the motor torque transmission device according to the first embodiment of the invention, wherein FIG. 6A shows an initial position of each input member, and FIG. 6B shows a moved position of each input member;

FIG. 7A and FIG. 7B are simplified sectional views showing states of operations of an outer ring of each second bearing of the speed reduction mechanism with respect to a corresponding one of the output members of the speed reduction mechanism in the motor torque transmission device according to the first embodiment of the invention, wherein FIG. 7A shows an initial position of the outer ring, and FIG. 7B shows a moved position of the outer ring;

FIG. 8A and FIG. 8B are simplified sectional views showing states of operations of each input member of the speed reduction mechanism with respect to a corresponding one of the eccentric portions of the speed reduction mechanism in the motor torque transmission device according to the first embodiment of the invention, wherein FIG. 8A shows an initial position of each input member, and FIG. 8B shows a moved position of each input member;

FIG. 21A and FIG. 21B are simplified sectional views showing states of operations of each input member of the speed reduction mechanism with respect to the output members of the speed reduction mechanism in the motor torque transmission device according to the fifth embodiment of the invention, wherein FIG. 21A shows an initial position of each input member, and FIG. 21B shows a moved position of each input member;

FIG. 22A and FIG. 22B are simplified sectional views showing states of operations of an outer ring of each second bearing of the speed reduction mechanism with respect to a corresponding one of the output members of the speed reduction mechanism in the motor torque transmission device according to the fifth embodiment of the invention, wherein FIG. 22A is an initial position of the outer ring, and FIG. 22B shows a moved position of the outer ring;

FIG. 23A and FIG. 23B are simplified sectional views showing states of operations of each input member of the speed reduction mechanism with respect to a corresponding one of the eccentric portions of the speed reduction mechanism in the motor torque transmission device according to the fifth embodiment of the invention, wherein FIG. 23A shows an initial position of each input member, and FIG. 23B shows a moved position of each input member;

DETAILED DESCRIPTION OF EMBODIMENTS

Hereinafter, a motor torque transmission device according to a first embodiment of the invention will be described in detail with reference to the accompanying drawings.

Figure 1:
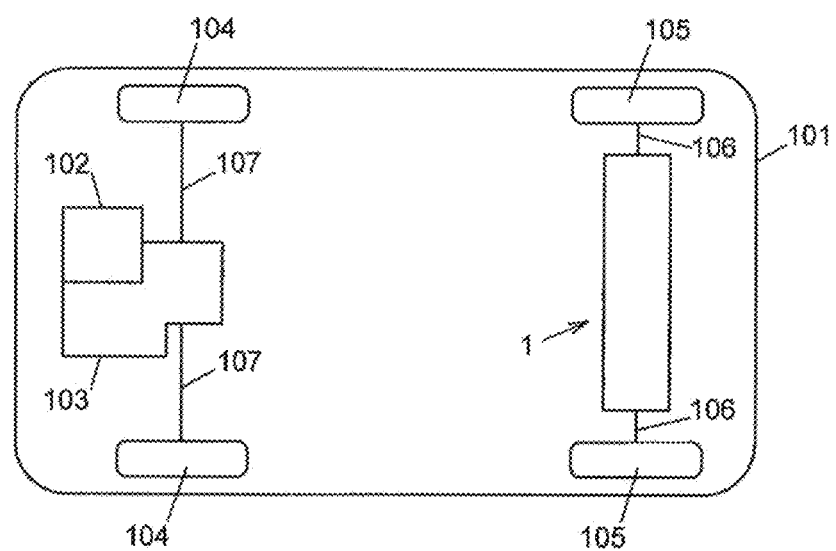
FIG. 1 is a schematic plan view for illustrating a vehicle in which a motor torque transmission device according to a first embodiment of the invention is mounted.

FIG. 1 schematically shows a four-wheel drive vehicle 101. As shown in FIG. 1, the four-wheel drive vehicle 101 includes a front wheel power system and a rear wheel power system, and includes a motor torque transmission device 1, an engine 102, a transaxle 103, a pair of front wheels 104 and a pair of rear wheels 105. The front wheel power system uses the engine as a driving source. The rear wheel power system uses an electric motor 4 (described later) as a driving source.

The motor torque transmission device 1 is arranged in the rear wheel power system of the four-wheel drive vehicle 101, and is supported by a vehicle body (not shown) of the four-wheel drive vehicle 101.

The motor torque transmission device 1 is configured to transmit driving force based on the motor torque of the electric motor 4 to the rear wheels 105. Thus, the motor torque of the electric motor 4 is output to rear axle shafts 106 via a reduction-transmission mechanism 5 and a rear differential 3 (both will be described later) to drive the rear wheels 105. The details of the motor torque transmission device 1, and the like, will be described later.

The engine 102 is arranged in the front wheel power system of the four-wheel drive vehicle 101. Thus, the driving force of the engine 102 is output to front axle shafts 107 via the transaxle 103 to drive the front wheels 104.

Figure 2:
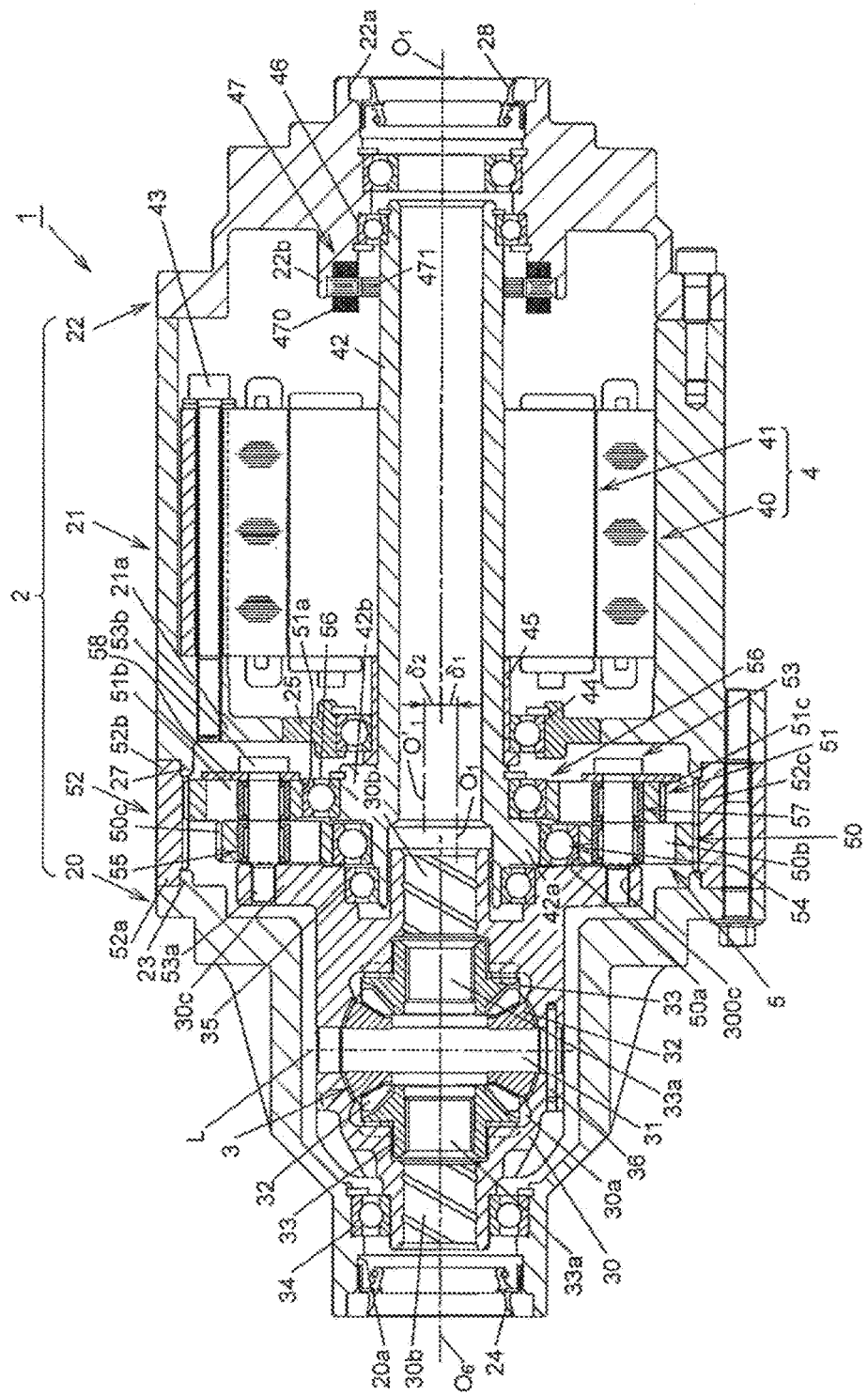
FIG. 2 is a sectional view for illustrating the motor torque transmission device according to the first embodiment of the invention.

FIG. 2 is an overall view of the motor torque transmission device. As shown in FIG. 2, the motor torque transmission device 1 is formed mainly of a housing 2, the rear differential 3, the electric motor 4 and the reduction-transmission mechanism 5. The central axis of the housing 2 is an axis (a rotation axis $O_1$ that may function as a first axis) of each rear axle shaft 106 (shown in FIG. 1). The rear differential 3 distributes driving force to the rear wheels 105 (shown in FIG. 1). The electric motor 4 generates motor torque to actuate the rear differential 3. The reduction-transmission mechanism 5 reduces the speed of rotation output from the electric motor 4 and transmits driving force to the rear differential 3.

The housing 2 has a rotation force applying member 52 (described later), a first housing element 20, a second housing element 21 and a third housing element 22. The housing 2 is arranged on the vehicle body. The first housing element 20 accommodates the rear differential 3. The second housing element 21 accommodates the electric motor 4. The third housing element 22 closes a first opening portion of the second housing element 21 (an opening portion on the opposite side of the second housing element 21 from a first housing element 20-side opening portion (second opening portion)).

The first housing element 20 is arranged at a second side (left side in FIG. 2) of the housing 2. The entirety of the first housing element 20 is formed of a stepped closed-end cylindrical member that is open toward the second housing element 21. The bottom of the first housing element 20 has a shaft insertion hole 20a through which one of the rear axle shafts 106 (shown in FIG. 1) is passed. An annular protrusion 23 that protrudes toward the second housing element 21 is formed integrally on the open end face of the first housing element 20. The outer periphery of the protrusion 23 has an outside diameter smaller than the maximum outside diameter of the first housing element 20, and is formed of a cylindrical surface of which the central axis coincides with the rotation axis $O_1$. A seal member 24 is interposed between the inner periphery of the first housing element 20 and the outer periphery of the rear axle shaft 106. The seal member 24 seals the shaft insertion hole 20a.

The second housing element 21 is arranged at the middle of the housing 2 in the axial direction. The entirety of the second housing element 21 is formed of an open-end cylindrical member that is open toward both sides in the direction of the rotation axis $O_1$. A stepped inward flange 21a, which is interposed between the electric motor 4 and the reduction-transmission mechanism 5, is formed integrally with the second opening portion of the second housing element 21 (the opening portion on the first housing element 20-side). An annular member 25, to which a race is fitted, is fitted to the inner periphery of the inward flange 21a. An annular protrusion 27, which protrudes toward the first housing element 20, is formed integrally on the second open end face of the second housing element 21 (the open end face on the first housing element 20-side). The outer periphery of the protrusion 27 has an outside diameter smaller than the maximum outside diameter of the second housing element 21. The protrusion 27 has substantially the same outside diameter as the outside diameter of the protrusion 23. The outer periphery of the protrusion 27 is formed of a cylindrical surface of which the central axis coincides with the rotation axis $O_1$.

The third housing element 22 is arranged at the first side (right side in FIG. 2) of the housing 2. The entirety of the third housing element 22 is formed of a stepped closed-end cylindrical member that is open toward the second housing element 21. The bottom of the third housing element 22 has a shaft insertion hole 22a through which the other one of the rear axle shafts 106 is passed. A cylindrical portion 22b, which protrudes toward the electric motor 4 and to which a stator is fitted, is formed integrally with the third housing element 22 so as to surround the inner opening of the shaft insertion hole 22a. A seal member 28 that seals the shaft insertion hole 22a is interposed between the inner periphery of the third housing element 22 and the outer periphery of the rear axle shaft 106.

The rear differential 3 is formed of a differential case 30, a pinion gear shaft 31 and a bevel gear differential mechanism. The differential case 30 is an example of an output target (member to which the rotation force is output). The differential mechanism is of a bevel gear mechanism, and includes a pair of pinion gears 32 and a pair of side gears 33. The rear differential 3 is arranged at the second side of the motor torque transmission device 1.

With this configuration, the torque of the differential case 30 is distributed from the pinion gear shaft 31 to the side gears 33 via the pinion gears 32. The torque of the differential case 30 is further transmitted from the side gears 33 to the right and left rear wheels 105 (shown in FIG. 1) via the rear axle shafts 106 (shown in FIG. 1).

When there arises a difference in driving resistance between the right and left rear wheels 105, the torque of the differential case 30 is differentially distributed to the right and left rear wheels 105 by the rotations of the pinion gears 32.

The differential case 30 is arranged on a rotation axis (sixth axis) $O_6$. The differential case 30 is rotatably supported by the first housing element 20 via a ball bearing 34, and is rotatably supported by a motor shaft (rotary shaft) 42 of the electric motor 4 via a ball bearing 35. The differential case 30 is configured to rotate about the rotation axis $O_6$ upon reception of driving force based on the motor torque of the electric motor 4 from the reduction-transmission mechanism 5.

The differential case 30 has an accommodation space 30a and a pair of shaft insertion holes 30b. A differential mechanism unit (the pinion gear shaft 31, the pinion gears 32 and the side gears 33) is accommodated in the accommodation space 30a. The shaft insertion holes 30b communicate with the accommodation space 30a, and the right and left rear axle shafts 106 are passed through the shaft insertion holes 30b.

An annular flange 30c that faces the reduction-transmission mechanism 5 is formed integrally with the differential case 30. The flange 30c has a plurality of (six in the present embodiment) pin fitting holes 300c that are arranged at equal intervals around the rotation axis $O_6$.

The pinion gear shaft 31 is arranged along an axis L that is perpendicular to the rotation axis $O_6$ in the accommodation space 30a of the differential case 30. The rotation of the pinion gear shaft 31 about the axis L and the movement of the pinion gear shaft 31 in the direction of the axis L are restricted by a pin 36.

The pinion gears 32 are rotatably supported by the pinion gear shaft 31, and are accommodated in the accommodation space 30a of the differential case 30.

The side gears 33 each have a shaft coupling hole 33a. The side gears 33 are accommodated in the accommodation space 30a of the differential case 30. Each of the shaft coupling holes 33a is coupled to a corresponding one of the right and left rear axle shafts 106 (shown in FIG. 1) by spline fitting. The side gears 33 are configured such that the gear axes are perpendicular to the gear axes of the pinion gears 32 and the side gears 33 are in mesh with the pinion gears 32.

The electric motor 4 includes a stator 40, a rotor 41 and the motor shaft 42. The electric motor 4 is coupled to the rear differential 3 via the reduction-transmission mechanism 5 on the rotation axis $O_1$. The stator 40 of the electric motor 4 is connected to an electronic control unit (ECU) (not shown). The electric motor 4 is configured such that the stator 40 receives a control signal from the ECU, motor torque for driving the rear differential 3 is generated with the use to the stator 40 and the rotor 41, and the rotor 41 is rotated together with the motor shaft 42.

The stator 40 is arranged at the outer peripheral side of the electric motor 4, and is fitted to the inward flange 21a of the second housing element 21 with a fitting bolt 43.

The rotor 41 is arranged at the inner peripheral side of the electric motor 4, and is fitted to the outer periphery of the motor shaft 42.

The motor shaft 42 is arranged on the rotation axis $O_1$. In addition, the second end portion of the motor shaft 42 is rotatably supported by the inner periphery of the annular member 25 via a ball bearing 44 and a sleeve 45, and the first end portion of the motor shaft 42 is rotatably supported by the inner periphery of the third housing element 22 via a ball bearing 46. The entirety of the motor shaft 42 is formed of a cylindrical shaft member through which the rear axle shafts 106 (shown in FIG. 1) are passed.

An eccentric portion 42a and an eccentric portion 42b, both of which are circular in planar view, are formed integrally with the second end portion of the motor shaft 42. The central axis of the eccentric portion 42a is an axis $O_2$ (second axis) that is offset from the rotation axis $O_1$ of the motor shaft 42 by an eccentric amount $\delta_1$. The central axis of the eccentric portion 42b is an axis $O'_2$ that is offset from the rotation axis $O_1$ by an eccentric amount $\delta_2$ ($\delta_1=\delta_2=\delta$). The eccentric portion 42a and the eccentric portion 42b are arranged so as to be next to each other along the rotation axis $O_1$ and apart from each other in the circumferential direction around the rotation axis $O_1$ at equal intervals (180°). That is, the eccentric portion 42a and the eccentric portion 42b are arranged on the outer periphery of the motor shaft 42 such that the distance from the axis $O_2$ to the rotation axis $O_1$ and the distance from the axis O'$_2$ to the rotation axis O are equal to each other and the distance between the axis O$_2$ and the axis O'$_2$ in one of the circumferential directions around the rotation axis O$_1$ and the distance between the axis O$_2$ and the axis O'$_2$ in the other circumferential direction around the rotation axis O are equal to each other.

A resolver 47 is arranged at the first end portion of the motor shaft 42. The resolver 47 serves as a rotation angle detector, and is interposed between the outer periphery of the motor shaft 42 and the inner periphery of the cylindrical portion 22b. The resolver 47 has a stator 470 and a rotor 471, and is accommodated inside the third housing element 22. The stator 470 is fitted to the inner periphery of the cylindrical portion 22b. The rotor 471 is fitted to the outer periphery of the motor shaft 42.

Figure 3:
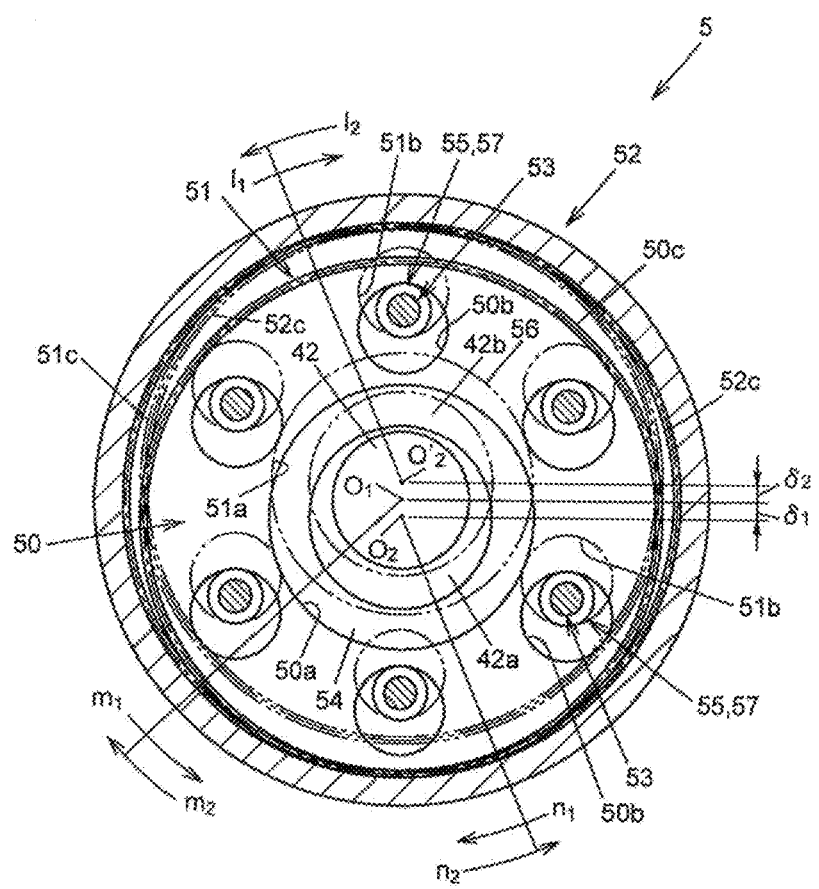
FIG. 3 is a schematic sectional view for illustrating a speed reduction mechanism of the motor torque transmission device according to the first embodiment of the invention.
Figure 4:
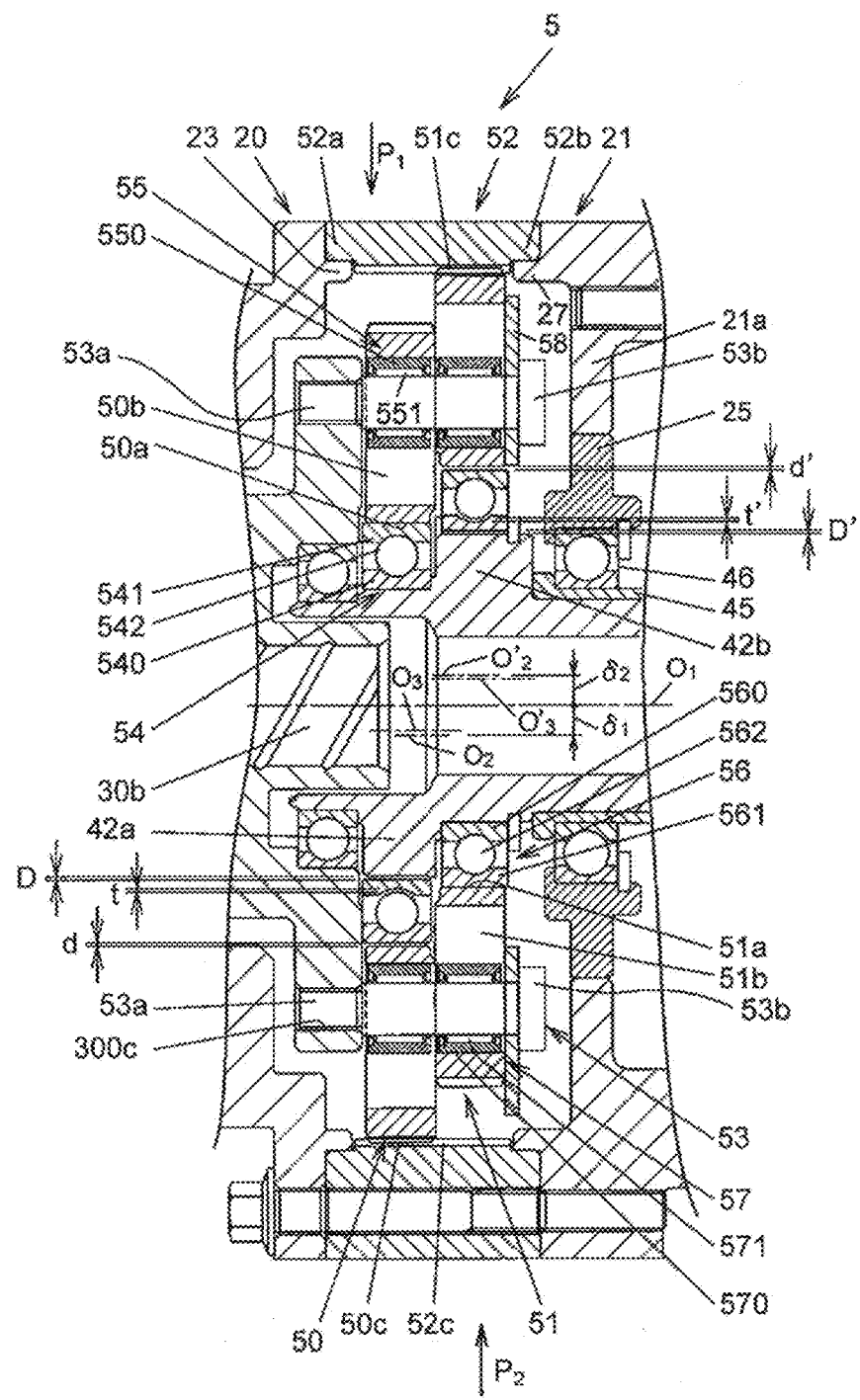
FIG. 4 is a schematic sectional view for illustrating main portions of the speed reduction mechanism in the motor torque transmission device according to the first embodiment of the invention.

FIG. 3 and FIG. 4 show the reduction-transmission mechanism. FIG. 5A and FIG. 5B show a state where input members are supported and a state where second bearings are fitted. As shown in FIG. 3 and FIG. 4, the reduction-transmission mechanism 5 has a pair of input members 50, 51, the rotation force applying member 52 and a plurality of (six in the present embodiment) output members 53. The reduction-transmission mechanism 5 is interposed between the rear differential 3 and the electric motor 4 (both are shown in FIG. 2). As described above, the reduction-transmission mechanism 5 is configured to reduce the speed of rotation output from the electric motor 4 and then transmit the driving force to the rear differential 3.

As shown in FIG. 4, the input member 50 is formed of an external gear that has a center hole 50a of which the central axis coincides with an axis (third axis) O$_3$. The input member 50 is arranged so as to be closer to the rear differential 3 (shown in FIG. 3) than the input member 51. In addition, the input member 50 is rotatably supported by the motor shaft 42 via a ball bearing 54. The ball bearing 54 may function as a first bearing, and is interposed between the inner periphery of the input member 50, which defines the center hole 50a, and the eccentric portion 42a. The input member 50 is configured to make circular motion (revolving motion about the rotation axis O$_1$) in the directions of the arrows m$_1$, m$_2$ (shown in FIG. 3) with the eccentric amount δ, upon reception of motor torque from the electric motor 4. The ball bearing 54 includes two races (an inner ring 540 and an outer ring 541) and rolling elements 542. The inner ring 540 is arranged radially inward of the outer ring 541. The rolling elements 542 roll between the inner ring 540 and the outer ring 541. The inner ring 540 is fitted to the eccentric portion 42a with a clearance (gap) in the radial direction of the motor shaft 42. The outer ring 541 is fitted to the inner periphery of the input member 50, which defines the center hole 50a, with a clearance (gap) in the radial direction of the motor shaft 42. That is, the inner ring 540 is fitted to the outer periphery of the eccentric portion 42a by clearance fit, and the outer ring 541 is fitted to the inner periphery of the input member 50, which defines the center hole 50a, by clearance fit. Note that FIG. 4 shows a state where a centrifugal force P$_1$ acts on the input member 50, the inner ring 540, the outer ring 541 and the rolling elements 542.

The input member 50 has a plurality of (six in the present embodiment) pin insertion holes (through-holes) 50b that are arranged at equal intervals around the axis O$_3$. The hole diameter of each pin insertion hole 50b is set to a size that is larger than a size obtained by adding the outside diameter of a needle roller bearing 55, which may function as a second bearing, to the outside diameter of each output member 53. The outside diameter of each needle roller bearing 55 is set to a value that is smaller than the outside diameter of the ball bearing 54. External teeth 50c having an involute tooth profile are formed on the outer periphery of the input member 50.

The external teeth 50c are configured such that both tooth flanks (both tooth flanks in the circumferential direction of the input member 50) of each external tooth 50c function as a revolving force applying face and a rotation force receiving face with respect to both tooth flanks (both tooth flanks in the circumferential direction of the rotation force applying member 52) of each internal tooth 52c of the rotation force applying member 52. The number Z$_1$ of the external teeth 50c is set to 195 (Z$_1$=195), for example.

As shown in FIG. 4, the input member 51 is formed of an external gear that has a center hole 51a of which the central axis coincides with the axis (third axis) O'$_3$. The input member 51 is arranged so as to be closer to the electric motor 4 (shown in FIG. 2) than the input member 50. In addition, the input member 51 is rotatably supported by the motor shaft 42 via a ball bearing 56. The ball bearing 56 may function as a first bearing, and arranged between the inner periphery of the input member 51, which defines the center hole 51a, and the eccentric portion 42b. The input member 51 is configured to make circular motion (revolving motion about the rotation axis O$_1$) in the directions of the arrows m$_1$, m$_2$ (shown in FIG. 3) with the eccentric amount δ, upon reception of motor torque from the electric motor 4. The ball bearing 56 includes two races (an inner ring 560 and an outer ring 561) and rolling elements 562. The inner ring 560 is arranged radially inward of the outer ring 561. The rolling elements 562 roll between the inner ring 560 and the outer ring 561. The inner ring 560 is fitted to the eccentric portion 42b with a clearance (gap) in the radial direction of the motor shaft 42. The outer ring 561 is fitted to the inner periphery of the input member 51, which defines the center hole 51a, with a clearance (gap) in the radial direction of the motor shaft 42. That is, the inner ring 560 is fitted to the outer periphery of the eccentric portion 42b by clearance fit, and the outer ring 561 is fitted to the inner periphery of the input member 51, which defines the center hole 51a, by clearance fit. Note that FIG. 4 shows a state where a centrifugal force P$_2$ acts on the input member 51, the inner ring 560, the outer ring 561 and the rolling elements 562.

The input member 51 has a plurality of (six in the present embodiment) pin insertion holes (through-holes) 51b that are arranged at equal intervals around the axis O'$_3$. The hole diameter of each pin insertion hole 51b is set to a size that is larger than a size obtained by adding the outside diameter of a needle roller bearing 57, which may function as a second bearing, to the outside diameter of each output member 53. The outside diameter of each needle roller bearing 57 is set to a size that is smaller than the outside diameter of the ball bearing 56. External teeth 51c having an involute tooth profile are formed on the outer periphery of the input member 51.

The external teeth 51c are configured such that both tooth flanks (both tooth flanks in the circumferential direction of the input member 51) of each external tooth 51c function as a revolving force applying face and a rotation force receiving face with respect to both tooth flanks (both tooth flanks in the circumferential direction of the rotation force applying member 52) of each internal tooth 52c of the rotation force applying member 52. The number Z$_2$ (Z$_2$=Z$_1$) of the external teeth 51c is set to 195, for example.

The rotation force applying member 52 is formed of an internal gear of which the central axis coincides with the rotation axis O$_1$. The rotation force applying member 52 is interposed between the first housing element 20 and the second housing element 21. The entirety of the rotation force applying member 52 is formed of an open-end cylindrical member that constitutes part of the housing 2 and that is open toward both sides in the direction of the rotation axis $O_1$. The rotation force applying member 52 is in mesh with the input members 50, 51. The rotation force applying member 52 is configured to apply rotation force in the directions of the arrows $n_1$, $n_2$ to the input member 50 that makes revolving motion upon reception of motor torque from the electric motor 4, and to apply rotation force in the directions of the arrows $l_1$, $l_2$ to the input member 51 that makes revolving motion upon reception of motor torque from the electric motor 4.

The inner periphery of the rotation force applying member 52 has a first fitting portion 52a and a second fitting portion 52b that are located at a predetermined distance in the direction of the rotation axis $O_1$. The first fitting portion 52a is fitted to the outer periphery of the protrusion 23. The second fitting portion 52b is fitted to the outer periphery of the protrusion 27. In addition, the inner periphery of the rotation force applying member 52 has internal teeth 52c having an involute tooth profile. The internal teeth 52c are located between the first fitting portion 52a and the second fitting portion 52b, and are in mesh with the external teeth 50c of the input member 50 and the external teeth 51c of the input member 51. The number $Z_3$ of the internal teeth 52c is set to 208 ($Z_3$=208), for example. Thus, the reduction gear ratio $\alpha$ of the reduction-transmission mechanism 5 is calculated according to an equation, $\alpha = Z_2/(Z_3-Z_2)$.

Figure 6A:
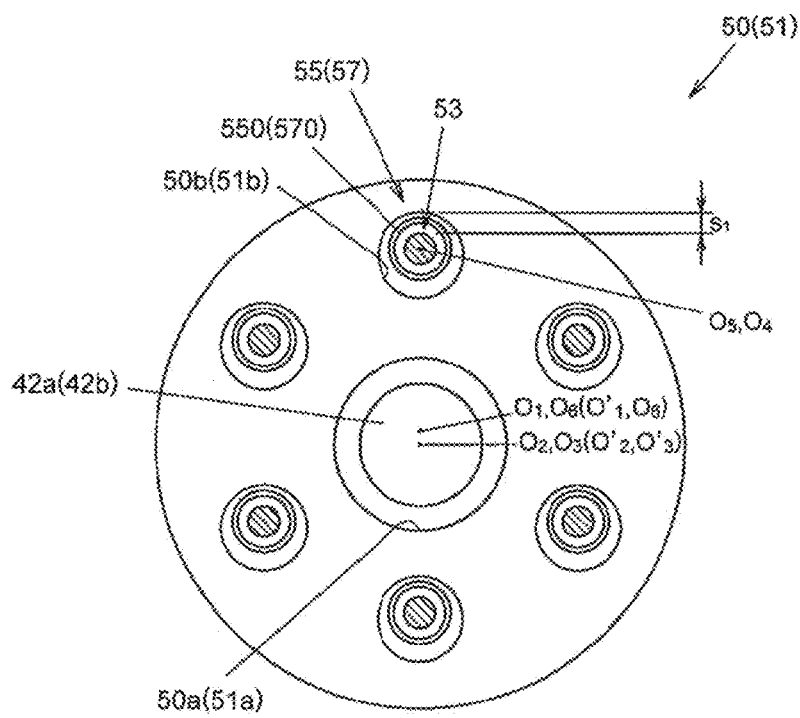
Figure 6B:
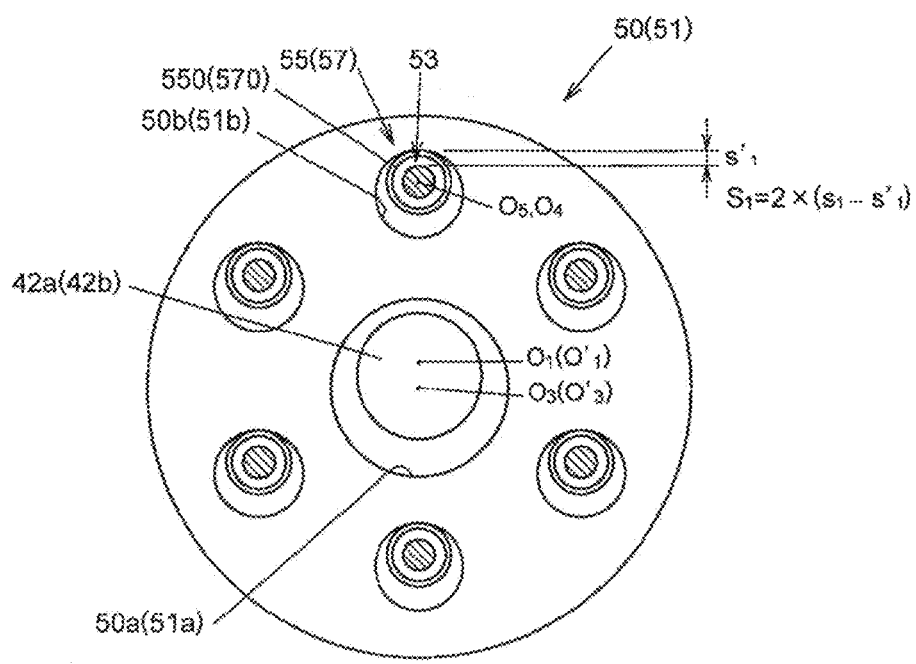
Figure 7A:
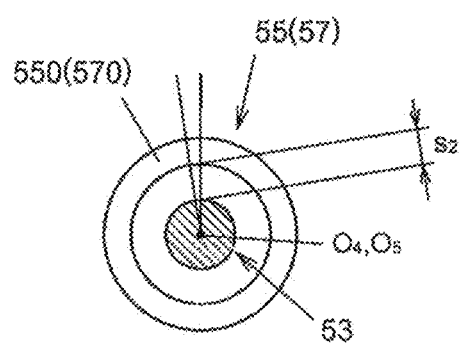
Figure 7B:
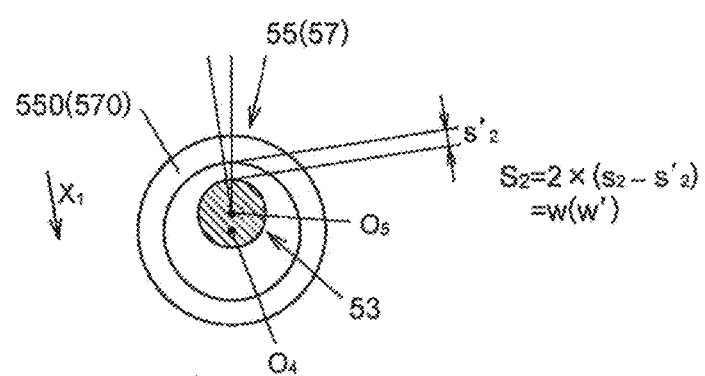
Figure 8A:
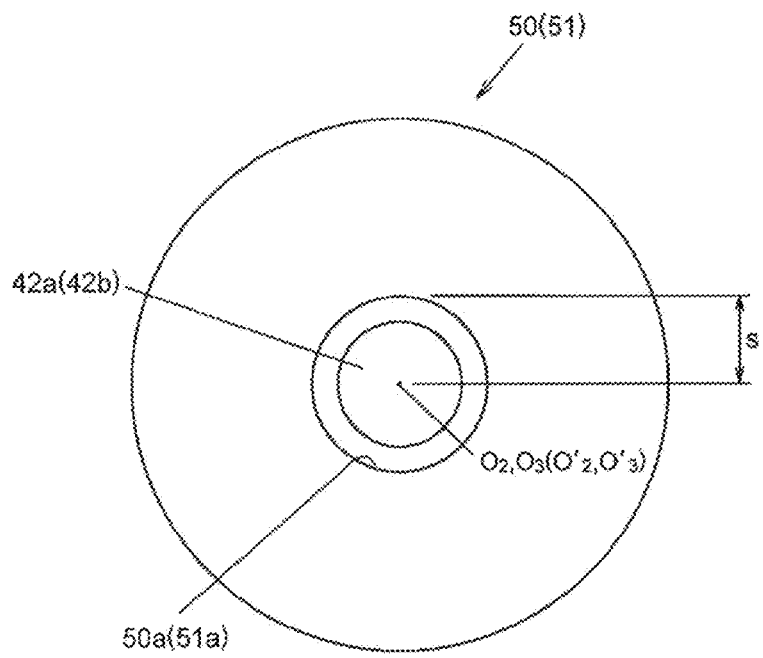
Figure 8B:
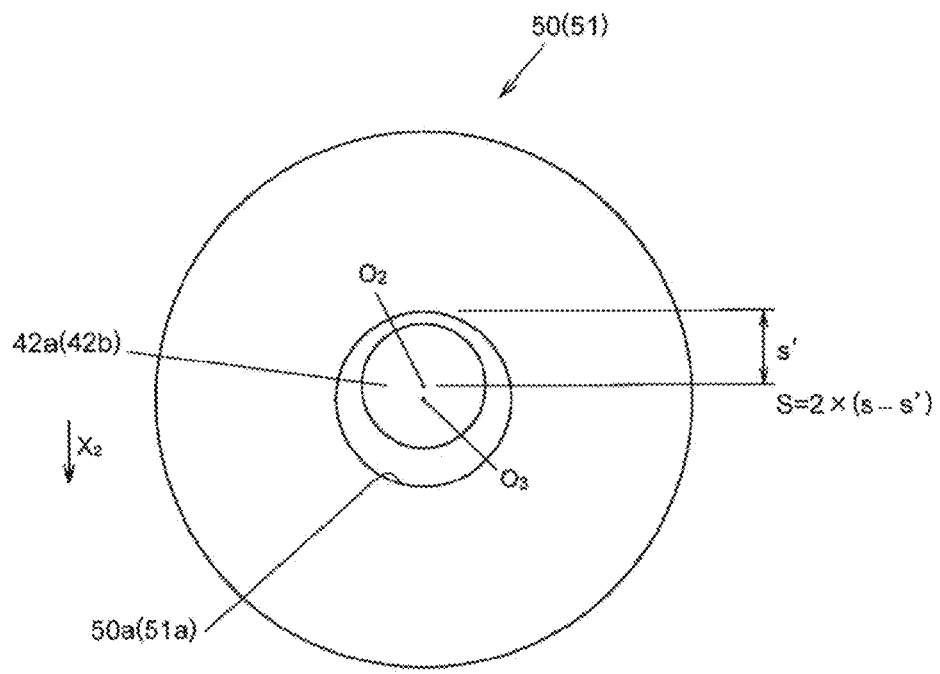

FIG. 6A and FIG. 6B show a fitting clearance of each second bearing. FIG. 7A and FIG. 7B show an operating clearance of a radial internal clearance in each second bearing. FIG. 8A and FIG. 8B show a fitting clearance of each first bearing and an operating clearance of a radial internal clearance in each first bearing. As shown in FIG. 2 and FIG. 6 to FIG. 8, the output members 53 are bolts each having a threaded portion 53a at one end and a head 53b at the other end. The threaded portions 53a of the output members 53 are passed through the pin insertion holes 50b of the input member 50 and the pin insertion holes 51b of the input member 51 and then fitted in the pin fitting holes 300c of the differential case 30.

In addition, the output members 53 are arranged so as to be passed through an annular spacer 58 that is interposed between each head 53b and the input member 51. The output members 53 each are arranged at such a position that a size S' (not shown) that is the sum of fitting clearances $S_0$ (in the present embodiment, $S_0$=0), $S_1$ of each of the needle roller bearings 55, 57 with respect to the corresponding one of the input members 50, 51 and a radial internal clearance $S_2$ ($S_2$=w: operating clearance) is smaller than a size S that is the sum of fitting clearances $S_3$, $S_4$ (both are not shown) of each of the ball bearings 54, 56 with respect to the corresponding one of the input members 50, 51 and a radial internal clearance $S_5$ ($S_5$=t: operating clearance) ($S=S_3+S_4+S_5>S_0+S_1+S_2$=S'). With this configuration, when the input members 50, 51 move in the directions of the centrifugal forces $P_1$, $P_2$ upon reception of loads due to the centrifugal forces $P_1$, $P_2$ that are generated on the basis of the circular motions of the input members 50, 51, the inner peripheries of the input members 50, 51, which define the pin insertion holes 50b, 51b, contact the outer peripheries of the output members 53 via the needle roller bearings 55, 57 before the inner peripheries of the input members 50, 51, which define the center holes 50a, 51a, contact the outer peripheries of the eccentric portions 42a, 42b via the ball bearings 54, 56, respectively.

The fitting clearance $S_1$ is formed between the outer periphery of an outer ring 550 of each needle roller bearing 55 and the inner periphery of the input member 50, which defines a corresponding one of the pin insertion holes 50b. The fitting clearance $S_1$ is formed between the outer periphery of an outer ring 570 of each needle roller bearing 57 and the inner periphery of the input member 51, which defines a corresponding one of the pin insertion holes 51b.

The fitting clearance $S_3$ is formed between the inner periphery of the input member 50, which defines the center hole 50a, and the outer periphery of the outer ring 541 of the ball bearing 54. The fitting clearance $S_3$ is also formed between the inner periphery of the input member 51, which defines the center hole 51a, and the outer periphery of the outer ring 561 of the ball bearing 56.

The fitting clearance $S_4$ is formed between the inner periphery of the inner ring 540 of the ball bearing 54 and the outer periphery of the eccentric portion 42a. The fitting clearance $S_4$ is also formed between the inner periphery of the inner ring 560 of the ball bearing 56 and the outer periphery of the eccentric portion 42b.

The output members 53 are configured to receive rotation force, applied by the rotation force applying member 52, from the input members 50, 51, and then output the rotation force to the differential case 30 as the torque of the differential case 30.

The needle roller bearing 55 is fitted to the outer periphery of each output member 53 at a portion between the threaded portion 53a and the head 53b. The needle roller bearing 55 is used to reduce contact resistance between each output member 53 and the inner periphery of the input member 50, which defines the corresponding pin insertion hole 50b. In addition, the needle roller bearing 57 is fitted to the outer periphery of each output member 53 at a portion between the threaded portion 53a and the head 53b. The needle roller bearing 57 is used to reduce contact resistance between each output member 53 and the inner periphery of the input member 51, which defines the corresponding pin insertion hole 51b.

The needle roller bearings 55 each have an inner ring raceway surface on the outer periphery of a corresponding one of the output members 53, and each have the race (outer ring) 550 and needle rollers 551. The race 550 is able to contact the inner periphery of the input member 50, which defines a corresponding one of the pin insertion holes 50b. The needle rollers 551 roll between the inner periphery of the race 550 and the inner ring raceway surface of a corresponding one of the output members 53. The needle roller bearings 57 each have an inner ring raceway surface on the outer periphery of a corresponding one of the output members 53, and each have the race (outer ring) 570 and needle rollers 571. The race 570 is able to contact the inner periphery of the input member 51, which defines a corresponding one of the pin insertion holes 51b. The needle rollers 571 roll between the inner periphery of the race 570 and the inner ring raceway surface of a corresponding one of the output members 53.

The fitting clearance $S_0+S_1$ (in the present embodiment, because $S_0$=0, $S_0+S_1=S_1$), the internal clearance $S_2$ of each second bearing (needle roller bearing 55, 57) and the size S ($S=S_3+S_4+S_5$) will be described separately for the input member 50 and the input member 51.

On the input member 50 side, as shown in FIG. 6A and FIG. 6B, the fitting clearance $S_1$ is set to a size ($S_1=2\times(s_1-s'_1)$) that is obtained by doubling a distance from an initial position (position shown in FIG. 6A) of each output member 53 to a position (position shown in FIG. 6B) at which the output member 53 is located closest to the inner periphery, which defines a corresponding one of the pin insertion holes 50b, after being moved relative to the input member 50 in a state where an axis (fifth axis) $O_5$ coincidences with an axis (fourth axis) $O_4$ of the outer ring 550. At the initial position, in a state where the axis $O_5$ and the axis $O_4$, the rotation axis $O_6$ and the rotation axis $O_1$ and the axis $O_2$ and the axis $O_3$ respectively coincidence with each other, each output member 53 is arranged at one side in an aperture plane (upper side in an aperture plane in FIG. 6A) of a corresponding one of the pin insertion holes 50b.

Figure 5:
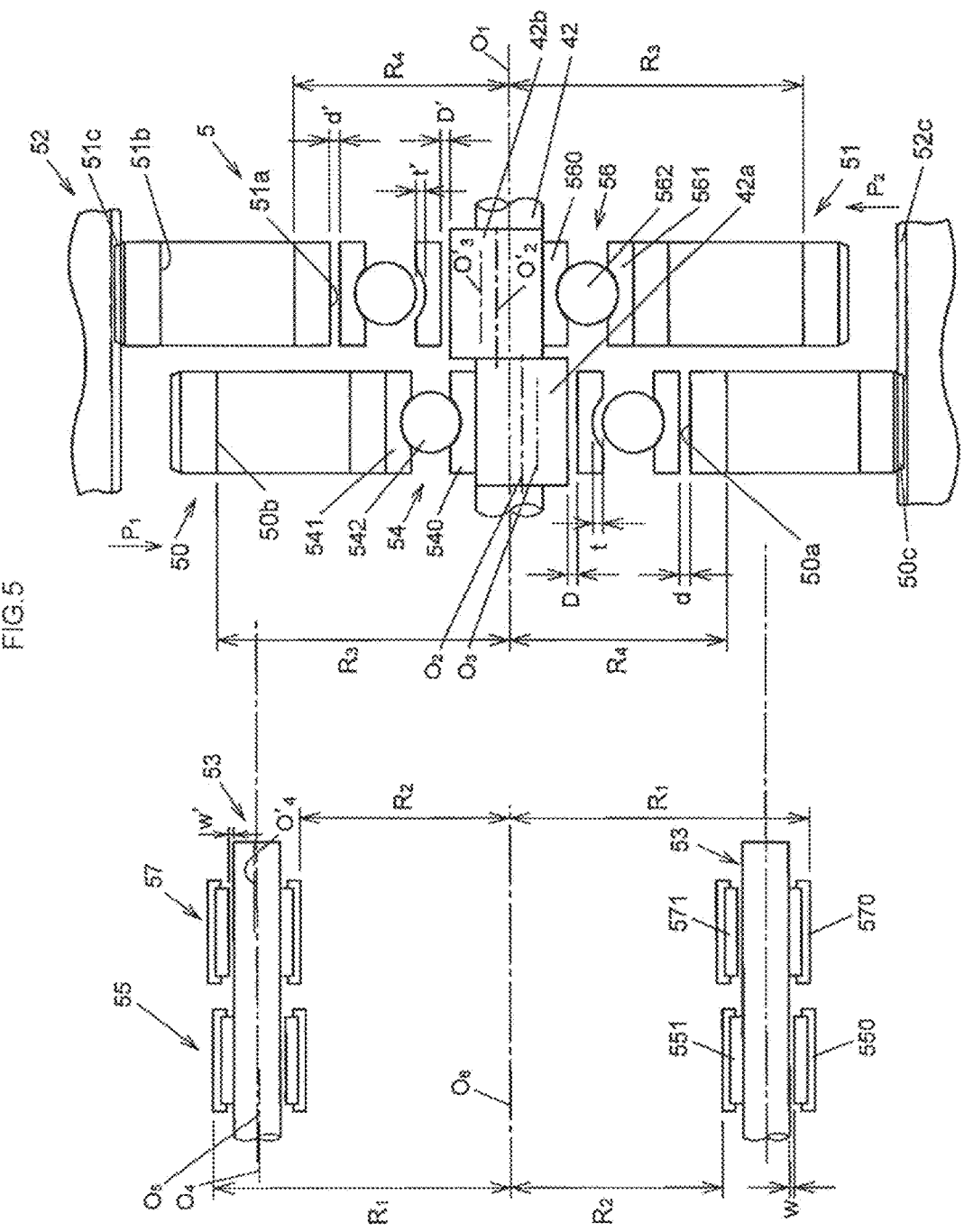
FIG. 5 is a sectional view showing a state where input members are supported by respective eccentric portions of the speed reduction mechanism and a state where second bearings are fitted to respective output members in the motor torque transmission device according to the first embodiment of the invention.

As shown in FIG. 7A and FIG. 7B, the internal clearance $S_2$ is set to a size ($S_2=2\times(s_2-s'_2)$) that is obtained by doubling a distance from a position (initial position shown in FIG. 7A), at which the outer ring 550 of the needle roller bearing 55 is located such that its axis $O_4$ coincides with the axis (fifth axis) $O_5$ of the output member 53, to a position (moved position shown in FIG. 7B) at which the outer ring 550 of the needle roller bearing 55 is located closest to the output member 53 after being moved in the radial direction (first direction $X_1$) of the output member 53. As shown in FIG. 5, when the size ($R_1-R_3$) from the initial position of the outer ring 550 to the moved position of the outer ring 550 is used, $S_2=2\times(R_1-R_3)$. In this case, the internal clearance $S_2$ is an operating clearance w of each needle roller bearing 55. The size $R_1$ is a distance from the axis $O_6$ to the outer periphery of the outer ring 550 (a portion farthest from the axis $O_6$) when the outer ring 550 is at the initial position. The size $R_2$ is a distance from the axis $O_6$ to the outer periphery of the outer ring 550 (a portion closest to the axis $O_6$) when the outer ring 550 is at the moved position.

As shown in FIG. 8A and FIG. 8B, the size S is set to a size ($S=2\times(s-s')$) that is obtained by doubling a distance from a position (initial position shown in FIG. 8A), at which the input member 50 is located such that its axis $O_3$ coincides with the axis $O_2$, to a position (moved position shown in FIG. 8B) at which the input member 50 is located closest to the eccentric portion 42a after being moved in the radial direction (second direction $X_2$). In this case, as shown in FIG. 5, if a size obtained by subtracting the outside diameter of the eccentric portion 42a from the inside diameter of the inner ring 540 is D, a size obtained by subtracting the outside diameter of the outer ring 541 from the inside diameter of the input member 50, which defines the center hole 50a, is d, and the operating clearance of the radial internal clearance in the ball bearing 54 is t, the size S is expressed by S=D+d+t.

Similarly, on the input member 51 side, as shown in FIG. 6A and FIG. 6B, the fitting clearance $S_1$ is set to a size ($S_1=2\times(s_1-s'_1)$) that is obtained by doubling a distance from an initial position (position shown in FIG. 6A) of each output member 53 to a position (position shown in FIG. 6B) at which the output member 53 is located closest to the inner periphery, which defines a corresponding one of the pin insertion holes 51b, after being moved relative to the input member 51 in a state where the axis (fifth axis) $O_5$ coincidences with an axis (fourth axis) $O'_4$ of the outer ring 570. At the initial position, in a state where the axis $O_5$ and the axis $O'_4$, the rotation axis $O_6$ and the rotation axis $O'_1$ and the axis $O'_2$ and the axis $O'_3$ respectively coincidence with each other, each output member 53 is arranged at one side in an aperture plane (upper side in an aperture plane in FIG. 6A) of a corresponding one of the pin insertion holes 51b.

As shown in FIG. 7A and FIG. 7B, the internal clearance $S_2$ is set to a size ($S_2=2\times(s_2-s'_2)$) that is obtained by doubling a distance from a position (initial position shown in FIG. 7A), at which the outer ring 570 of the needle roller bearing 57 is located such that its axis $O'_4$ coincides with the axis (fifth axis) $O_5$ of the output member 53, to a position (moved position shown in FIG. 7B) at which the outer ring 570 of the needle roller bearing 57 is located closest to the output member 53 after being moved in the radial direction (first direction $X_1$) of the output member 53. As shown in FIG. 5, when the size ($R_4-R_2$) from the initial position of the outer ring 570 to the moved position of the outer ring 570 is used, $S_2=2\times(R_4-R_2)$. In this case, the internal clearance $S_2$ is an operating clearance w' of each needle roller bearing 57. The size $R_4$ is a distance from the axis $O_6$ to the outer periphery of the outer ring 570 (a portion closest to the axis $O_6$) when the outer ring 570 is at the initial position. The size $R_2$ is a distance from the axis $O_6$ to the outer periphery of the outer ring 570 (a portion closest to the axis $O_6$) when the outer ring 570 is at the moved position.

As shown in FIG. 8A and FIG. 8B, the size S is set to a size ($S=2\times(s-s')$) that is obtained by doubling a distance from a position (initial position shown in FIG. 8A), at which the input member 51 is located such that its axis $O'_3$ coincides with the axis $O'_2$, to a position (moved position shown in FIG. 8B) at which the input member 51 is located closest to the eccentric portion 42b after being moved in the radial direction (second direction $X_2$). In this case, as shown in FIG. 5, if a size obtained by subtracting the outside diameter of the eccentric portion 42b from the inside diameter of the inner ring 560 is D', a size obtained by subtracting the outside diameter of the outer ring 561 from the inside diameter of the input member 51, which defines the center hole 51a, is d', and the operating clearance of the radial internal clearance in the ball bearing 56 is t', the size S is expressed by S=D'+d'+t'.

Next, the operation of the motor torque transmission device according to the present embodiment will be described with reference to FIG. 1 to FIG. 5. In FIG. 2, when electric power is supplied to the electric motor 4 of the motor torque transmission device 1 to drive the electric motor 4, the motor torque is applied to the reduction-transmission mechanism 5 via the motor shaft 42. Thus, the reduction-transmission mechanism 5 is actuated.

Therefore, in the reduction-transmission mechanism 5, the input members 50, 51 each make circular motion with the eccentric amount δ, for example, in the direction of the arrow $m_1$ shown in FIG. 3.

Accordingly, the input member 50 rotates about the axis $O_2$ (the direction of the arrow $n_1$ shown in FIG. 3) while the external teeth 50c are meshed with the internal teeth 52c of the rotation force applying member 52, and the input member 51 rotates about the axis $O'_2$ (the arrow $l_1$ direction shown in FIG. 3) while the external teeth 51c are meshed with the internal teeth 52c of the rotation force applying member 52. In this case, due to the rotation of the input members 50, 51, the inner peripheries of the input member 50, which define the pin insertion holes 50b, contact the races 550 of the needle roller bearings 55, and the inner peripheries of the input member 51, which define the pin insertion holes 51b, contact the races 570 of the needle roller bearings 57.

Therefore, the revolving motions of the input members 50, 51 are not transmitted to the output members 53 and only the rotating motions of the input members 50, 51 are transmitted to the output members 53. Rotation force resulting from the rotating motions is output from the input members 50, 51 to the differential case 30 as the torque of the differential case 30.

In this way, the rear differential 3 is actuated, and driving force based on the motor torque of the electric motor 4 is distributed to the rear axle shafts 106 shown in FIG. 1, and transmitted to the right and left rear wheels 105.

As the motor torque transmission device 1 operates, the centrifugal force $P_1$ acts on the input member 50 on the basis of the circular motion of the input member 50, and the centrifugal force $P_2$ acts on the input member 51 on the basis of the circular motion of the input member 51.

Accordingly, the input member 50 moves in a direction in which the centrifugal force $P_1$ acts (for example, downward in FIG. 5), and the input member 51 moves in a direction in which the centrifugal force $P_2$ acts (for example, upward in FIG. 5).

In this case, as shown in FIG. 4 and FIG. 5, when the input member 50 moves in the direction in which the centrifugal force $P_1$ acts, upon reception of a load due to the centrifugal force $P_1$ that is generated on the basis of the circular motion of the input member 50, the inner peripheries of the input member 50, which define the pin insertion hole 50b, contact the outer peripheries of the output members 53 via the needle roller bearings 55 before the inner periphery of the input member 50, which define the center hole 50a, contacts the outer periphery of the eccentric portion 42a via the ball bearing 54. Thus, the load due to the centrifugal force $P_1$ from the input member 50 is dispersed and then received by the plurality of needle roller bearings 55. Therefore, application of the load due to the centrifugal force $P_1$ from the input member 50 to the ball bearing 54 is suppressed.

Similarly, as shown in FIG. 4 and FIG. 5, when the input member 51 moves in the direction in which the centrifugal force $P_2$ acts, upon reception of a load due to the centrifugal force $P_2$ that is generated on the basis of the circular motion of the input member 51, the inner peripheries of the input member 51, which define the pin insertion hole 51b, contact the outer peripheries of the output members 53 via the needle roller bearings 57 before the inner periphery of the input member 51, which define the center hole 51a, contacts the outer periphery of the eccentric portion 42b via the ball bearing 56. Thus, the load due to the centrifugal force $P_2$ from the input member 51 is dispersed and then received by the plurality of needle roller bearings 57. Therefore, application of the load due to the centrifugal force $P_2$ from the input member 51 to the ball bearing 56 is suppressed.

Therefore, according to the present embodiment, it is no longer necessary to employ bearings having high durability as the ball bearings 54, 56.

In the above-described embodiment, the description is made on the case where the motor torque transmission device 1 is actuated by causing the input members 50, 51 to make circular motion in the direction of the arrow $m_1$. However, the motor torque transmission device 1 may be actuated in the same manner as that in the above-described embodiment even when the input members 50, 51 are caused to make circular motion in the direction of the arrow $m_2$. In this case, the rotating motion of the input member 50 is made in the direction of the arrow $n_2$, and the rotating motion of the input member 51 is made in the direction of the arrow $l_2$.

According to the above-described first embodiment, the following advantageous effects are obtained.

(1) It is no longer necessary to employ bearings having high durability as the ball bearings 54, 56. Therefore, it is possible to reduce cost.

(2) Application of the loads due to the centrifugal forces $P_1$, $P_2$ to the ball bearings 54, 56 is suppressed. Therefore, it is possible to extend the service life of each of the ball bearings 54, 56.

In the present embodiment, the description is made on the case where the size S' is set to S'=$S_1$+$S_2$. However, the invention is not limited to this configuration. The size S' may be set to S'=$S_2$.

Figure 9:
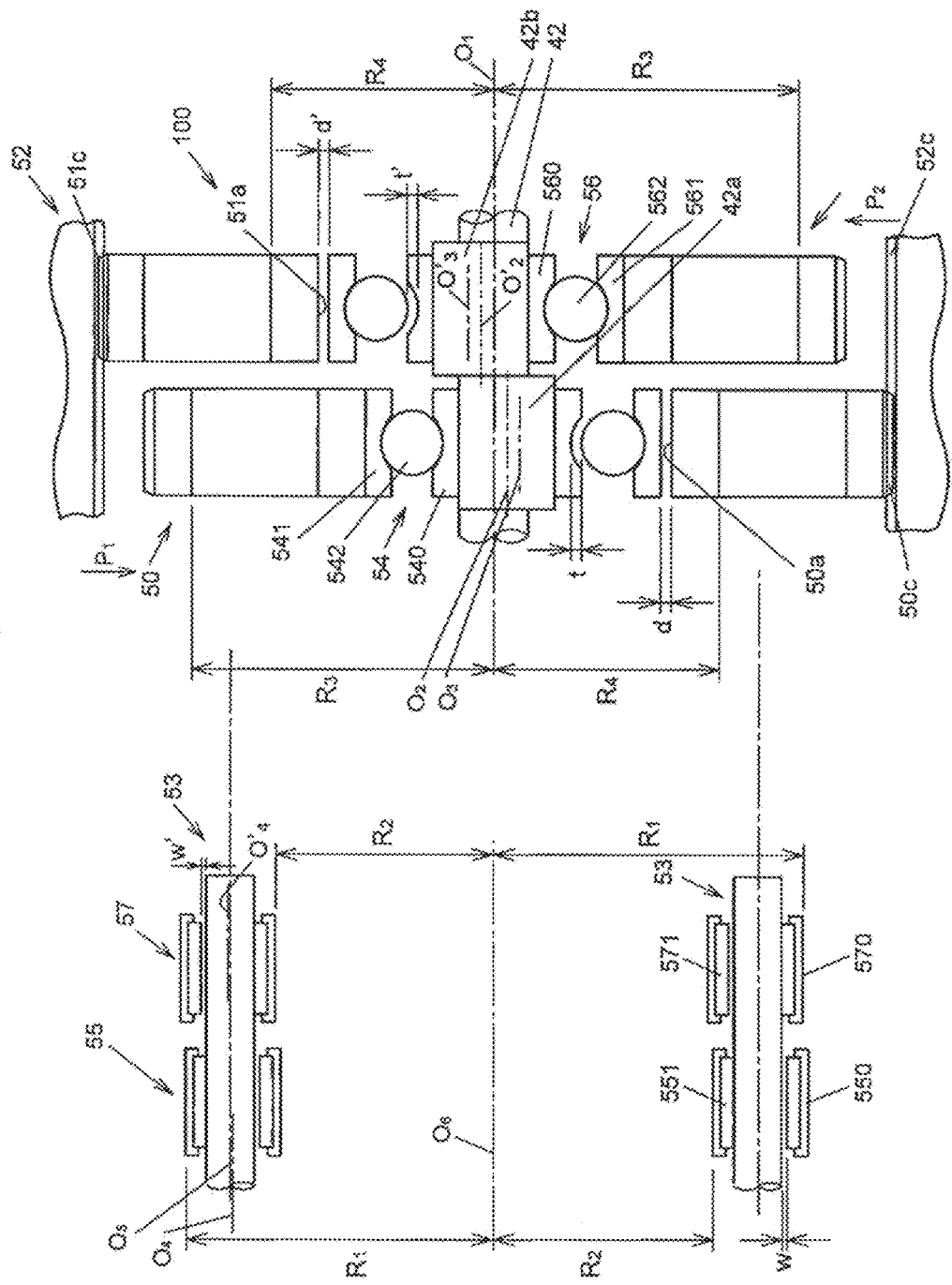
FIG. 9 is a simplified sectional view showing a state where the input members are supported by the respective eccentric portions of a speed reduction mechanism and a state where the second bearings are fitted to the respective output members in a motor torque transmission device according to a second embodiment of the invention.

Next, a speed reduction mechanism in a motor torque transmission device according to a second embodiment of the invention will be described with reference to FIG. 9. FIG. 9 shows a state where input members are supported and a state where second bearings are fitted. In FIG. 9, the members having the functions which are the same as or equivalent to those in FIG. 5 are denoted by the same reference numerals are those in FIG. 5, and the detailed description is omitted.

As shown in FIG. 9, a reduction-transmission mechanism 100 (partially shown) according to the second embodiment of the invention is characterized in that the inner rings 540, 560 of the ball bearings 54, 56 are fitted to the outer peripheries of the eccentric portions 42a, 42b by interference fit, and the outer rings 541, 561 are fitted to the inner peripheries of the input members 50, 51, which define the center holes 50a, 51a, by clearance fit.

Therefore, on the input member 50 side, if a size obtained by subtracting the outside diameter of the outer ring 541 from the inside diameter of the input member 50, which defines the center hole 50a, is d and the operating clearance of the radial internal clearance in the ball bearing 54 is t, the size S (shown in FIG. 8A and FIG. 8B) is set to S=d+t.

In addition, if the operating clearance of the radial internal clearance in the needle roller bearing 55 is w, the internal clearance $S_2$ (shown in FIG. 7A and FIG. 7B) is set to $S_2$=w.

Similarly, on the input member 51 side, if a size obtained by subtracting the outside diameter of the outer ring 561 from the inside diameter of the input member 51, which defines the center hole 51a, is d' and the operating clearance of the radial internal clearance in the ball bearing 56 is t', the size S is set to S=d'+t'.

In addition, if the operating clearance of the radial internal clearance in the needle roller bearing 57 is w', the internal clearance $S_2$ is set to $S_2$=w'.

In the thus configured reduction-transmission mechanism 100, when the input member 50 moves in the direction of the centrifugal force $P_1$ upon reception of a load due to the centrifugal force $P_1$ that is generated on the basis of the circular motion of the input member 50, the load due to the centrifugal force $P_1$ from the input member 50 is dispersed and then received by the plurality of needle roller bearings 55.

In addition, when the input member 51 moves in the direction of the centrifugal force $P_2$ upon reception of a load due to the centrifugal force $P_2$ that is generated on the basis of the circular motion of the input member 51, the load due to the centrifugal force $P_2$ from the input member 51 is dispersed and then received by the plurality of needle roller bearings 57.

Therefore, in the present embodiment, as in the case of the first embodiment, application of the load due to the centrifugal force $P_1$ from the input member 50 to the ball bearing 54 and application of the load due to the centrifugal force $P_2$ from the input member 51 to the ball bearing 56 are suppressed. As a result, it is no longer necessary to employ bearings having high durability as the ball bearings 54, 56.

According to the above-described second embodiment, similar advantageous effects to those of the first embodiment are obtained.

In the present embodiment, the description is made on the case where the ball bearing 54 that is formed of the inner ring 540 arranged radially outward of the eccentric portion 42a, the outer ring 541 arranged radially outward of the inner ring 540 and the rolling elements 542 interposed between the outer ring 541 and the inner ring 540 is used as the first bearing and the ball bearing 56 that is formed of the inner ring 560 arranged radially outward of the eccentric portion 42b, the outer ring 561 arranged radially outward of the inner ring 560 and the rolling elements 562 interposed between the outer ring 561 and the inner ring 560 is used as the first bearing. However, the invention is not limited to this configuration. Ball bearings each of which has an inner ring raceway surface formed on the outer periphery of the eccentric portion and each of which is formed of an outer ring arranged radially outward of the inner ring raceway surface and rolling elements interposed between the outer ring and the inner ring raceway surface may be employed as the first bearings. In this case, when the outer ring is fitted to the inner periphery of the input member, which defines the center hole, by clearance fit, the size S is set to S=d+t, d'+t', as in the above-described embodiment. In contrast to this, when the outer ring is fitted to the inner periphery of the input member, which defines the center hole, by interference fit, the size S is set to S=t, t'.

In addition, in the present embodiment, the description is made on the case where the size S' is set to $S'=S_1+S_2$. However, the invention is not limited to this configuration. The size S' may be set to $S'=S_2$.

Figure 10:
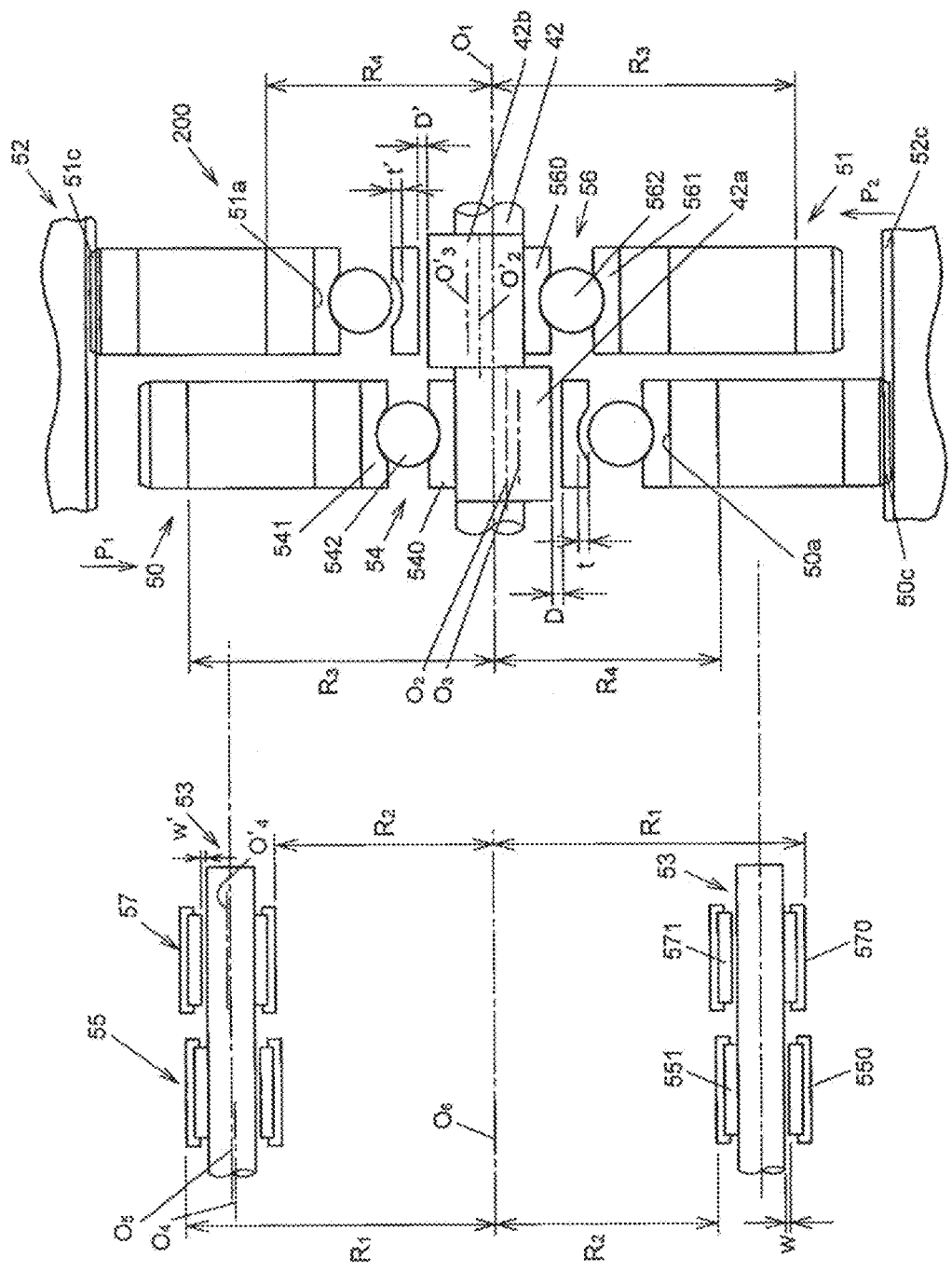
FIG. 10 is a simplified sectional view showing a state where the input members are supported by the respective eccentric portions of a speed reduction mechanism and a state where the second bearings are fitted to the respective output members in a motor torque transmission device according to a third embodiment of the invention.

Next, a speed reduction mechanism in a motor torque transmission device according to a third embodiment of the invention will be described with reference to FIG. 10. FIG. 10 shows a state where input members are supported and a state where second bearings are fitted. In FIG. 10, the members having the functions which are the same as or equivalent to those in FIG. 5 are denoted by the same reference numerals are those in FIG. 5, and the detailed description is omitted.

As shown in FIG. 10, a reduction-transmission mechanism 200 (partially shown) according to the third embodiment of the invention is characterized in that the inner rings 540, 560 of the ball bearings 54, 56 are fitted to the outer peripheries of the eccentric portions 42a, 42b by clearance fit. In addition, the reduction-transmission mechanism 200 is characterized in that the outer rings 541, 561 are fitted to the inner peripheries of the input members 50, 51, which define the center holes 50a, 51a, by interference fit.

Therefore, on the input member 50 side, if a size obtained by subtracting the outside diameter of the eccentric portion 42a from the inside diameter of the inner ring 540 is D and the operating clearance of the radial internal clearance in the ball bearing 54 is t, the size S (shown in FIG. 8A and FIG. 8B) is set to S=D+t.

In addition, if the operating clearance of the radial internal clearance in the needle roller bearing 55 is w, the internal clearance $S_2$ (shown in FIG. 7A and FIG. 7B) is set to $S_2$=w.

Similarly, on the input member 51 side, if a size obtained by subtracting the outside diameter of the eccentric portion 42b from the inside diameter of the inner ring 560 is D' and the operating clearance of the radial internal clearance in the ball bearing 56 is t', the size S is set to S=D'+t'.

In addition, if the operating clearance of the radial internal clearance in the needle roller bearing 57 is w', the internal clearance $S_2$ is set to $S_2$=w'.

In the thus configured reduction-transmission mechanism 200, when the input member 50 moves in the direction of the centrifugal force $P_1$ upon reception of a load due to the centrifugal force $P_1$ that is generated on the basis of the circular motion of the input member 50, the load due to the centrifugal force $P_1$ from the input member 50 is dispersed and then received by the plurality of needle roller bearings 55.

In addition, when the input member 51 moves in the direction of the centrifugal force $P_2$ upon reception of a load due to the centrifugal force $P_2$ that is generated on the basis of the circular motion of the input member 51, the load due to the centrifugal force $P_2$ from the input member 51 is dispersed and then received by the plurality of needle roller bearings 57.

Therefore, in the present embodiment, as in the case of the first embodiment, application of the load due to the centrifugal force $P_1$ from the input member 50 to the ball bearing 54 and application of the load due to the centrifugal force $P_2$ from the input member 51 to the ball bearing 56 are suppressed. As a result, it is no longer necessary to employ bearings having high durability as the ball bearings 54, 56.

According to the above-described third embodiment, similar advantageous effects to those of the first embodiment are obtained.

In the present embodiment, the description is made on the case where the ball bearing 54 that is formed of the inner ring 540 arranged radially outward of the eccentric portion 42a, the outer ring 541 arranged radially outward of the inner ring 540 and the rolling elements 542 interposed between the outer ring 541 and the inner ring 540 is used as the first bearing and the ball bearing 56 that is formed of the inner ring 560 arranged radially outward of the eccentric portion 42b, the outer ring 561 arranged radially outward of the inner ring 560 and the rolling elements 562 interposed between the outer ring 561 and the inner ring 560 is used as the first bearing. However, the invention is not limited to this configuration. Ball bearings each of which has an outer ring raceway surface formed on the inner periphery of the input member, which defines the center hole, and each of which is formed of an inner ring arranged radially inward of the outer ring raceway surface and rolling elements interposed between the inner ring and the outer ring raceway surface may be used as the first bearings. In this case, when the inner ring is fitted to the outer periphery of the eccentric portion by clearance fit, the size S is set to S=D+t, D'+t' as in the case of the above-described embodiments. In contrast to this, when the inner ring is fitted to the outer periphery of the eccentric portion by interference fit, the size S is set to S=t, t'.

In addition, in the present embodiment, the description is made on the case where the size S is set to $S'=S_1+S_2$. However, the invention is not limited to this configuration. The size S' may be set to $S'=S_2$.

Figure 11:
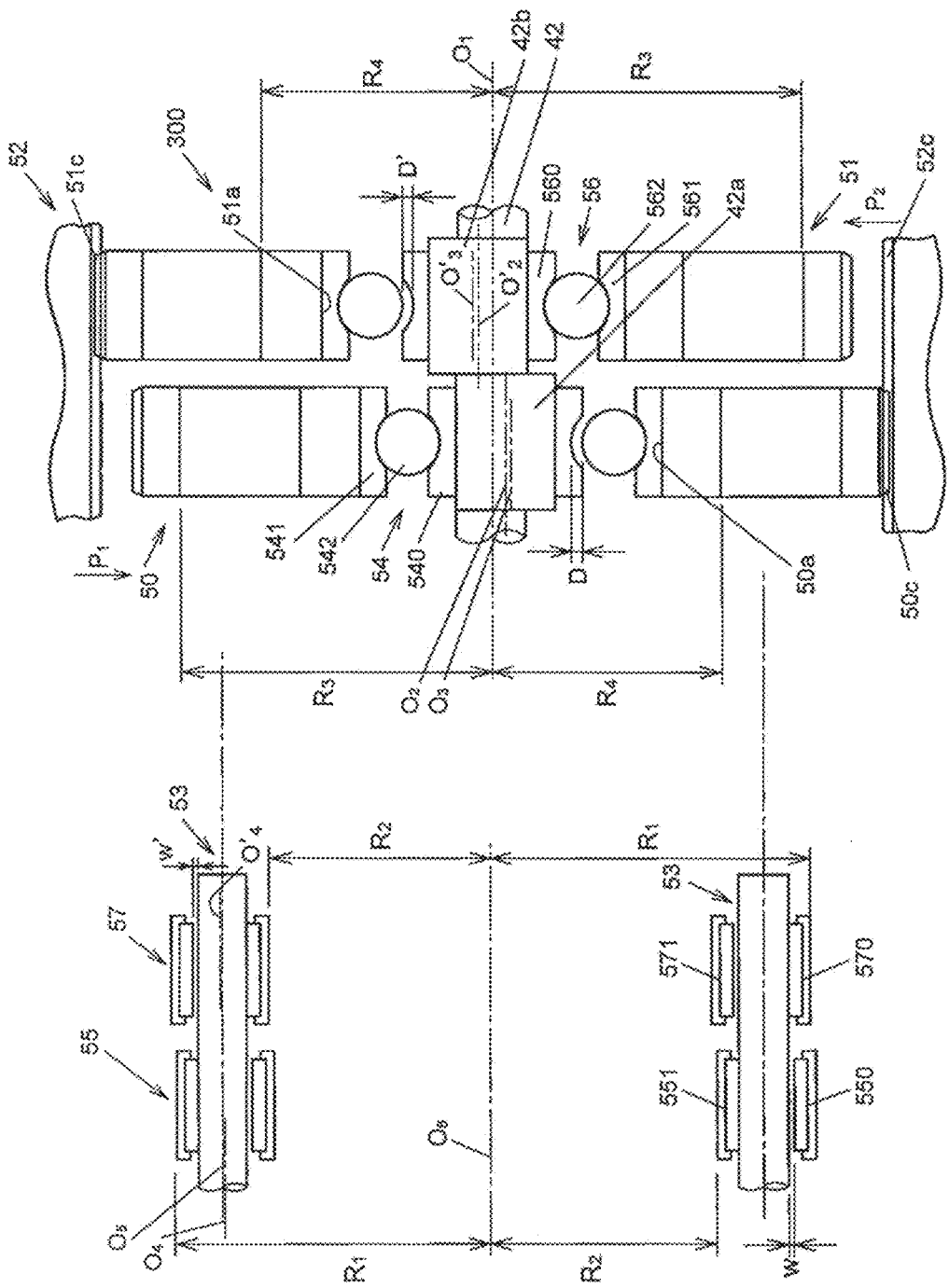
FIG. 11 is a simplified sectional view showing a state where the input members are supported by the respective eccentric portions of a speed reduction mechanism and a state where the second bearings are fitted to the respective output members in a motor torque transmission device according to a fourth embodiment of the invention.
Figure 12:
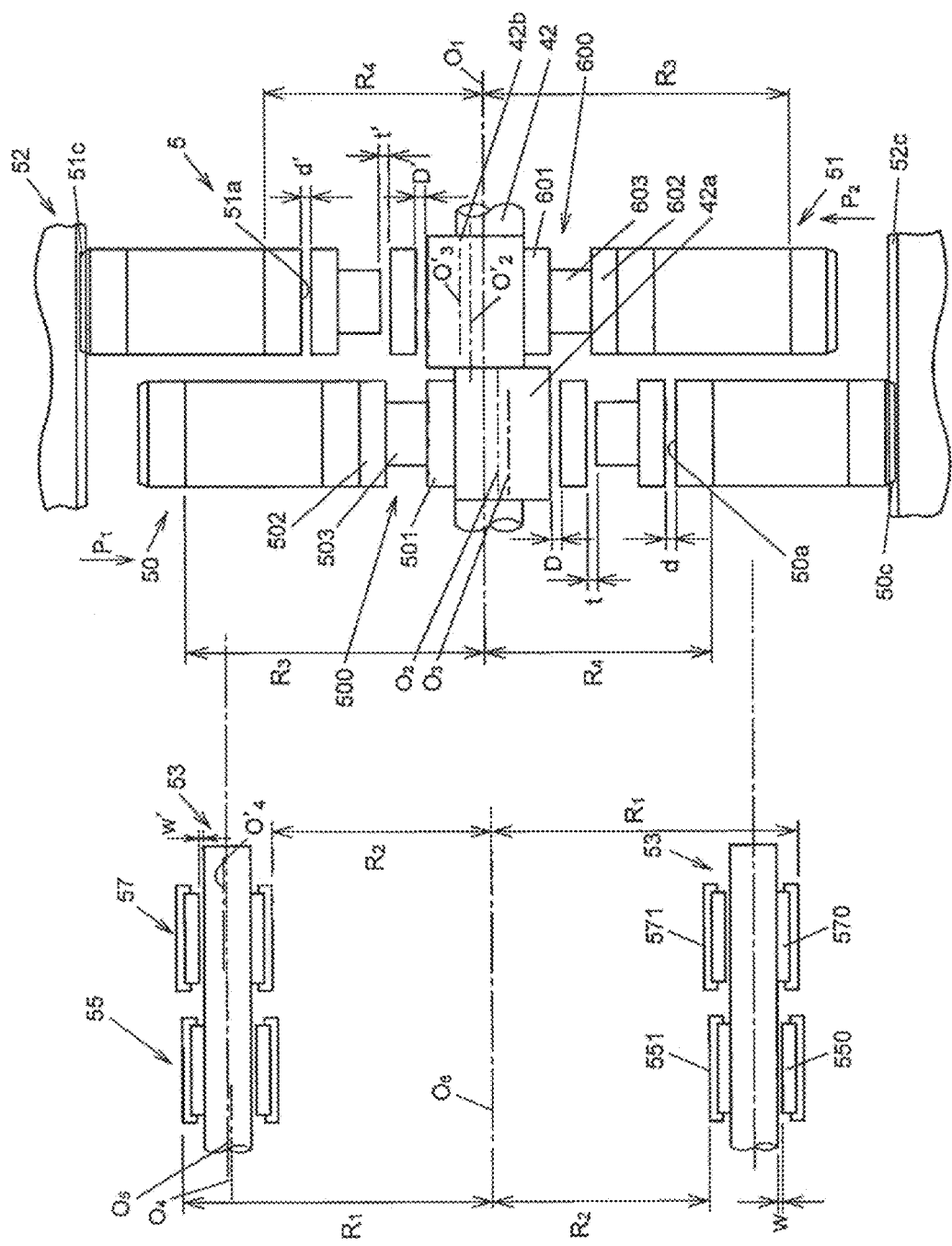
FIG. 12 is a simplified sectional view showing a state where the input members are supported by the respective eccentric portions of the speed reduction mechanism and a state where the second bearings are fitted to the respective output members in a motor torque transmission device in a first modified example according to the first embodiment of the invention.
Figure 13:
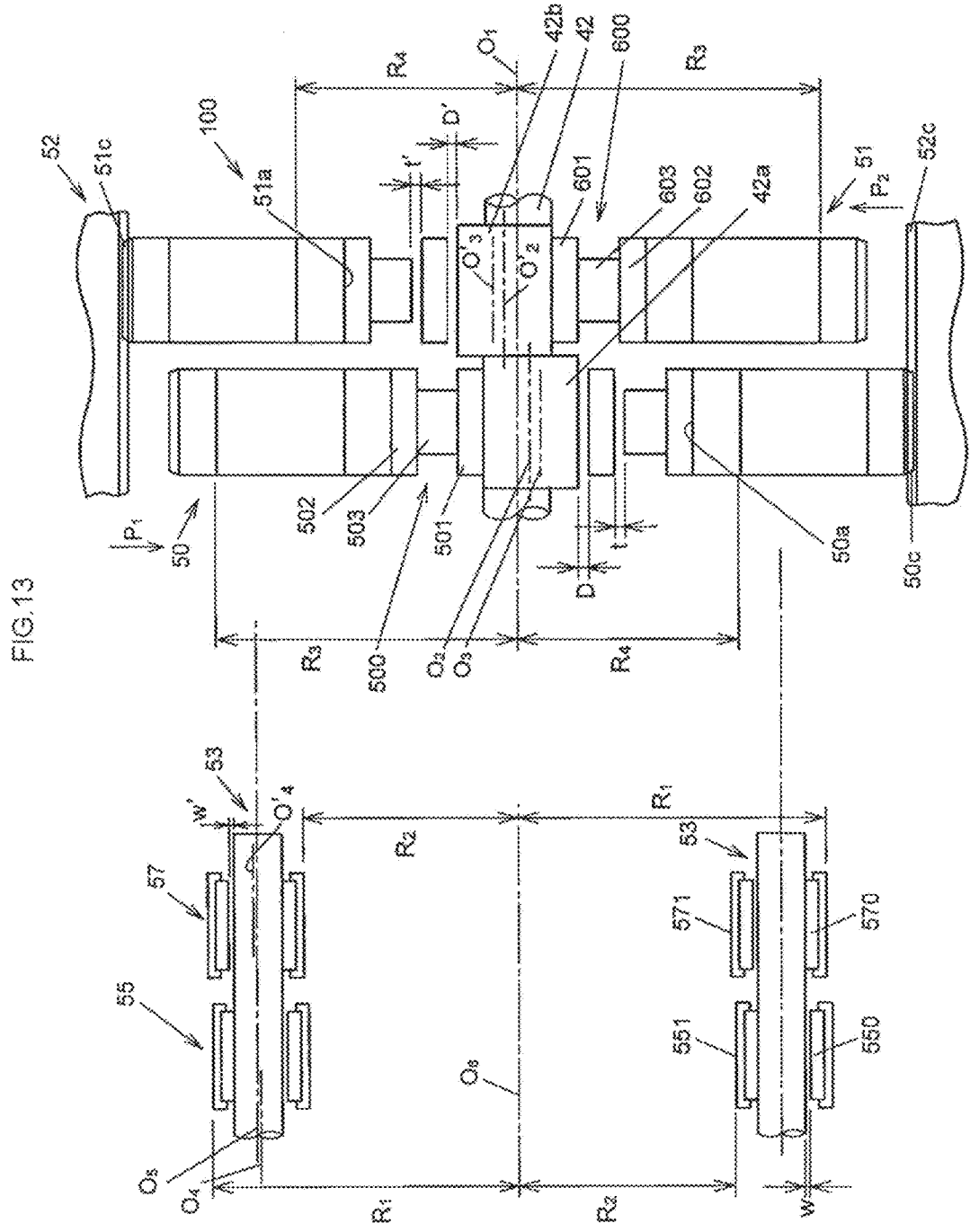
FIG. 13 is a simplified sectional view showing a state where the input members are supported by the respective eccentric portions of the speed reduction mechanism and a state where the second bearings are fitted to the respective output members in a motor torque transmission device in a second modified example according to the second embodiment of the invention.
Figure 14:
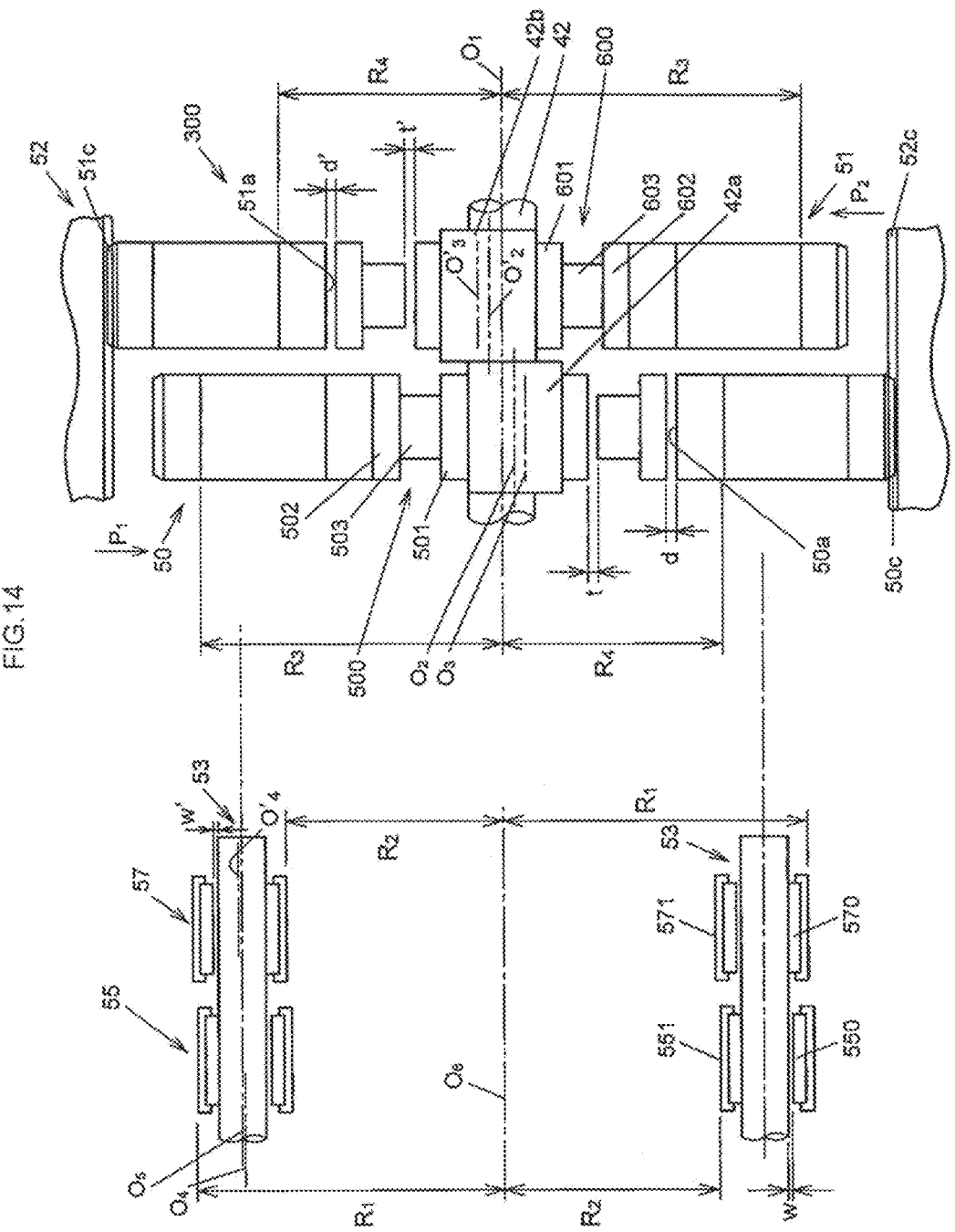
FIG. 14 is a simplified sectional view showing a state where the input members are supported by the respective eccentric portions of the speed reduction mechanism and a state where the second bearings are fitted to the respective output members in a motor torque transmission device in a third modified example according to the third embodiment of the invention.
Figure 15:
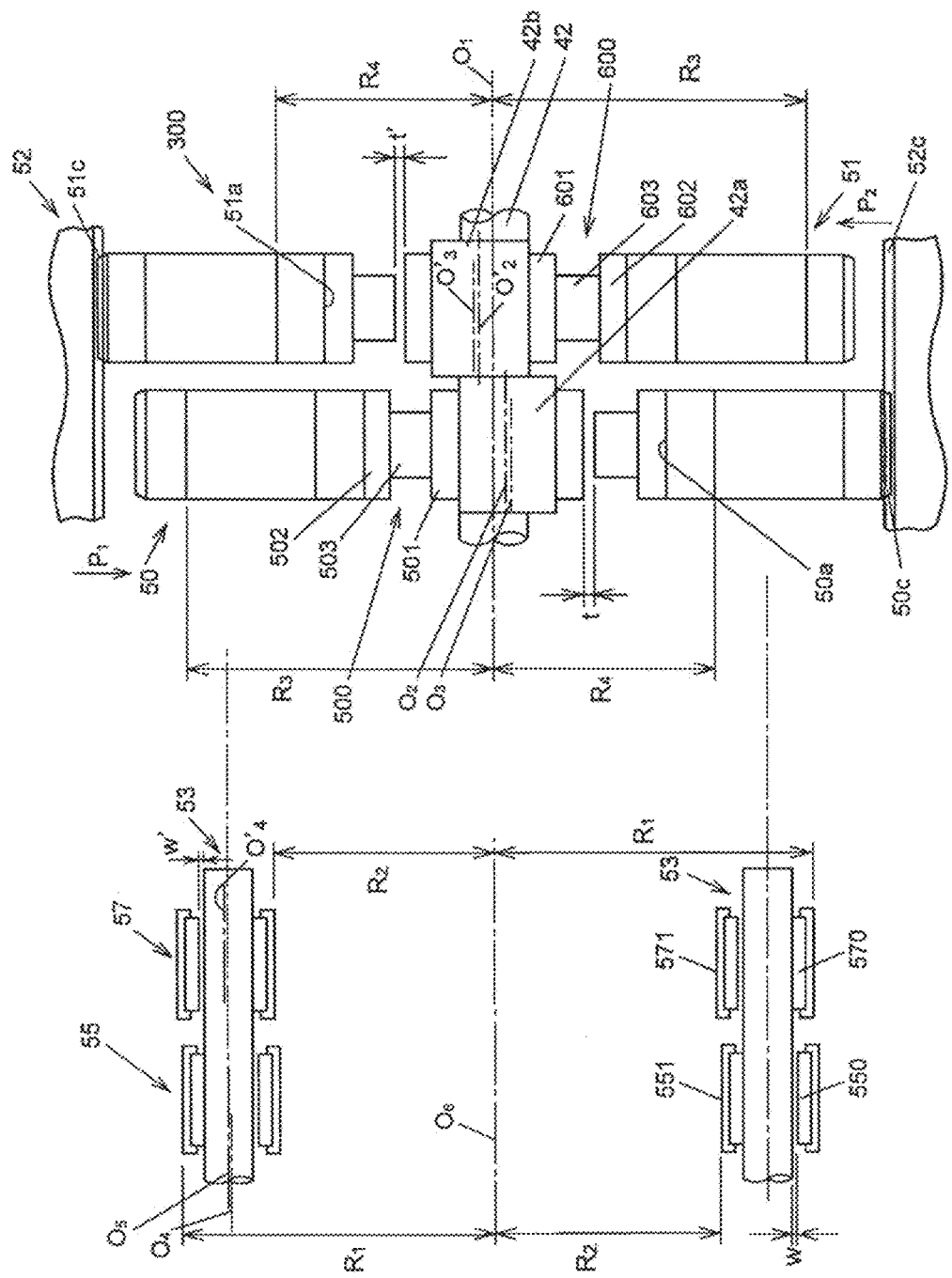
FIG. 15 is a simplified sectional view showing a state where the input members are supported by the respective eccentric portions of the speed reduction mechanism and a state where the second bearings are fitted to the respective output members in a motor torque transmission device according to a fourth modified example of the fourth embodiment of the invention.

Next, a speed reduction mechanism in a motor torque transmission device according to a fourth embodiment of the invention will be described with reference to FIG. 11. FIG. 11 shows a state where input members are supported and a state where second bearings are fitted. In FIG. 11, the members having the functions which are the same as or equivalent to those in FIG. 5 are denoted by the same reference numerals are those in FIG. 5, and the detailed description is omitted.

As shown in FIG. 11, a reduction-transmission mechanism 300 (partially shown) according to the fourth embodiment of the invention is characterized in that the inner rings 540, 560 of the ball bearings 54, 56 are fitted to the outer peripheries of the eccentric portions 42a, 42b by interference fit. In addition, the reduction-transmission mechanism 300 is characterized in that the outer rings 541, 561 are fitted to the inner peripheries of the input members 50, 51, which define the center holes 50a, 51a, by interference fit.

Therefore, on the input member 50 side, if the operating clearance of the radial internal clearance in the ball bearing 54 is t, the size S (shown in FIG. 8A and FIG. 8B) is set to S=t.

In addition, if the operating clearance of the radial internal clearance in the needle roller bearing 55 is w, the internal clearance $S_2$ (shown in FIG. 7A and FIG. 7B) is set to $S_2$=w.

Similarly, on the input member 51 side, if the operating clearance of the radial internal clearance in the ball bearing 56 is t', the size S is set to S=t'.

In addition, if the operating clearance of the radial internal clearance in the needle roller bearing 57 is w', the internal clearance $S_2$ is set to $S_2$=w'.

In the thus configured reduction-transmission mechanism 300, when the input member 50 moves in the direction of the centrifugal force $P_1$ upon reception of a load due to the centrifugal force $P_1$ that is generated on the basis of the circular motion of the input member 50, the load due to the centrifugal force $P_1$ from the input member 50 is dispersed and then received by the plurality of needle roller bearings 55.

In addition, when the input member 51 moves in the direction of the centrifugal force $P_2$ upon reception of a load due to the centrifugal force $P_2$ that is generated on the basis of the circular motion of the input member 51, the load due to the centrifugal force $P_2$ from the input member 51 is dispersed and then received by the plurality of needle roller bearings 57.

Therefore, in the present embodiment, as in the case of the first embodiment, application of the load due to the centrifugal force $P_1$ from the input member 50 to the ball bearing 54 and application of the load due to the centrifugal force $P_2$ from the input member 51 to the ball bearing 56 are suppressed. As a result, it is no longer necessary to employ bearings having high durability as the ball bearings 54, 56.

According to the above-described fourth embodiment, similar advantageous effects to those of the first embodiment are obtained.

In the present embodiment, the description is made on the case where the ball bearing 54 that is formed of the inner ring 540 arranged radially outward of the eccentric portion 42a, the outer ring 541 arranged radially outward of the inner ring 540 and the rolling elements 542 interposed between the outer ring 541 and the inner ring 540 is used as the first bearing and the ball bearing 56 that is formed of the inner ring 560 arranged radially outward of the eccentric portion 42b, the outer ring 561 arranged radially outward of the inner ring 560 and the rolling elements 562 interposed between the outer ring 561 and the inner ring 560 is used as the first bearing. However, the invention is not limited to this configuration. Ball bearings each of which has an inner ring raceway surface formed on the outer periphery of the eccentric portion and an outer ring raceway surface formed on the inner periphery of the input member, which defines the center hole, and each of which is formed of rolling elements interposed between the outer ring raceway surface and the inner ring raceway surface may be used as the first bearings.

In addition, in the present embodiment, the description is made on the case where the size S' is set to $S'=S_1+S_2$. However, the invention is not limited to this configuration. The size S' may be set to $S'=S_2$.

Hereinafter, a motor torque transmission device according to a fifth embodiment of the invention will be described in detail with reference to the accompanying drawings.

Figure 16:
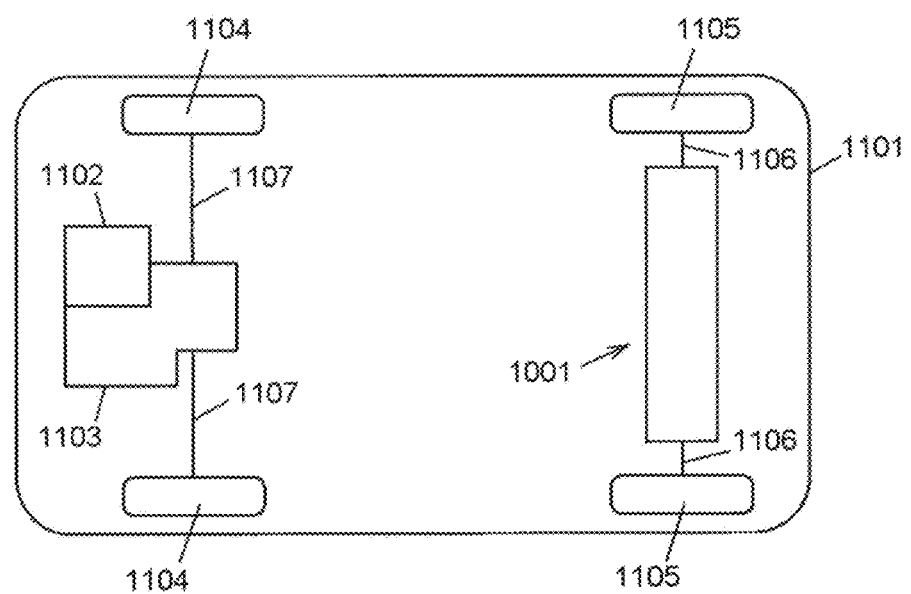
FIG. 16 is a schematic plan view for illustrating a vehicle in which a motor torque transmission device according to a fifth embodiment of the invention is mounted.

FIG. 16 schematically shows a four-wheel drive vehicle. As shown in FIG. 16, a four-wheel drive vehicle 1101 includes a front wheel power system that has an engine as a driving source and a rear wheel power system that has an electric motor as a driving source. The four-wheel drive vehicle 1101 includes a motor torque transmission device 1001, an engine 1102, a transaxle 1103, a pair of front wheels 1104 and a pair of rear wheels 1105.

The motor torque transmission device 1001 is arranged in the rear wheel power system of the four-wheel drive vehicle 1101, and is mounted in a vehicle body (not shown) of the four-wheel drive vehicle 1101.

The motor torque transmission device 1001 is configured to be able to transmit driving force based on the motor torque of an electric motor 1004 (described later) to the rear wheels 1105. Thus, the motor torque of the electric motor 1004 is output to rear axle shafts 1106 (the rear wheels 1105) via a reduction-transmission mechanism 1005 and a rear differential 1003 (both will be described later) to drive the rear wheels 1105. The details of the motor torque transmission device 1001, and the like, will be described later.

The engine 1102 is arranged in the front wheel power system of the four-wheel drive vehicle 1101. Thus, the driving force of the engine 1102 is output to front axle shafts 1107 (the front wheels 1104) via the transaxle 1103 to drive the front wheels 1104.

Figure 17:
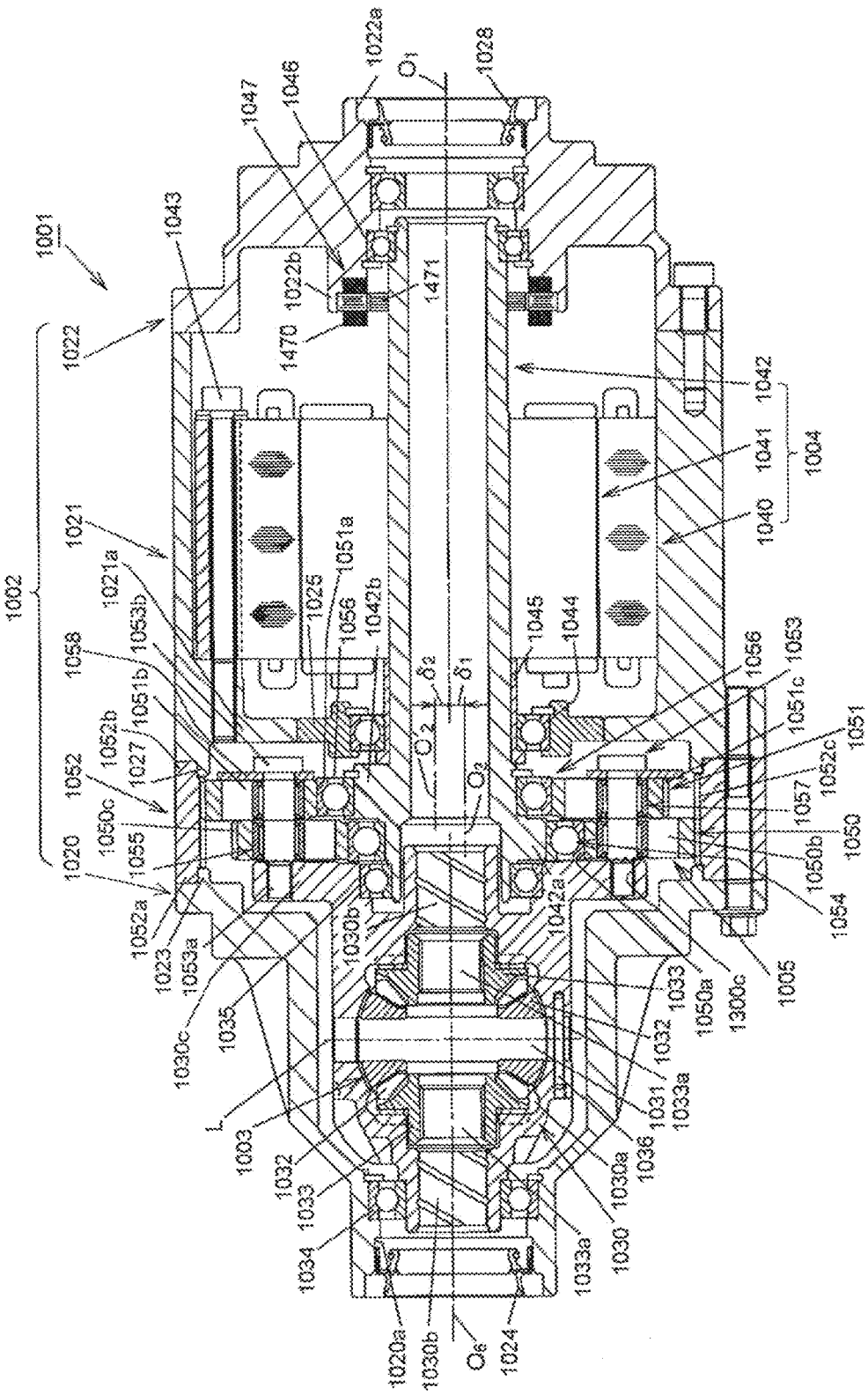
FIG. 17 is a sectional view for illustrating the motor torque transmission device according to the fifth embodiment of the invention.

FIG. 17 shows an overall view of the motor torque transmission device. As shown in FIG. 17, the motor torque transmission device 1001 is mainly formed of a housing 1002, the rear differential 1003, the electric motor 1004 and the reduction-transmission mechanism 1005. The central axis of the housing 1002 is an axis (a rotation axis $O_1$ that may function as a first axis) of each rear axle shaft 1106 (shown in FIG. 16). The rear differential 1003 distributes driving force to the rear wheels 1105 (shown in FIG. 16). The electric motor 1004 generates motor torque to actuate the rear differential 1003. The reduction-transmission mechanism 5 reduces the speed of rotation output from the electric motor 4 and transmits driving force to the rear differential 1003.

The housing 1002 has a rotation force applying member 1052 (described later), a first housing element 1020, a second housing element 1021 and a third housing element 1022. The housing 1002 is arranged on the vehicle body. The first housing element 1020 accommodates the rear differential 1003. The second housing element 1021 accommodates the electric motor 1004. The third housing element 1022 closes a first opening portion of the second housing element 1021 (an opening portion on the opposite side of the second housing element 1021 from a first housing element 1020-side opening portion (second opening portion)).

The first housing element 1020 is arranged at a second side (left side in FIG. 17) of the housing 1002. The entirety of the first housing element 1020 is formed of a stepped closed-end cylindrical member that is open toward the second housing element 1021. The bottom of the first housing element 1020 has a shaft insertion hole 1020a through which one of the rear axle shafts 1106 (shown in FIG. 16) is passed. An annular protrusion 1023 that protrudes toward the second housing element 1021 is formed integrally on the open end face of the first housing element 1020. The outer periphery of the protrusion 1023 has an outside diameter smaller than the maximum outside diameter of the first housing element 1020, and is formed of a cylindrical surface of which the central axis coincides with the rotation axis $O_1$. A seal member 1024 is interposed between the inner periphery of the first housing element 1020 and the outer periphery of the rear axle shaft 1106. The seal member 1024 seals the shaft insertion hole 1020a.

The second housing element 1021 is arranged at the middle of the housing 1002 in the axial direction. The entirety of the second housing element 1021 is formed of an open-end cylindrical member that is open toward both sides in the direction of the rotation axis $O_1$. A stepped inward flange 1021a, which is interposed between the electric motor 1004 and the reduction-transmission mechanism 1005, is formed integrally with the second opening portion of the second housing element 1021 (the opening portion on the first housing element 1020-side). An annular member 25, to which a race is fitted, is fitted to the inner periphery of the inward flange 1021a. An annular protrusion 1027, which protrudes toward the first housing element 1020, is formed integrally on the second open end face of the second housing element 1021 (the open end face on the first housing element 1020-side). The outer periphery of the protrusion 1027 has an outside diameter smaller than the maximum outside diameter of the second housing element 1021. The protrusion 1027 has substantially the same outside diameter as the outside diameter of the protrusion 1023. The outer periphery of the protrusion 27 is formed of a cylindrical surface of which the central axis coincides with the rotation axis $O_1$.

The third housing element 1022 is arranged at the first side (right side in FIG. 17) of the housing 1002. The entirety of the third housing element 1022 is formed of a stepped closed-end cylindrical member that is open toward the second housing element 1021. The bottom of the third housing element 1022 has a shaft insertion hole 1022a through which the other one of the rear axle shafts 1106 is passed. A cylindrical portion 1022b, which protrudes toward the electric motor 1004 and to which a stator is fitted, is formed integrally with the third housing element 1022 so as to surround the inner opening of the shaft insertion hole 1022a. A seal member 1028 that seals the shaft insertion hole 1022a is interposed between the inner periphery of the third housing element 1022 and the outer periphery of the rear axle shaft 1106.

The rear differential 1003 is formed of a differential case 1030, a pinion gear shaft 1031 and a bevel gear differential mechanism. The differential case 1030 is an example of an output target (member to which the rotation force is output). The differential mechanism is of a bevel gear mechanism, and includes a pair of pinion gears 1032 and a pair of side gears 1033. The rear differential 1003 is arranged at the second side (left side in FIG. 17) of the motor torque transmission device 1001.

With this configuration, the torque of the differential case 1030 is distributed from the pinion gear shaft 1031 to the side gears 1033 via the pinion gears 1032. The torque of the differential case 1030 is further transmitted from the side gears 1033 to the right and left rear wheels 1105 (shown in FIG. 16) via the rear axle shafts 1106 (shown in FIG. 16).

When there arises a difference in driving resistance between the right and left rear wheels 1105, the torque of the differential case 1030 is differentially distributed to the right and left rear wheels 1105 by the rotations of the pinion gears 1032.

Figure 20:
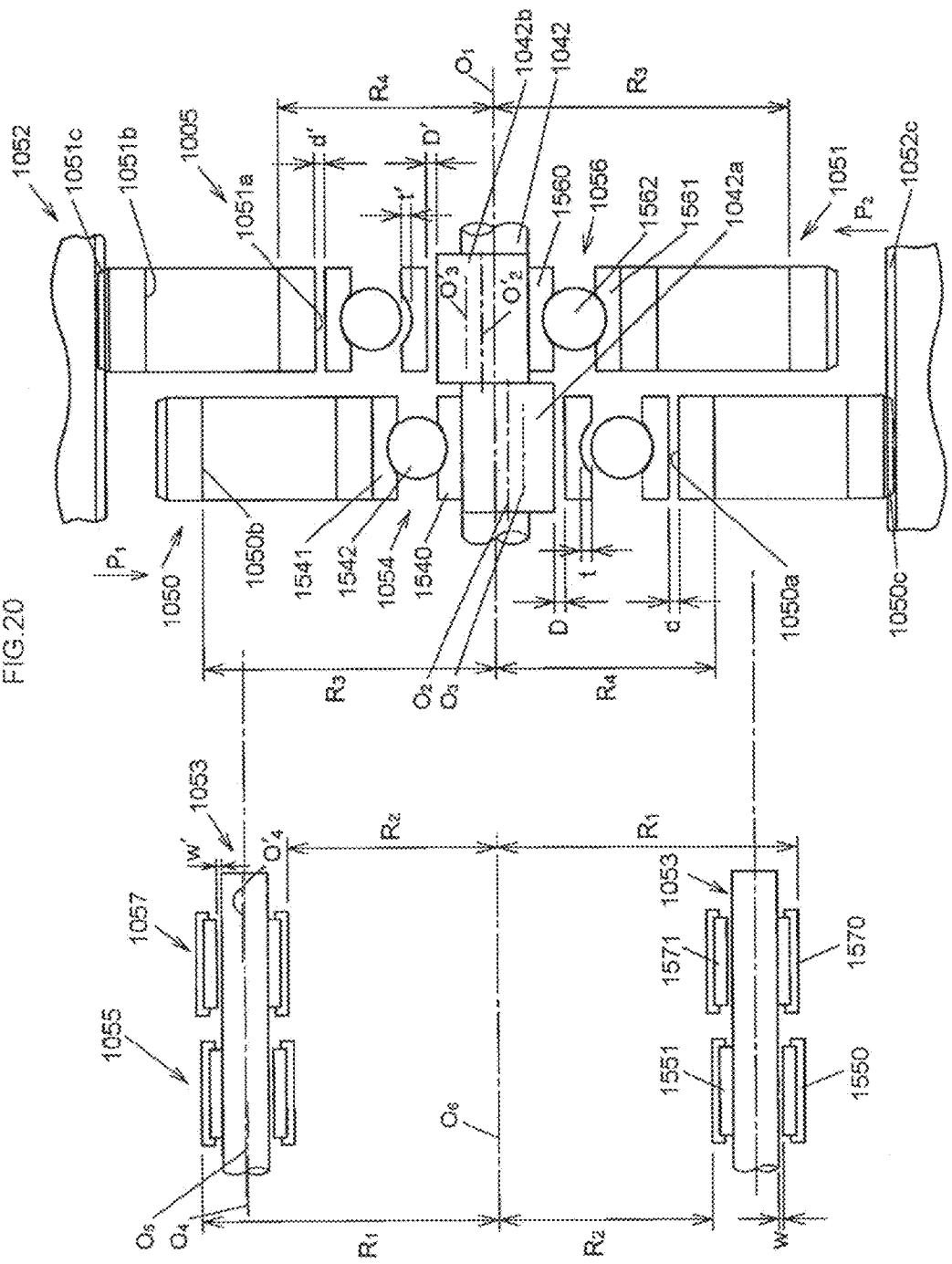
FIG. 20 is a sectional view showing a state where the input members are supported by the respective eccentric portions of the speed reduction mechanism and a state where the second bearings are fitted to the respective output members in the motor torque transmission device according to the fifth embodiment of the invention.

The differential case 1030 is arranged on a rotation axis (sixth axis) $O_6$ (shown in FIG. 20). The differential case 1030 is rotatably supported by the first housing element 1020 via a ball bearing 1034, and is rotatably supported by a motor shaft (rotary shaft) 1042 of the electric motor 1004 via a ball bearing 1035. The differential case 1030 is configured to rotate about the rotation axis $O_6$ upon reception of driving force based on the motor torque of the electric motor 1004 from the reduction-transmission mechanism 1005.

The differential case 1030 has an accommodation space 1030a and a pair of shaft insertion holes 1030b. A differential mechanism unit (the pinion gear shaft 1031, the pinion gears 1032 and the side gears 1033) is accommodated in the accommodation space 1030a. The shaft insertion holes 1030b communicate with the accommodation space 1030a, and the right and left rear axle shafts 1106 are passed through the shaft insertion holes 1030b.

An annular flange 1030c that faces the reduction-transmission mechanism 1005 is formed integrally with the differential case 1030. The flange 1030c has a plurality of (six in the present embodiment) pin fitting holes 1300c that are formed of circular holes (threaded holes) arranged at equal intervals around the rotation axis $O_6$. In addition, each pin fitting hole 1300c has multiple (three in the present embodiment) grooves 1301c (shown in FIG. 24A) that open to the pin fitting hole 1300c and both axial sides of the pin fitting hole 1300c. The grooves 1301c each function as a fitting portion in which an elastic member 1059 (described later) is fitted, and are arranged in parallel and at equal intervals in the circumferential direction of each pin fitting hole 1300c (around the axis of each of a plurality of output members 1053).

The pinion gear shaft 1031 is arranged along an axis L that is perpendicular to the rotation axis $O_6$ in the accommodation space 1030a of the differential case 1030. The rotation of the pinion gear shaft 1031 about the axis L and the movement of the pinion gear shaft 1031 in the direction of the axis L are restricted by a pin 1036.

The pinion gears 1032 are rotatably supported by the pinion gear shaft 1031, and are accommodated in the accommodation space 1030a of the differential case 1030.

The side gears 1033 each have a shaft coupling hole 1033a. The side gears 1033 are accommodated in the accommodation space 1030a of the differential case 1030. Each of the shaft coupling holes 1033a is coupled to a corresponding one of the right and left rear axle shafts 1106 (shown in FIG. 16) by spline fitting. The side gears 1033 are configured such that the gear axes are perpendicular to the gear axes of the pinion gears 1032 and the side gears 1033 are in mesh with the pinion gears 1032.

The electric motor 1004 includes a stator 1040, a rotor 1041 and the motor shaft 1042. The electric motor 1004 is arranged on the first side (right side in FIG. 17) of the motor torque transmission device 1001, and is coupled to the rear differential 1003 via the reduction-transmission mechanism 1005 on the rotation axis $O_1$. The stator 1040 of the electric motor 1004 is connected to an electronic control unit (ECU) (not shown). The electric motor 1004 is configured such that the stator 1040 receives a control signal from the ECU, motor torque for driving the rear differential 1003 is generated with the use to the stator 1040 and the rotor 1041, and the rotor 1041 is rotated together with the motor shaft 1042.

The stator 1040 is arranged at the outer peripheral side of the electric motor 1004, and is fitted to the inward flange 1021a of the second housing element 1021 with a fitting bolt 1043.

The rotor 1041 is arranged at the inner peripheral side of the electric motor 1004, and is fitted to the outer periphery of the motor shaft 1042.

The motor shaft 1042 is arranged on the rotation axis $O_1$. In addition, the second end portion of the motor shaft 1042 is rotatably supported by the inner periphery of the annular member 1025 via a ball bearing 1044 and a sleeve 1045, and the first end portion of the motor shaft 1042 is rotatably supported by the inner periphery of the third housing element 1022 via a ball bearing 1046. The entirety of the motor shaft 1042 is formed of a cylindrical shaft member through which the rear axle shafts 1106 (shown in FIG. 16) are passed.

An eccentric portion 1042a and an eccentric portion 1042b, both of which are circular in planar view, are formed integrally with the second end portion of the motor shaft 1042. The central axis of the eccentric portion 1042a is an axis $O_2$ (second axis) that is offset from the rotation axis $O_1$ of the motor shaft 1042 by an eccentric amount $\delta_1$. The central axis of the eccentric portion 1042b is an axis $O'_2$ that is offset from the rotation axis $O_1$ by an eccentric amount $\delta_2$ ($\delta1=\delta_2=\delta$). The eccentric portion 1042a and the eccentric portion 1042b are arranged so as to be next to each other along the rotation axis $O_1$ and apart from each other in the circumferential direction around the rotation axis $O_1$ at equal intervals (180°). That is, the eccentric portion 1042a and the eccentric portion 1042b are arranged on the outer periphery of the motor shaft 1042 such that the distance from the axis $O_2$ to the rotation axis $O_1$ and the distance from the axis $O'_2$ to the rotation axis O are equal to each other and the distance between the axis $O_2$ and the axis $O'_2$ in one of the circumferential directions around the rotation axis $O_1$ and the distance between the axis $O_2$ and the axis $O'_2$ in the other circumferential direction around the rotation axis O are equal to each other.

A resolver 1047 is arranged at the first end portion of the motor shaft 1042. The resolver 1047 serves as a rotation angle detector, and is interposed between the outer periphery of the motor shaft 1042 and the inner periphery of the cylindrical portion 1022b. The resolver 1047 has a stator 1470 and a rotor 1471, and is accommodated inside the third housing element 1022. The stator 1470 is fitted to the inner periphery of the cylindrical portion 1022b. The rotor 1471 is fitted to the outer periphery of the motor shaft 1042.

Figure 18:
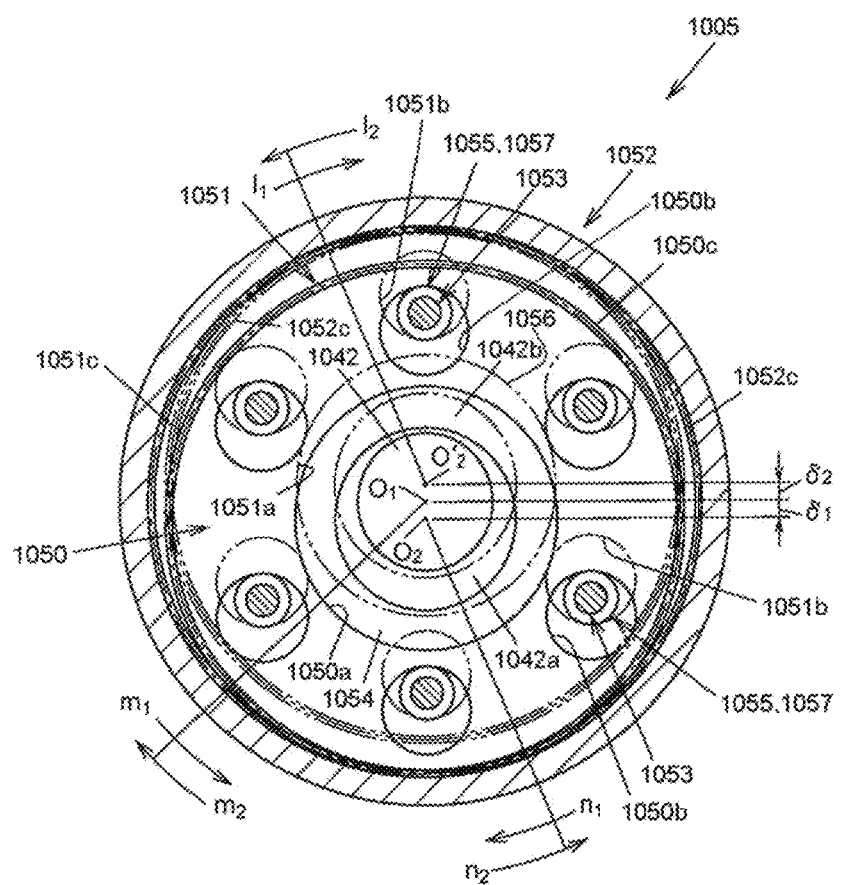
FIG. 18 is a schematic sectional view for illustrating a speed reduction mechanism of the motor torque transmission device according to the fifth embodiment of the invention.
Figure 19:
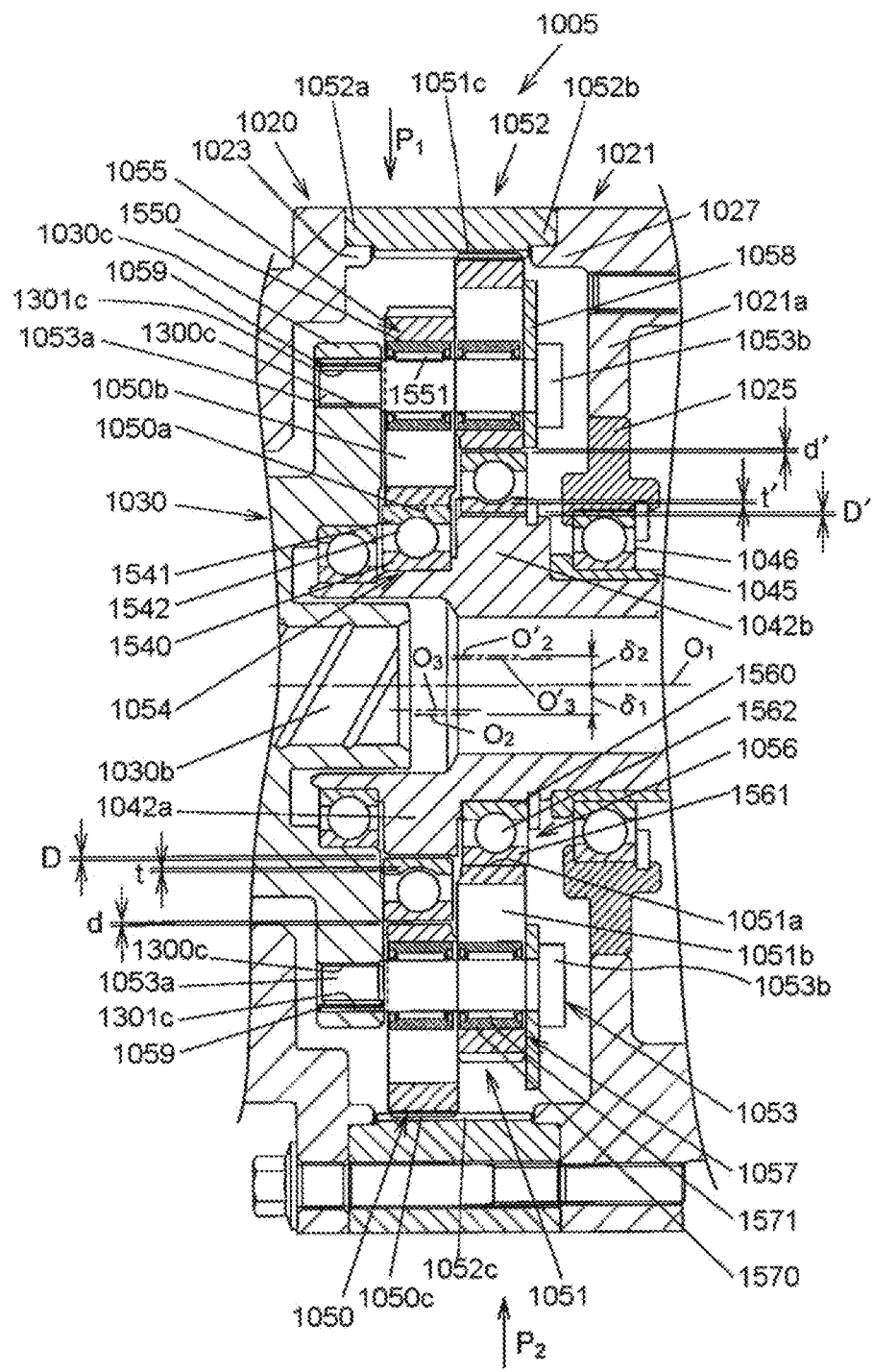
FIG. 19 is a schematic sectional view for illustrating main portions of the speed reduction mechanism in the motor torque transmission device according to the fifth embodiment of the invention.

FIG. 18 and FIG. 19 show the reduction-transmission mechanism. FIG. 20A and FIG. 20B show a state where input members are supported and a state where second bearings are fitted. As shown in FIG. 18 and FIG. 19, the reduction-transmission mechanism 1005 has a pair of input members 1050, 1051, the rotation force applying member 1052 and a plurality of (six in the present embodiment) output members 1053. The reduction-transmission mechanism 1005 is interposed between the rear differential 1003 and the electric motor 1004 (both are shown in FIG. 17). As described above, the reduction-transmission mechanism 1005 is configured to reduce the speed of rotation output from the electric motor 1004 and then transmit the driving force to the rear differential 1003.

As shown in FIG. 19, the input member 1050 is formed of an external gear that has a center hole 1050a of which the central axis coincides with an axis (third axis) $O_3$. The input member 1050 is arranged so as to be closer to the rear differential 1003 (shown in FIG. 17) than the input member 1051. In addition, the input member 1050 is rotatably supported by the motor shaft 1042 via a ball bearing 1054. The ball bearing 1054 may function as a first bearing, and is interposed between the inner periphery of the input member 1050, which defines the center hole 1050a, and the eccentric portion 1042a. The input member 1050 is configured to make circular motion (revolving motion about the rotation axis $O_1$) in the directions of the arrows $m_1$, $m_2$ (shown in FIG. 18) with the eccentric amount δ, upon reception of motor torque from the electric motor 1004. The ball bearing 1054 includes two races (an inner ring 1540 and an outer ring 1541) and rolling elements 1542. The inner ring 1540 is arranged radially inward of the outer ring 1541. The rolling elements 1542 roll between the inner ring 1540 and the outer ring 1541. The inner ring 1540 is fitted to the outer periphery of the eccentric portion 1042a with a clearance (gap) in the radial direction of the motor shaft 1042. The outer ring 1541 is fitted to the inner periphery of the input member 1050, which defines the center hole 1050a, with a clearance (gap) in the radial direction of the motor shaft 1042. That is, the inner ring 1540 is fitted to the outer periphery of the eccentric portion 1042a by clearance fit, and the outer ring 1541 is fitted to the inner periphery of the input member 1050, which defines the center hole 1050a, by clearance fit. Note that FIG. 19 shows a state where a centrifugal force $P_1$ acts on the input member 1050, the inner ring 1540, the outer ring 1541 and the rolling elements 1542.

The input member 1050 has a plurality of (six in the present embodiment) pin insertion holes (through-holes) 1050b that are arranged at equal intervals around the axis $O_3$. The hole diameter of each pin insertion hole 1050b is set to a size that is larger than a size obtained by adding the outside diameter of a needle roller bearing 1055, which may function as a second bearing, to the outside diameter of each output member 1053. The outside diameter of each needle roller bearing 1055 is set to a value that is smaller than the outside diameter of the ball bearing 1054. External teeth 1050c having an involute tooth profile are formed on the outer periphery of the input member 1050.

The external teeth 1050c are configured such that both tooth flanks (both tooth flanks in the circumferential direction of the input member 1050) of each external tooth 1050c function as a revolving force applying face and a rotation force receiving face with respect to both tooth flanks (both tooth flanks in the circumferential direction of the rotation force applying member 1052) of each internal tooth 1052c of the rotation force applying member 1052. The number $Z_1$ of the external teeth 1050c is set to 195 ($Z_1$=195), for example.

As shown in FIG. 19, the input member 1051 is formed of an external gear that has a center hole 1051a of which the central axis coincides with the axis (third axis) $O'_3$. The input member 1051 is arranged so as to be closer to the electric motor 1004 (shown in FIG. 17) than the input member 1050. In addition, the input member 1051 is rotatably supported by the motor shaft 1042 via a ball bearing 1056. The ball bearing 1056 may function as a first bearing, and arranged between the inner periphery of the input member 1051, which defines the center hole 1051a, and the eccentric portion 1042b. The input member 1051 is configured to make circular motion (revolving motion about the rotation axis $O_1$) in the directions of the arrows $m_1$, $m_2$ (shown in FIG. 18) with the eccentric amount δ, upon reception of motor torque from the electric motor 1004. The ball bearing 1056 includes two races (an inner ring 1560 and an outer ring 1561) and rolling elements 1562. The inner ring 1560 is arranged radially inward of the outer ring 1561. The rolling elements 1562 roll between the inner ring 1560 and the outer ring 1561. The inner ring 1560 is fitted to the outer periphery of the eccentric portion 1042b with a clearance (gap) in the radial direction of the motor shaft 1042. The outer ring 1561 is fitted to the inner periphery of the input member 1051, which defines the center hole 1051a, with a clearance (gap) in the radial direction of the motor shaft 1042. That is, the inner ring 1560 is fitted to the outer periphery of the eccentric portion 1042b by clearance fit, and the outer ring 1561 is fitted to the inner periphery of the input member 1051, which defines the center hole 1051a, by clearance fit. Note that FIG. 19 shows a state where a centrifugal force $P_2$ acts on the input member 1051, the inner ring 1560, the outer ring 1561 and the rolling elements 1562.

The input member 1051 has a plurality of (six in the present embodiment) pin insertion holes (through-holes) 1051b that are arranged at equal intervals around the axis $O'_3$. The hole diameter of each pin insertion hole 1051b is set to a size that is larger than a size obtained by adding the outside diameter of a needle roller bearing 1057, which may function as a second bearing, to the outside diameter of each output member 1053. The outside diameter of each needle roller bearing 1057 is set to a size that is smaller than the outside diameter of the ball bearing 1056. External teeth 1051c having an involute tooth profile are formed on the outer periphery of the input member 1051.

The external teeth 1051c are configured such that both tooth flanks (both tooth flanks in the circumferential direction of the input member 1051) of each external tooth 1051c function as a revolving force applying face and a rotation force receiving face with respect to both tooth flanks (both tooth flanks in the circumferential direction of the rotation force applying member 1052) of each internal tooth 1052c of the rotation force applying member 1052. The number $Z_2$ ($Z_2$=$Z_1$) of the external teeth 1051c is set to 195, for example.

The rotation force applying member 1052 is formed of an internal gear of which the central axis coincides with the rotation axis $O_1$. The rotation force applying member 1052 is interposed between the first housing element 1020 and the second housing element 1021. The entirety of the rotation force applying member 1052 is formed of an open-end cylindrical member that constitutes part of the housing 1002 and that is open toward both sides in the direction of the rotation axis $O_1$. The rotation force applying member 1052 is in mesh with the input members 1050, 1051. The rotation force applying member 1052 is configured to apply rotation force in the directions of the arrows $n_1$, $n_2$ to the input member 1050 that makes revolving motion upon reception of motor torque from the electric motor 1004, and to apply rotation force in the directions of the arrows $l_1$, $l_2$ to the input member 1051 that makes revolving motion upon reception of motor torque from the electric motor 1004.

The inner periphery of the rotation force applying member 1052 has a first fitting portion 1052a and a second fitting portion 1052b that are located at a predetermined distance in the direction of the rotation axis $O_1$. The first fitting portion 1052a is fitted to the outer periphery of the protrusion 1023. The second fitting portion 1052b is fitted to the outer periphery of the protrusion 1027. In addition, the inner periphery of the rotation force applying member 1052 has internal teeth 1052c having an involute tooth profile. The internal teeth 1052c are located between the first fitting portion 1052a and the second fitting portion 1052b, and are in mesh with the external teeth 1050c of the input member 1050 and the external teeth 1051c of the input member 1051. The number $Z_3$ of the internal teeth 1052c is set to 208 ($Z_3$=208), for example. Thus, the reduction gear ratio α of the reduction-transmission mechanism 1005 is calculated according to an equation, $α=Z_2/(Z_3-Z_2)$.

Figure 21A:
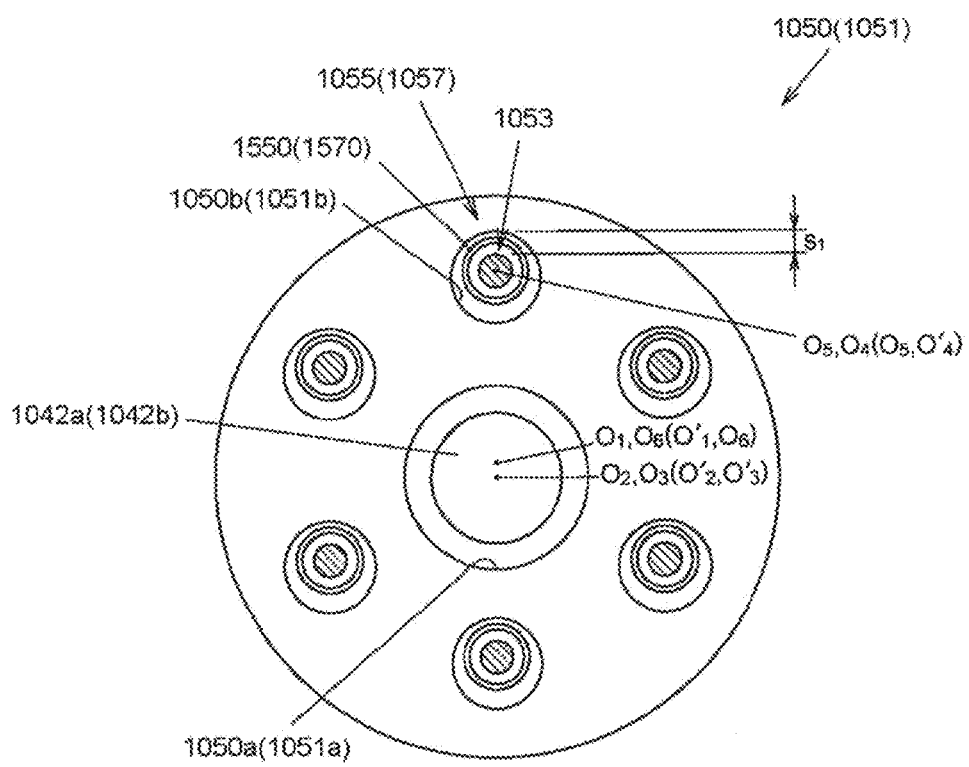
Figure 21B:
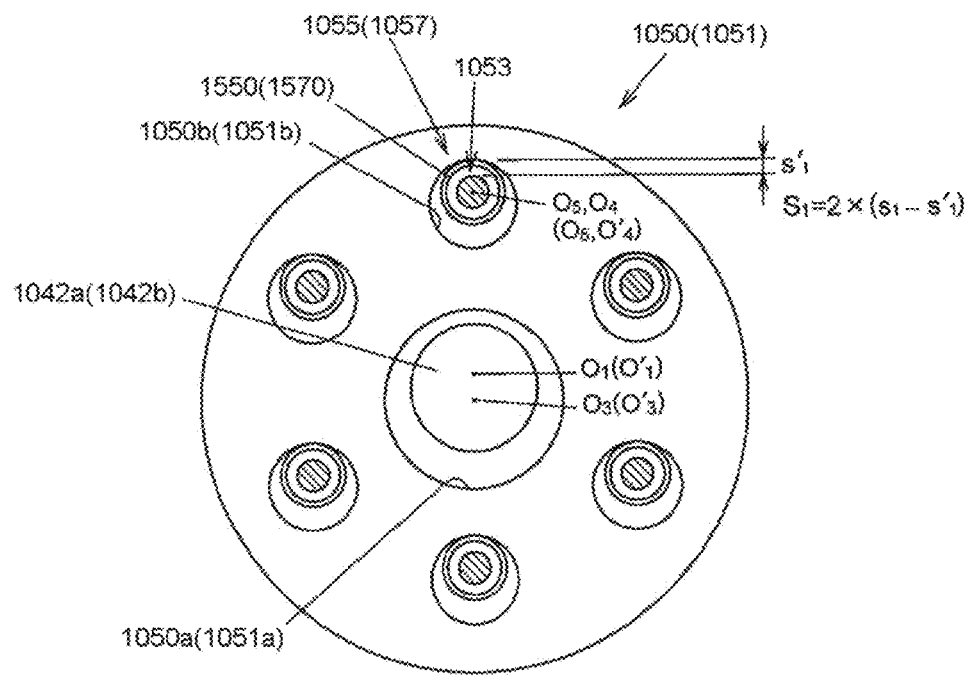
Figure 22A:
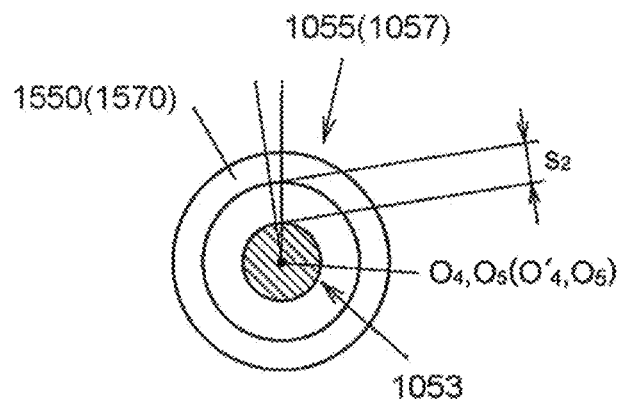
Figure 22B:
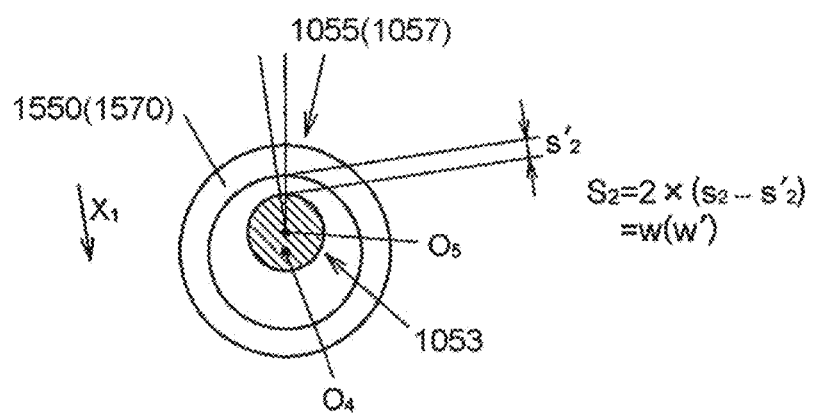
Figure 23A:
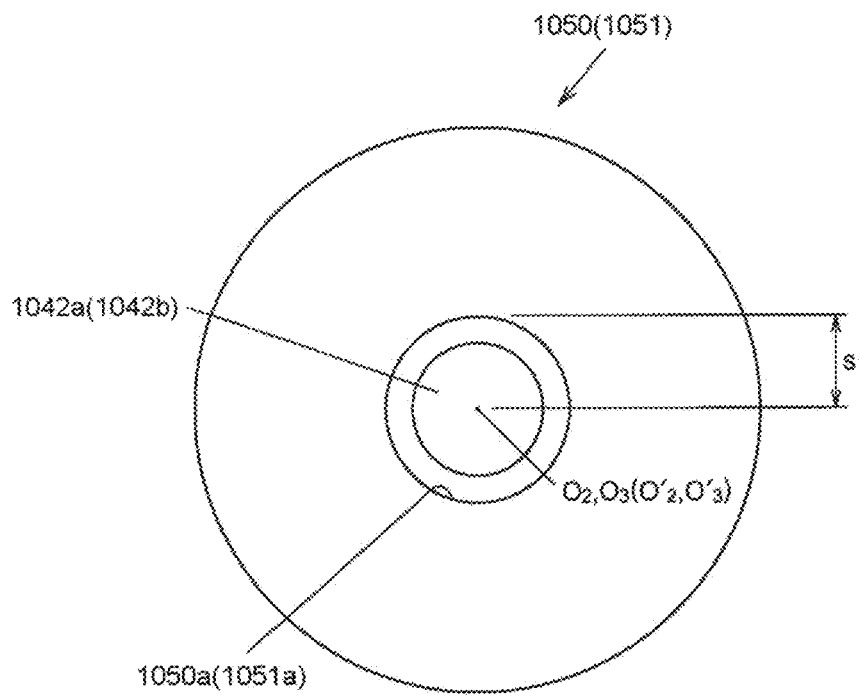
Figure 23B:
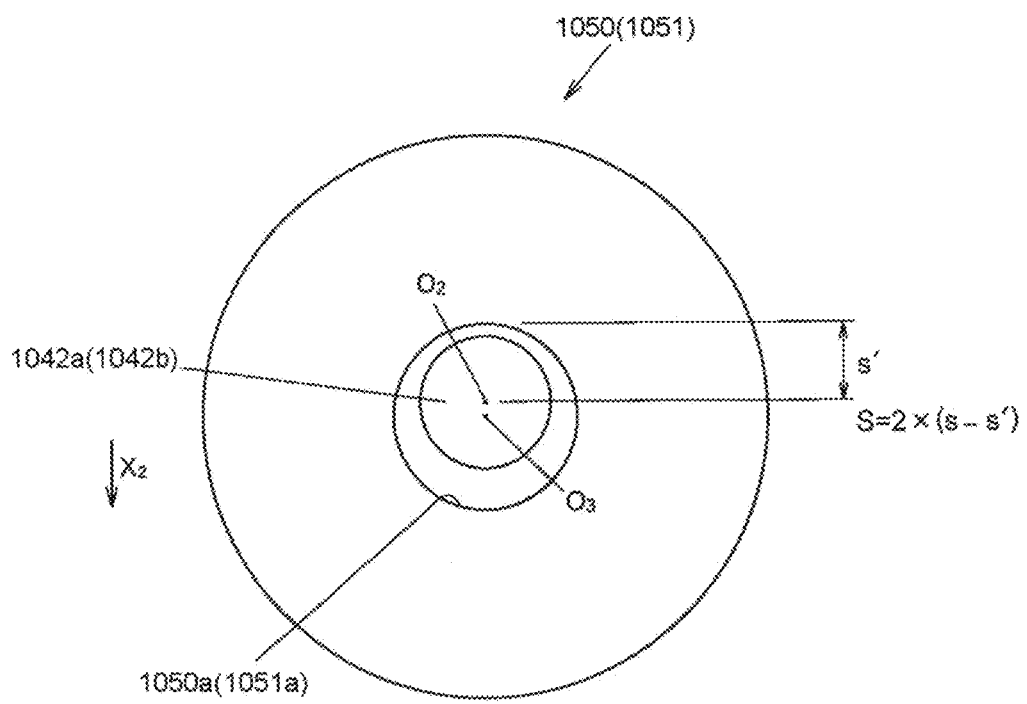
Figure 24A:
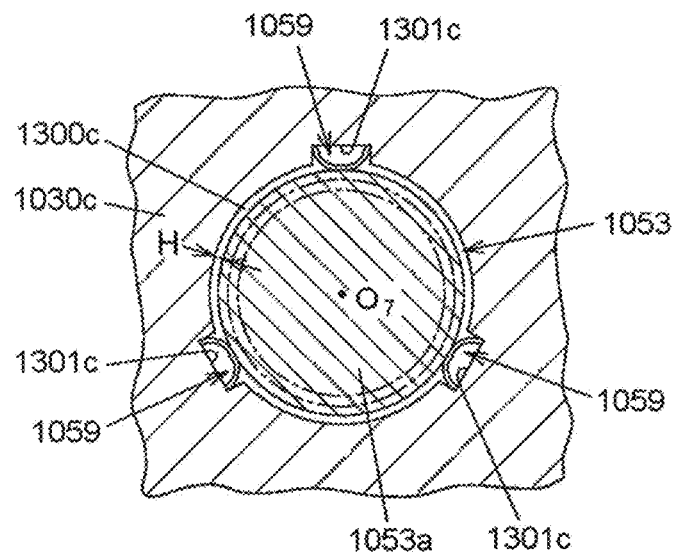
FIG. 24A is a sectional view showing a state where elastic members used in the speed reduction mechanism are fitted in the motor torque transmission device according to the fifth embodiment of the invention.
Figure 24B:
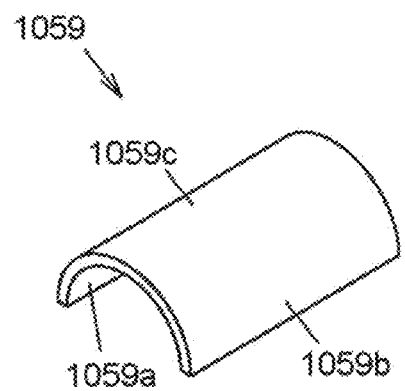
FIG. 24B is a perspective view of each elastic member.

FIG. 21A and FIG. 21B show a fitting clearance of each second bearing. FIG. 22A and FIG. 22B show an operating clearance of a radial internal clearance in each second bearing. FIG. 23A and FIG. 23B show a fitting clearance of each first bearing and an operating clearance of a radial internal clearance in each first bearing. FIG. 24A and FIG. 24B show the elastic members and the state where the elastic members are fitted. As shown in FIG. 17 and FIG. 21 to FIG. 23, the output members 1053 are bolts each having a threaded portion 1053a at one end and a head 1053b at the other end. The threaded portions 1053a of the output members 1053 are passed through the pin insertion holes 1050b of the input member 1050 and the pin insertion holes 1051b of the input member 1051 and then fitted in the pin fitting holes 1300c of the differential case 1030.

In addition, the output members 1053 are arranged so as to be passed through an annular spacer 1058 that is interposed between each head 1053b and the input member 1051. The output members 1053 each are arranged at such a position that a size S' (not shown) that is the sum of fitting clearances $S_0$ (in the present embodiment, $S_0$=0), $S_1$ of each of the needle roller bearings 1055, 1057 with respect to the corresponding one of the input members 1050, 1051 and a radial internal clearance $S_2$ ($S_2$=w: operating clearance) is smaller than a size S that is the sum of fitting clearances $S_3$, $S_4$ (both are not shown) of each of the ball bearings 1054, 1056 with respect to the corresponding one of the input members 1050, 1051 and a radial internal clearance $S_5$ ($S_5$=t: operating clearance) ($S=S_3+S_4+S_5>S_0+S_1+S_2=S'$). With this configuration, when the input members 1050, 1051 move in the directions of the centrifugal forces $P_1$, $P_2$ upon reception of loads due to the centrifugal forces $P_1$, $P_2$ that are generated on the basis of the circular motions of the input members 1050, 1051, the inner peripheries of the input members 1050, 1051, which define the pin insertion holes 1050b, 1051b, contact the outer peripheries of the output members 53 via the needle roller bearings 1055, 1057 before the inner peripheries of the input members 1050, 1051, which define the center holes 1050a, 1051a, contact the outer peripheries of the eccentric portions 1042a, 1042b via the ball bearings 1054, 1056, respectively.

The fitting clearance $S_1$ is formed between the outer periphery of an outer ring 1550 of each needle roller bearing 1055 and the inner periphery of the input member 1050, which defines a corresponding one of the pin insertion holes 1050b. The fitting clearance $S_1$ is formed between the outer periphery of an outer ring 1570 of each needle roller bearing 1057 and the inner periphery of the input member 1051, which defines a corresponding one of the pin insertion holes 1051b.

The fitting clearance $S_3$ is formed between the inner periphery of the input member 1050, which defines the center hole 1050a, and the outer periphery of the outer ring 1541 of the ball bearing 1054. The fitting clearance $S_3$ is also formed between the inner periphery of the input member 1051, which defines the center hole 1051a, and the outer periphery of the outer ring 1561 of the ball bearing 1056.

The fitting clearance $S_4$ is formed between the inner periphery of the inner ring 1540 of the ball bearing 1054 and the outer periphery of the eccentric portion 1042a. The fitting clearance $S_4$ is also formed between the inner periphery of the inner ring 1560 of the ball bearing 1056 and the outer periphery of the eccentric portion 1042b.

In addition, the output members 1053 each are arranged at a position at which the output member 1053 receives elastic force that is generated by the plurality of (three in the present embodiment) elastic members 1059 (shown in FIG. 24) radially from the differential case 1030 side. The output members 1053 are configured to receive rotation force, applied by the rotation force applying member 1052, from the input members 1050, 1051, and then output the rotation force to the differential case 1030 as the torque of the differential case 1030.

The needle roller bearing 1055 is fitted to the outer periphery of each output member 1053 at a portion between the threaded portion 1053a and the head 1053b. The needle roller bearing 1055 is used to reduce contact resistance between each output member 1053 and the inner periphery of the input member 1050, which defines the corresponding pin insertion hole 1050b. In addition, the needle roller bearing 1057 is fitted to the outer periphery of each output member 1053 at a portion between the threaded portion 1053a and the head 1053b. The needle roller bearing 1057 is used to reduce contact resistance between each output member 1053 and the inner periphery of the input member 1051, which defines the corresponding pin insertion hole 1051b.

The needle roller bearings 1055 each have an inner ring raceway surface on the outer periphery of a corresponding one of the output members 1053, and each have the race (outer ring) 1550 and needle rollers 1551. The race 1550 is able to contact the inner periphery of the input member 1050, which defines a corresponding one of the pin insertion holes 1050b. The needle rollers 1551 roll between the inner periphery of the race 1550 and the inner ring raceway surface of a corresponding one of the output members 1053. The needle roller bearings 1057 each have an inner ring raceway surface on the outer periphery of a corresponding one of the output members 1053, and each have the race (outer ring) 1570 and needle rollers 1571. The race 1570 is able to contact the inner periphery of the input member 1051, which defines a corresponding one of the pin insertion holes 1051b. The needle rollers 1571 roll between the inner periphery of the race 1570 and the inner ring raceway surface of a corresponding one of the output members 1053.

As shown in FIG. 24A, the elastic members 1059 each are interposed between the bottom of a corresponding one of the grooves 1301c, formed in the differential case 1030 (shown in FIG. 17), and the outer periphery of the threaded portion 1053a. In addition, as shown in FIG. 24B, each of the elastic members 1059 has first contact portions 1059a, 1059b and a second contact portion 1059c. The first contact portions 1059a, 1059b serve as fitted portions that are fitted to the fitting portion of the groove 1301c, and are formed at respective circumferential end portions of each elastic member 1059. The second contact portion 1059c serves as an elastic force applying portion, and is formed in the circumferential middle portion of each elastic member 1059. The entirety of each elastic member 1059 is formed of a substantially semi-cylindrical member (spring member having a U-shape in cross section) made of, for example, a steel leaf spring. The elastic members 1059 are fitted to the fitting portions in a deflected state in which the second contact portion 1059c of each of the elastic members 1059 contacts the outer periphery of the threaded portion 1053a of the output member 1053 and the first contact portions 1059a, 1059b contact respective groove walls in the corresponding groove 1301c of the differential case 1030 (flange 1030c). With this configuration, the output members 1053 (threaded portions 1053a) each are arranged such that a radial distance H (shown in FIG. 24A) between the outer periphery of each output member 1053 and the inner periphery of the flange 1030c, which defines the corresponding pin fitting hole 1300c is maintained substantially uniform distance along the circumferential direction. That is, the output members 1053 are arranged at an equal distance from the rotation axis $O_6$ (shown in FIG. 20) of the differential case 1030, along a common circumference in a rotation plane of the differential case 1030 (shown in FIG. 17) while each having an axis $O_7$ parallel to the rotation axis $O_6$. The elastic members 1059 each may be a laminated spring instead of a leaf spring.

The fitting clearance $S_0+S_1$ (in the present embodiment, because $S_0=0$, $S_0+S_1=S_1$), the radial internal clearance $S_2$ of each second bearing (needle roller bearing 1055, 1057) and the size S ($S=S_3+S_4+S_5$) will be described separately for the input member 1050 and the input member 1051.

On the input member 150 side, as shown in FIG. 21A and FIG. 21B, the fitting clearance $S_1$ is set to a size ($S_1=2\times(s_1-s'_1)$) that is obtained by doubling a distance from an initial position (position shown in FIG. 21A) of each output member 1053 to a position (position shown in FIG. 21B) at which the output member 1053 is located closest to the inner periphery, which defines a corresponding one of the pin insertion holes 1050b, after being moved relative to the input member 1050 in a state where an axis (fifth axis) $O_5$ coincidences with an axis (fourth axis) $O_4$ of the outer ring 1550. At the initial position, in a state where the axis $O_5$ and the axis $O_4$, the rotation axis $O_6$ and the rotation axis $O_1$ and the axis $O_2$ and the axis $O_3$ respectively coincide with each other, each output member 1053 is arranged at one side in an aperture plane (upper side in an aperture plane in FIG. 21A) of a corresponding one of the pin insertion holes 1050b.

As shown in FIG. 22A and FIG. 22B, the radial internal clearance $S_2$ is set to a size ($S_2=2\times(s_2-s'_2)$) that is obtained by doubling a distance from a position (initial position shown in FIG. 22A), at which the outer ring 1550 of the needle roller bearing 1055 is located such that its axis $O_4$ coincides with the axis (fifth axis) $O_5$ of the output member 1053, to a position (moved position shown in FIG. 22B) at which the outer ring 1550 of the needle roller bearing 1055 is located closest to the output member 1053 after being moved in the radial direction (first direction $X_1$) of the output member 1053. As shown in FIG. 20, when the size ($R_1-R_3$) from the initial position of the outer ring 1550 to the moved position of the outer ring 1550 is used, $S_2=2\times(R_1-R_3)$. In this case, the internal clearance $S_2$ is an operating clearance w of each needle roller bearing 1055. The size $R_1$ is a distance from the axis $O_6$ to the outer periphery of the outer ring 1550 (a portion farthest from the axis $O_6$) when the outer ring 1550 is at the initial position. The size $R_2$ is a distance from the axis $O_6$ to the outer periphery of the outer ring 1550 (a portion closest to the axis $O_6$) when the outer ring 1550 is at the moved position.

As shown in FIG. 23A and FIG. 23B, the size S is set to a size ($S=2\times(s-s')$) that is obtained by doubling a distance from a position (initial position shown in FIG. 23A), at which the input member 1050 is located such that its axis $O_3$ coincides with the axis $O_2$, to a position (moved position shown in FIG. 23B) at which the input member 1050 is located closest to the eccentric portion 1042a after being moved in the radial direction (second direction $X_2$). In this case, as shown in FIG. 20, if a size obtained by subtracting the outside diameter of the eccentric portion 1042a from the inside diameter of the inner ring 1540 is D, a size obtained by subtracting the outside diameter of the outer ring 1541 from the inside diameter of the input member 1050, which defines the center hole 1050a, is d, and the operating clearance of the radial internal clearance in the ball bearing 1054 is t, the size S is expressed by S=D+d+t.

Similarly, on the input member 1051 side, as shown in FIG. 21A and FIG. 21B, the fitting clearance $S_1$ is set to a size ($S_1=2\times(s_1-s'_1)$) that is obtained by doubling a distance from an initial position (position shown in FIG. 21A) of each output member 1053 to a position (position shown in FIG. 21B) at which the output member 1053 is located closest to the inner periphery, which defines a corresponding one of the pin insertion holes 1051b, after being moved relative to the input member 1051 in a state where the axis (fifth axis) $O_5$ coincidences with an axis (fourth axis) $O'_4$ of the outer ring 1570. At the initial position, in a state where the axis $O_5$ and the axis $O'_4$, the rotation axis $O_6$ and the rotation axis $O'_1$ and the axis $O'_2$ and the axis $O'_3$ respectively coincidence with each other, each output member 1053 is arranged at one side in an aperture plane (upper side in an aperture plane in FIG. 21A) of a corresponding one of the pin insertion holes 1051b.

As shown in FIG. 22A and FIG. 22B, the internal clearance $S_2$ is set to a size ($S_2=2\times(s_2-s'_2)$) that is obtained by doubling a distance from a position (initial position shown in FIG. 22A), at which the outer ring 1570 of the needle roller bearing 1057 is located such that its axis $O'_4$ coincides with the axis (fifth axis) $O_5$ of the output member 1053, to a position (moved position shown in FIG. 22B) at which the outer ring 1570 of the needle roller bearing 1057 is located closest to the output member 1053 after being moved in the radial direction (first direction $X_1$) of the output member 1053. As shown in FIG. 20, when the size ($R_4-R_2$) from the initial position of the outer ring 1570 to the moved position of the outer ring 1570 is used, $S_2=2\times(R_4-R_2)$. In this case, the radial internal clearance $S_2$ is an operating clearance w' of each needle roller bearing 57. The size $R_4$ is a distance from the axis $O_6$ to the outer periphery of the outer ring 1570 (a portion closest to the axis $O_6$) when the outer ring 1570 is at the initial position. The size $R_2$ is a distance from the axis $O_6$ to the outer periphery of the outer ring 1570 (a portion closest to the axis $O_6$) when the outer ring 1570 is at the moved position.

As shown in FIG. 23A and FIG. 23B, the size S is set to a size ($S=2\times(s-s')$) that is obtained by doubling a distance from a position (initial position shown in FIG. 23A), at which the input member 1051 is located such that its axis $O'_3$ coincides with the axis $O'_2$, to a position (moved position shown in FIG. 23B) at which the input member 1051 is located closest to the eccentric portion 1042b after being moved in the radial direction (second direction $X_2$). In this case, as shown in FIG. 20, if a size obtained by subtracting the outside diameter of the eccentric portion 1042b from the inside diameter of the inner ring 1560 is D', a size obtained by subtracting the outside diameter of the outer ring 1561 from the inside diameter of the input member 1051, which defines the center hole 1051a, is d', and the operating clearance of the radial internal clearance in the ball bearing 1056 is t', the size S is expressed by S=D'+d'+t'.

Next, the operation of the motor torque transmission device according to the present embodiment will be described with reference to FIG. 16 to FIG. 20. In FIG. 17, when electric power is supplied to the electric motor 1004 of the motor torque transmission device 1 to drive the electric motor 1004, the motor torque is applied to the reduction-transmission mechanism 1005 via the motor shaft 1042. Thus, the reduction-transmission mechanism 1005 is actuated.

Therefore, in the reduction-transmission mechanism 1005, the input members 1050, 1051 each make circular motion with the eccentric amount 6, for example, in the direction of the arrow $m_1$ shown in FIG. 18.

Accordingly, the input member 1050 rotates about the axis $O_2$ (the direction of the arrow $n_1$ shown in FIG. 18) while the external teeth 1050c are meshed with the internal teeth 1052c of the rotation force applying member 1052, and the input member 1051 rotates about the axis $O'_2$ (the arrow $l_1$ direction shown in FIG. 18) while the external teeth 1051c are meshed with the internal teeth 1052c of the rotation force applying member 1052. In this case, due to the rotation of the input members 1050, 1051, the inner peripheries of the input member 1050, which define the pin insertion holes 1050b, contact the races 1550 of the needle roller bearings 1055, and the inner peripheries of the input member 1051, which define the pin insertion holes 1051b, contact the races 1570 of the needle roller bearings 1057.

Therefore, the revolving motions of the input members 1050, 1051 are not transmitted to the output members 1053 and only the rotating motions of the input members 1050, 1051 are transmitted to the output members 1053. Rotation force resulting from the rotating motions is output from the input members 1050, 1051 to the differential case 1030 as the torque of the differential case 1030.

In this way, the rear differential 1003 is actuated, and driving force based on the motor torque of the electric motor 1004 is distributed to the rear axle shafts 1106 shown in FIG. 16, and transmitted to the right and left rear wheels 1105.

As the motor torque transmission device 1001 operates, the centrifugal force $P_1$ acts on the input member 1050 on the basis of the circular motion of the input member 1050, and the centrifugal force $P_2$ acts on the input member 1051 on the basis of the circular motion of the input member 1051.

Accordingly, the input member 1050 moves in a direction in which the centrifugal force $P_1$ acts (for example, downward in FIG. 10), and the input member 1051 moves in a direction in which the centrifugal force $P_2$ acts (for example, upward in FIG. 20).

In this case, as shown in FIG. 19 and FIG. 20, when the input member 1050 moves in the direction in which the centrifugal force $P_1$ acts, upon reception of a load due to the centrifugal force $P_1$ that is generated on the basis of the circular motion of the input member 1050, the inner peripheries of the input member 1050, which define the pin insertion hole 1050b, contact the outer peripheries of the output members 1053 via the needle roller bearings 1055 before the inner periphery of the input member 1050, which define the center hole 1050a, contacts the outer periphery of the eccentric portion 1042a via the ball bearing 1054. Thus, the load due to the centrifugal force $P_1$ from the input member 1050 is dispersed and then received by the plurality of needle roller bearings 1055. Therefore, application of the load due to the centrifugal force $P_1$ from the input member 1050 to the ball bearing 1054 is suppressed.

Similarly, as shown in FIG. 19 and FIG. 20, when the input member 1051 moves in the direction in which the centrifugal force $P_2$ acts, upon reception of a load due to the centrifugal force $P_2$ that is generated on the basis of the circular motion of the input member 1051, the inner peripheries of the input member 1051, which define the pin insertion hole 1051b, contact the outer peripheries of the output members 1053 via the needle roller bearings 1057 before the inner periphery of the input member 1051, which define the center hole 1051a, contacts the outer periphery of the eccentric portion 1042b via the ball bearing 1056. Thus, the load due to the centrifugal force $P_2$ from the input member 1051 is dispersed and then received by the plurality of needle roller bearings 1057. Therefore, application of the load due to the centrifugal force $P_2$ from the input member 1051 to the ball bearing 1056 is suppressed.

Therefore, according to the present embodiment, it is no longer necessary to employ bearings having high durability as the ball bearings 1054, 1056.

In the above-described embodiment, the description is made on the case where the motor torque transmission device 1001 is actuated by causing the input members 1050, 1051 to make circular motion in the direction of the arrow $m_1$. However, the motor torque transmission device 1001 may be actuated in the same manner as that in the above-described embodiment even when the input members 1050, 1051 are caused to make circular motion in the direction of the arrow $m_2$. In this case, the rotating motion of the input member 1050 is made in the direction of the arrow $n_2$, and the rotating motion of the input member 1051 is made in the direction of the arrow $l_2$.

According to the above described fifth embodiment, the following advantageous effects are obtained.

(1) It is no longer necessary to employ bearings having high durability as the ball bearings 1054, 1056. Therefore, it is possible to reduce cost.

(2) Application of the loads due to the centrifugal forces $P_1$, $P_2$ to the ball bearings 1054, 1056 is suppressed. Therefore, it is possible to extend the service life of each of the ball bearings 1054, 1056.

In the present embodiment, the description is made on the case where the size S' is set to S'=$S_1$+$S_2$. However, the invention is not limited to this configuration. The size S' may be set to S'=$S_2$.

Figure 25:
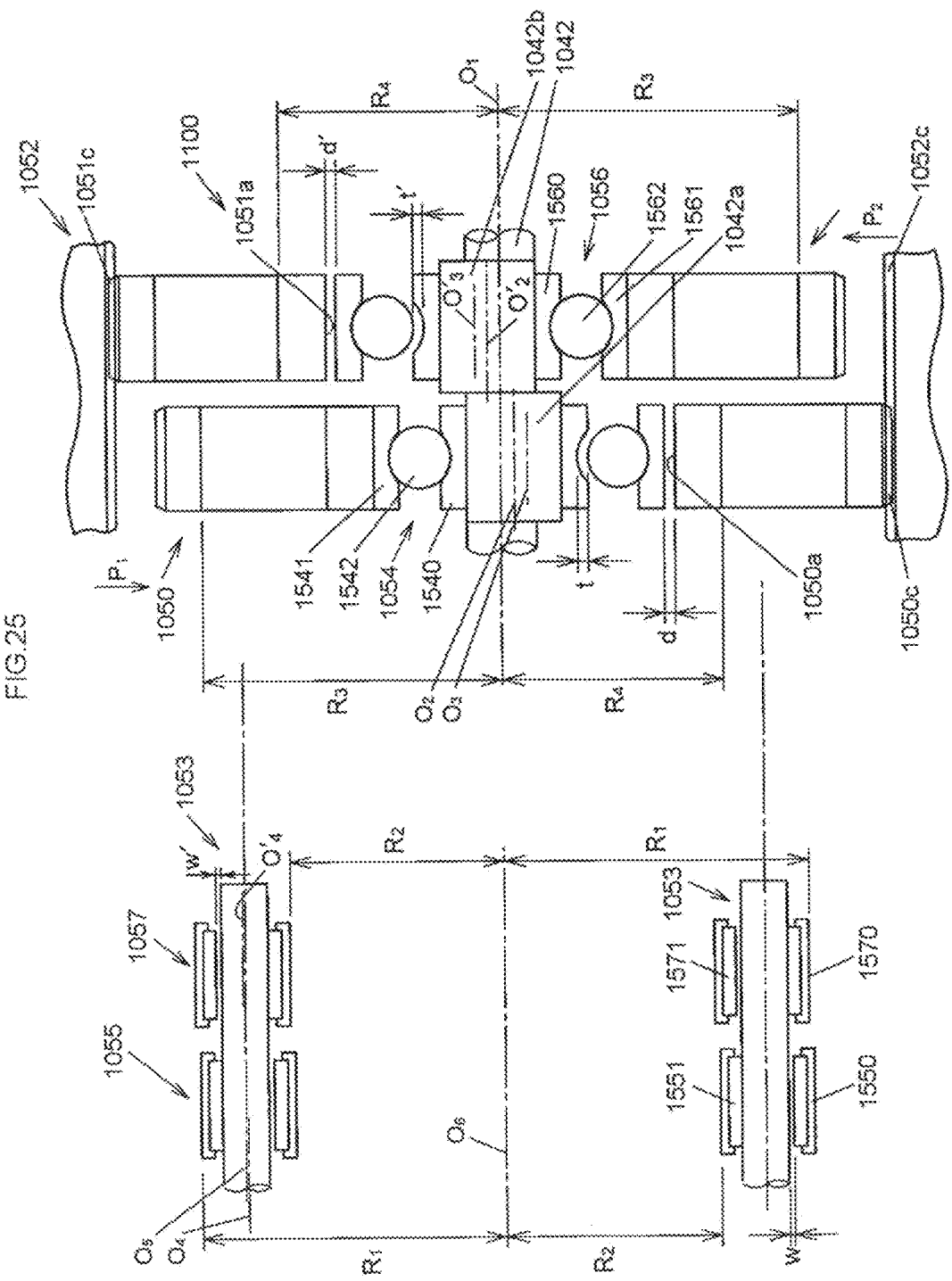
FIG. 25 is a simplified sectional view showing a state where the input members are supported by the respective eccentric portions of the speed reduction mechanism and a state where the second bearings are fitted to the respective output members in a motor torque transmission device according to a sixth embodiment of the invention.

Next, a speed reduction mechanism in a motor torque transmission device according to a sixth embodiment of the invention will be described with reference to FIG. 25. FIG. 25 shows a state where input members are supported and a state where second bearings are fitted. In FIG. 25, the members having the functions which are the same as or equivalent to those in FIG. 20 are denoted by the same reference numerals are those in FIG. 20, and the detailed description is omitted.

As shown in FIG. 25, a reduction-transmission mechanism 1100 (partially shown) according to the sixth embodiment of the invention is characterized in that the inner rings 1540, 1560 of the ball bearings 1054, 1056 are fitted to the outer peripheries of the eccentric portions 1042a, 1042b by interference fit, and the outer rings 1541, 1561 are fitted to the inner peripheries of the input members 1050, 1051, which define the center holes 1050a, 1051a, by clearance fit.

Therefore, on the input member 1050 side, if a size obtained by subtracting the outside diameter of the outer ring 1541 from the inside diameter of the input member 1050, which defines the center hole 1050a, is d and the operating clearance of the radial internal clearance in the ball bearing 1054 is t, the size S (shown in FIG. 23A and FIG. 23B) is set to S=d+t.

In addition, if the operating clearance of the radial internal clearance in the needle roller bearing 1055 is w, the internal clearance $S_2$ (shown in FIG. 22A and FIG. 22B) is set to $S_2$=w.

Similarly, on the input member 1051 side, if a size obtained by subtracting the outside diameter of the outer ring 1561 from the inside diameter of the input member 1051, which defines the center hole 1051a, is d' and the operating clearance of the radial internal clearance in the ball bearing 1056 is t', the size S is set to S=d'+t'.

In addition, if the operating clearance of the radial internal clearance in the needle roller bearing 1057 is w', the internal clearance $S_2$ is set to $S_2$=w'.

In the thus configured reduction-transmission mechanism 1100, when the input member 1050 moves in the direction of the centrifugal force $P_1$ upon reception of a load due to the centrifugal force $P_1$ that is generated on the basis of the circular motion of the input member 1050, the load due to the centrifugal force $P_1$ from the input member 1050 is dispersed and then received by the plurality of needle roller bearings 1055.

In addition, when the input member 1051 moves in the direction of the centrifugal force $P_2$ upon reception of a load due to the centrifugal force $P_2$ that is generated on the basis of the circular motion of the input member 1051, the load due to the centrifugal force $P_2$ from the input member 1051 is dispersed and then received by the plurality of needle roller bearings 1057.

Therefore, in the present embodiment, as in the case of the fifth embodiment, application of the load due to the centrifugal force $P_1$ from the input member 1050 to the ball bearing 1054 and application of the load due to the centrifugal force $P_2$ from the input member 1051 to the ball bearing 1056 are suppressed. As a result, it is no longer necessary to employ bearings having high durability as the ball bearings 1054, 1056.

According to the above-described sixth embodiment, similar advantageous effects to those of the fifth embodiment are obtained.

In the present embodiment, the description is made on the case where the ball bearing 1054 that is formed of the inner ring 1540 arranged radially outward of the eccentric portion 1042a, the outer ring 1541 arranged radially outward of the inner ring 1540 and the rolling elements 1542 interposed between the outer ring 1541 and the inner ring 1540 is used as the first bearing and the ball bearing 1056 that is formed of the inner ring 1560 arranged radially outward of the eccentric portion 1042b, the outer ring 1561 arranged radially outward of the inner ring 1560 and the rolling elements 1562 interposed between the outer ring 1561 and the inner ring 1560 is used as the first bearing. However, the invention is not limited to this configuration. Ball bearings each of which has an inner ring raceway surface formed on the outer periphery of the eccentric portion and each of which is formed of an outer ring arranged radially outward of the inner ring raceway surface and rolling elements interposed between the outer ring and the inner ring raceway surface may be employed as the first bearings. In this case, when the outer ring is fitted to the inner periphery of the input member, which defines the center hole, by clearance fit, the size S is set to S=d+t, d'+t', as in the above-described embodiment. In contrast to this, when the outer ring is fitted to the inner periphery of the input member, which defines the center hole, by interference fit, the size S is set to S=t, t'.

In addition, in the present embodiment, the description is made on the case where the size S' is set to S'=$S_1+S_2$. However, the invention is not limited to this configuration. The size S' may be set to S'=$S_2$.

Figure 26:
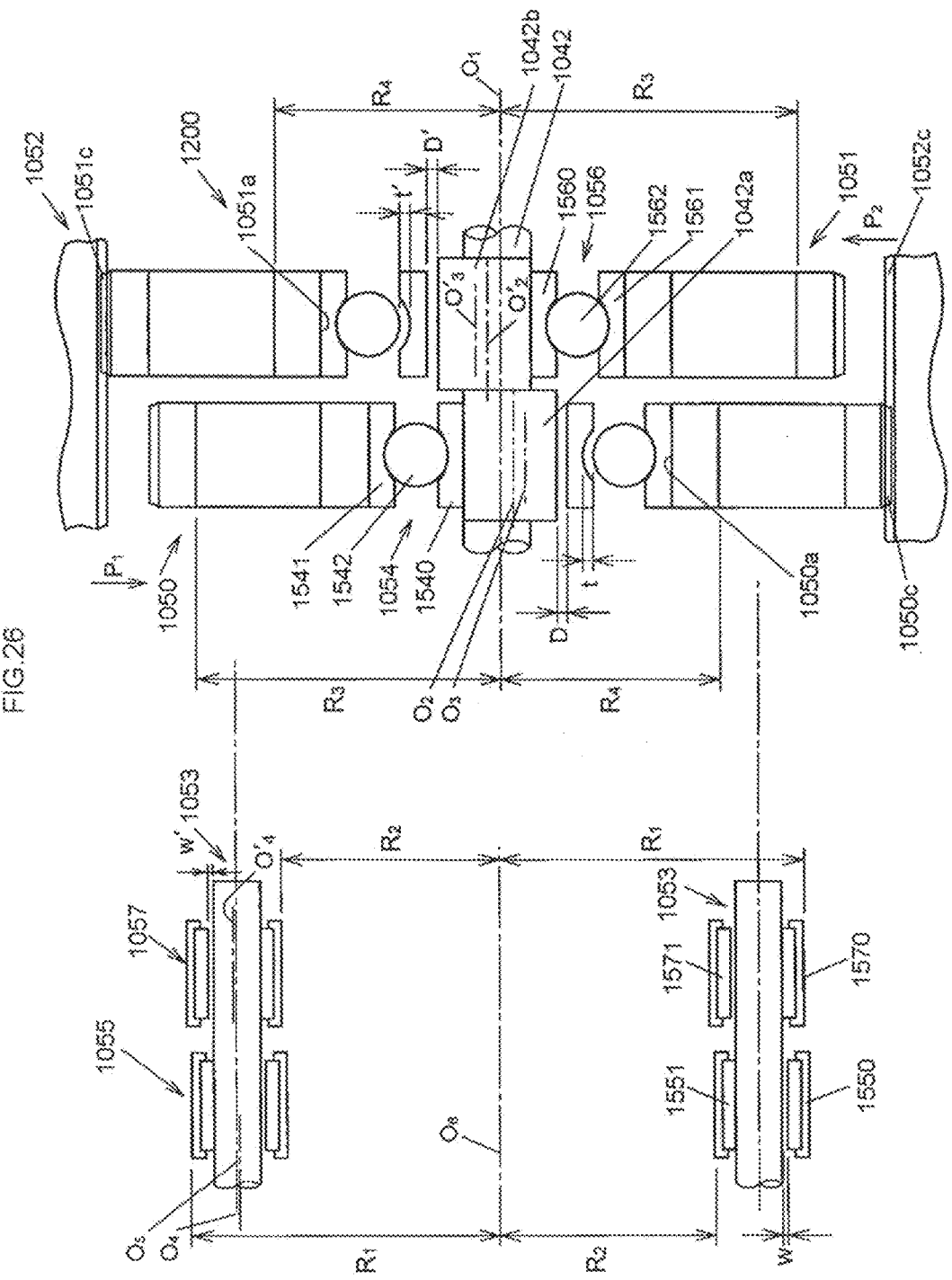
FIG. 26 is a simplified sectional view showing a state where the input members are supported by the respective eccentric portions of the speed reduction mechanism and a state where the second bearings are fitted to the respective output members in a motor torque transmission device according to a seventh embodiment of the invention.

Next, a speed reduction mechanism in a motor torque transmission device according to a seventh embodiment of the invention will be described with reference to FIG. 26. FIG. 26 shows a state where input members are supported and a state where second bearings are fitted. In FIG. 26, the members having the functions which are the same as or equivalent to those in FIG. 20 are denoted by the same reference numerals are those in FIG. 20, and the detailed description is omitted.

As shown in FIG. 26, a reduction-transmission mechanism 1200 (partially shown) according to the seventh embodiment of the invention is characterized in that the inner rings 1540, 1560 of the ball bearings 1054, 1056 are fitted to the outer peripheries of the eccentric portions 1042a, 1042b by clearance fit. In addition, the reduction-transmission mechanism 1200 is characterized in that the outer rings 1541, 1561 are fitted to the inner peripheries of the input members 1050, 1051, which define the center holes 1050a, 1051a, by interference fit.

Therefore, on the input member 1050 side, if a size obtained by subtracting the outside diameter of the eccentric portion 1042a from the inside diameter of the inner ring 1540 is D and the operating clearance of the radial internal clearance in the ball bearing 1054 is t, the size S (shown in FIG. 23A and FIG. 23B) is set to S=D+t.

In addition, if the operating clearance of the radial internal clearance in the needle roller bearing 1055 is w, the internal clearance $S_2$ (shown in FIG. 22A and FIG. 22B) is set to $S_2$=w.

Similarly, on the input member 1051 side, if a size obtained by subtracting the outside diameter of the eccentric portion 1042b from the inside diameter of the inner ring 1560 is D' and the operating clearance of the radial internal clearance in the ball bearing 1056 is t', the size S is set to S=D'+t'.

In addition, if the operating clearance of the radial internal clearance in the needle roller bearing 1057 is w', the internal clearance $S_2$ is set to $S_2$=

In the thus configured reduction-transmission mechanism 1200, when the input member 1050 moves in the direction of the centrifugal force $P_1$ upon reception of a load due to the centrifugal force $P_1$ that is generated on the basis of the circular motion of the input member 1050, the load due to the centrifugal force $P_1$ from the input member 1050 is dispersed and then received by the plurality of needle roller bearings 1055.

In addition, when the input member 1051 moves in the direction of the centrifugal force $P_2$ upon reception of a load due to the centrifugal force $P_2$ that is generated on the basis of the circular motion of the input member 1051, the load due to the centrifugal force $P_2$ from the input member 1051 is dispersed and then received by the plurality of needle roller bearings 1057.

Therefore, in the present embodiment, as in the case of the fifth embodiment, application of the load due to the centrifugal force $P_1$ from the input member 1050 to the ball bearing 1054 and application of the load due to the centrifugal force $P_2$ from the input member 1051 to the ball bearing 1056 are suppressed. As a result, it is no longer necessary to employ bearings having high durability as the ball bearings 1054, 1056.

According to the above-described seventh embodiment, similar advantageous effects to those of the fifth embodiment are obtained.

In the present embodiment, the description is made on the case where the ball bearing 1054 that is formed of the inner ring 1540 arranged radially outward of the eccentric portion 1042a, the outer ring 1541 arranged radially outward of the inner ring 1540 and the rolling elements 1542 interposed between the outer ring 1541 and the inner ring 1540 is used as the first bearing and the ball bearing 1056 that is formed of the inner ring 1560 arranged radially outward of the eccentric portion 1042b, the outer ring 1561 arranged radially outward of the inner ring 1560 and the rolling elements 1562 interposed between the outer ring 1561 and the inner ring 1560 is used as the first bearing. However, the invention is not limited to this configuration. Ball bearings each of which has an outer ring raceway surface formed on the inner periphery of the input member, which defines the center hole, and each of which is formed of an inner ring arranged radially inward of the outer ring raceway surface and rolling elements interposed between the inner ring and the outer ring raceway surface may be used as the first bearings. In this case, when the inner ring is fitted to the outer periphery of the eccentric portion by clearance fit, the size S is set to S=D+t, D'+t' as in the case of the above-described embodiments. In contrast to this, when the inner ring is fitted to the outer periphery of the eccentric portion by interference fit, the size S is set to S=t, t'.

In addition, in the present embodiment, the description is made on the case where the size S is set to $S'=S_1+S_2$. However, the invention is not limited to this configuration. The size S' may be set to $S'=S_2$.

Figure 27:
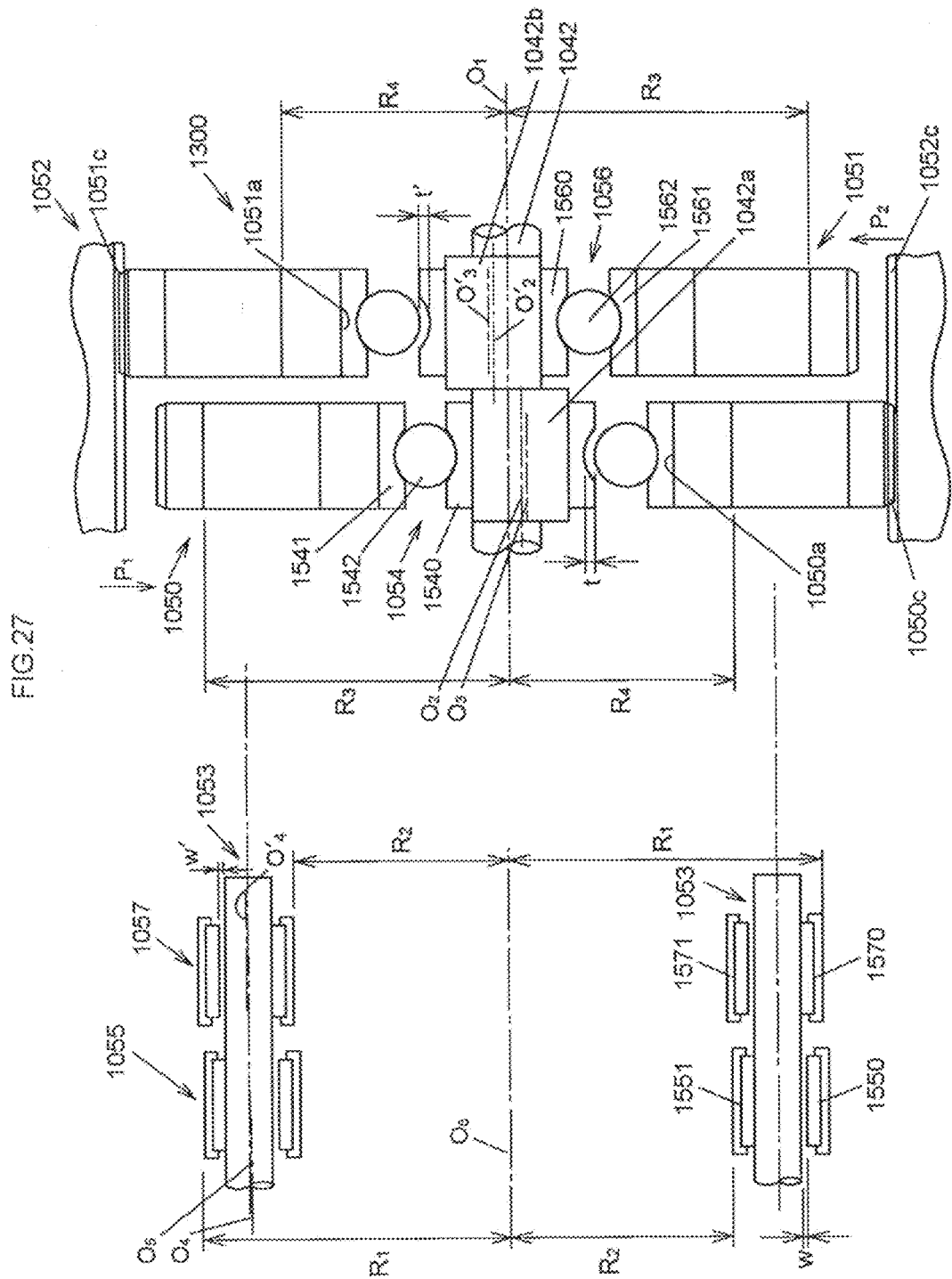
FIG. 27 is a simplified sectional view showing a state where the input members are supported by the respective eccentric portions of the speed reduction mechanism and a state where the second bearings are fitted to the respective output members in a motor torque transmission device according to an eighth embodiment of the invention.
Figure 28:
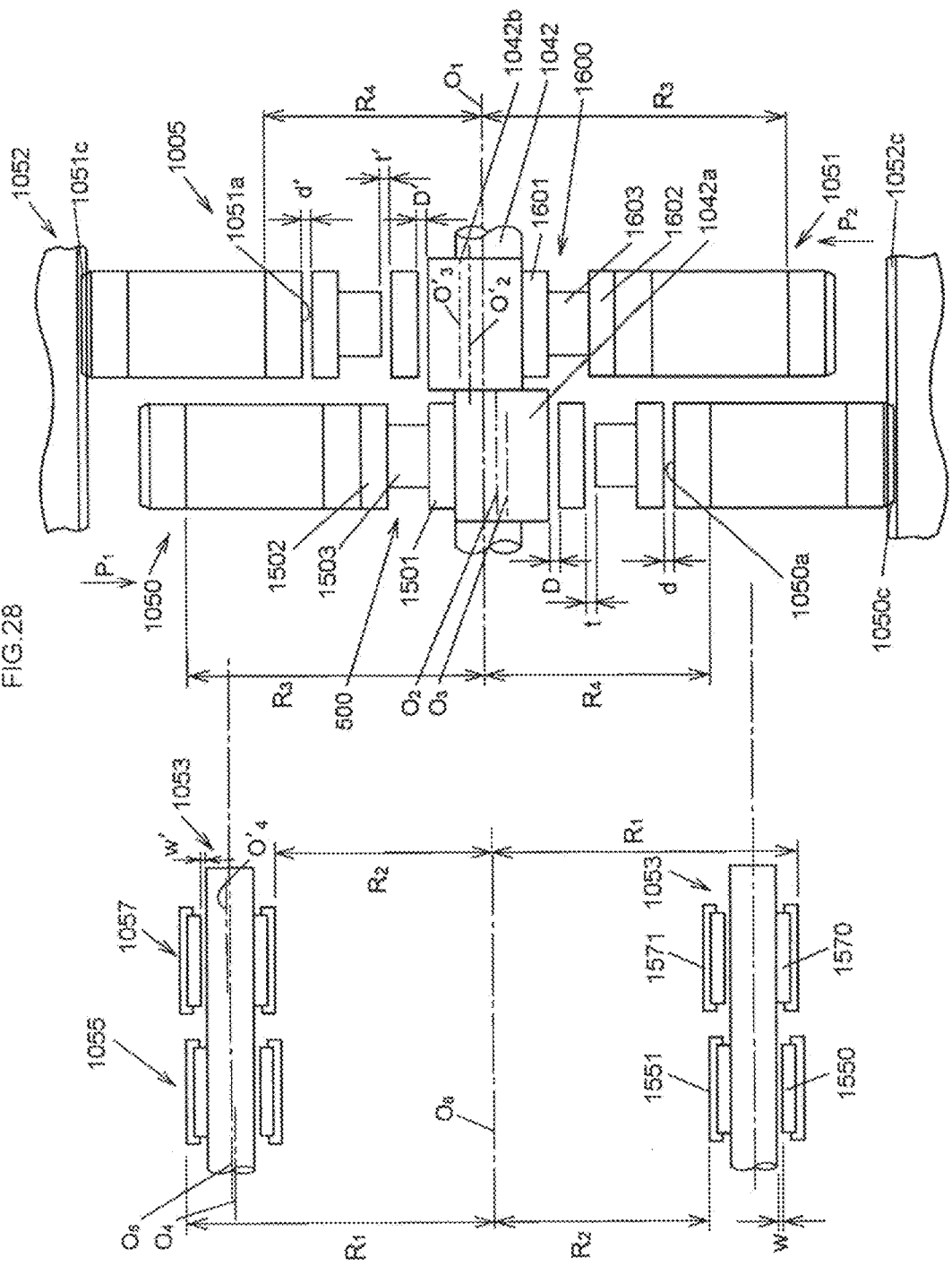
FIG. 28 is a simplified sectional view showing a state where the input members are supported by the respective eccentric portions of the speed reduction mechanism and a state where the second bearings are fitted to the respective output members in a motor torque transmission device in a fifth modified example according to the fifth embodiment of the invention.
Figure 29:
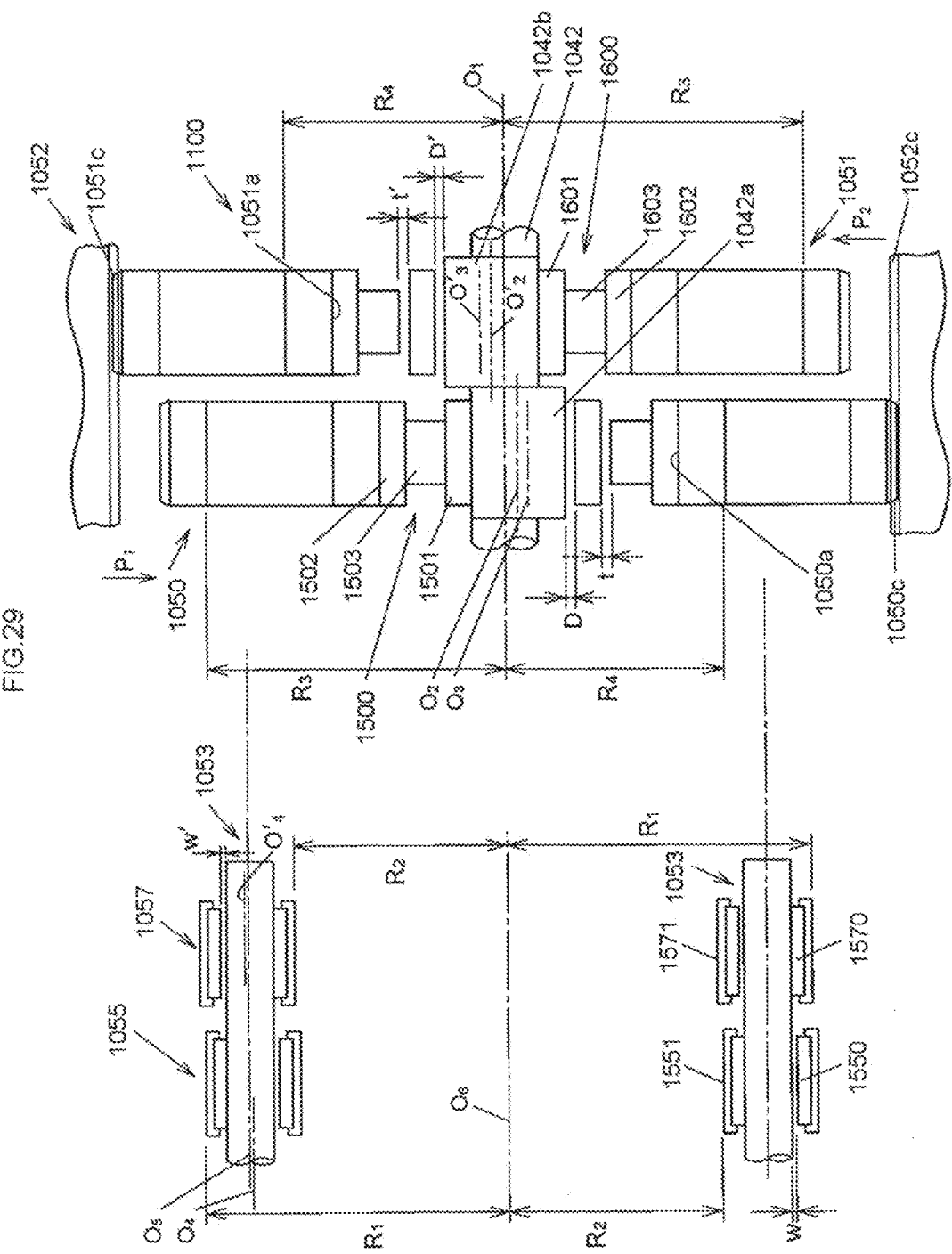
FIG. 29 is a simplified sectional view showing a state where the input members are supported by the respective eccentric portions of the speed reduction mechanism and a state where the second bearings are fitted to the respective output members in a motor torque transmission device in a sixth modified example according to the sixth embodiment of the invention.
Figure 30:
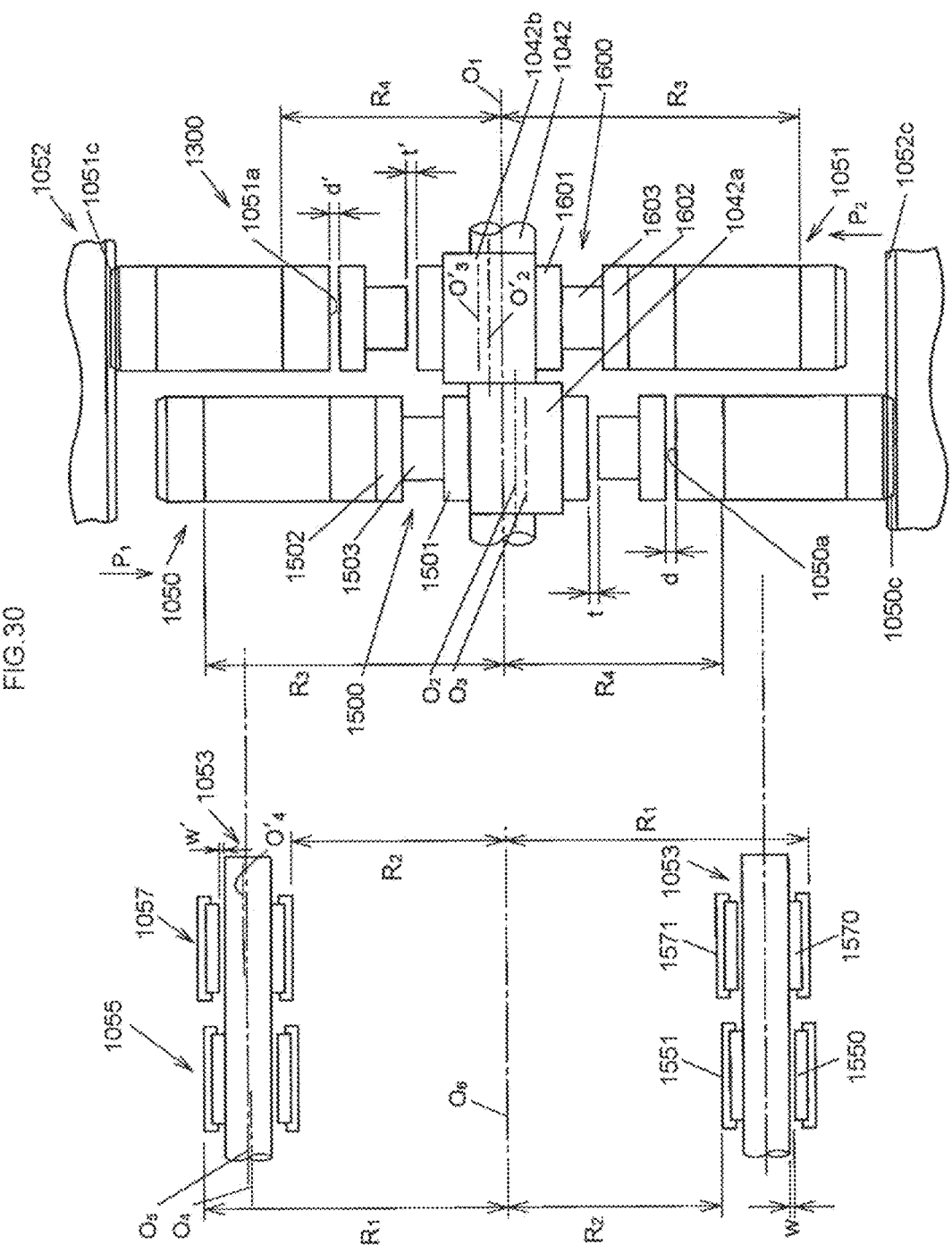
FIG. 30 is a simplified sectional view showing a state where the input members are supported by the respective eccentric portions of the speed reduction mechanism and a state where the second bearings are fitted to the respective output members in a motor torque transmission device in a seventh modified example according to the seventh embodiment of the invention.
Figure 31:
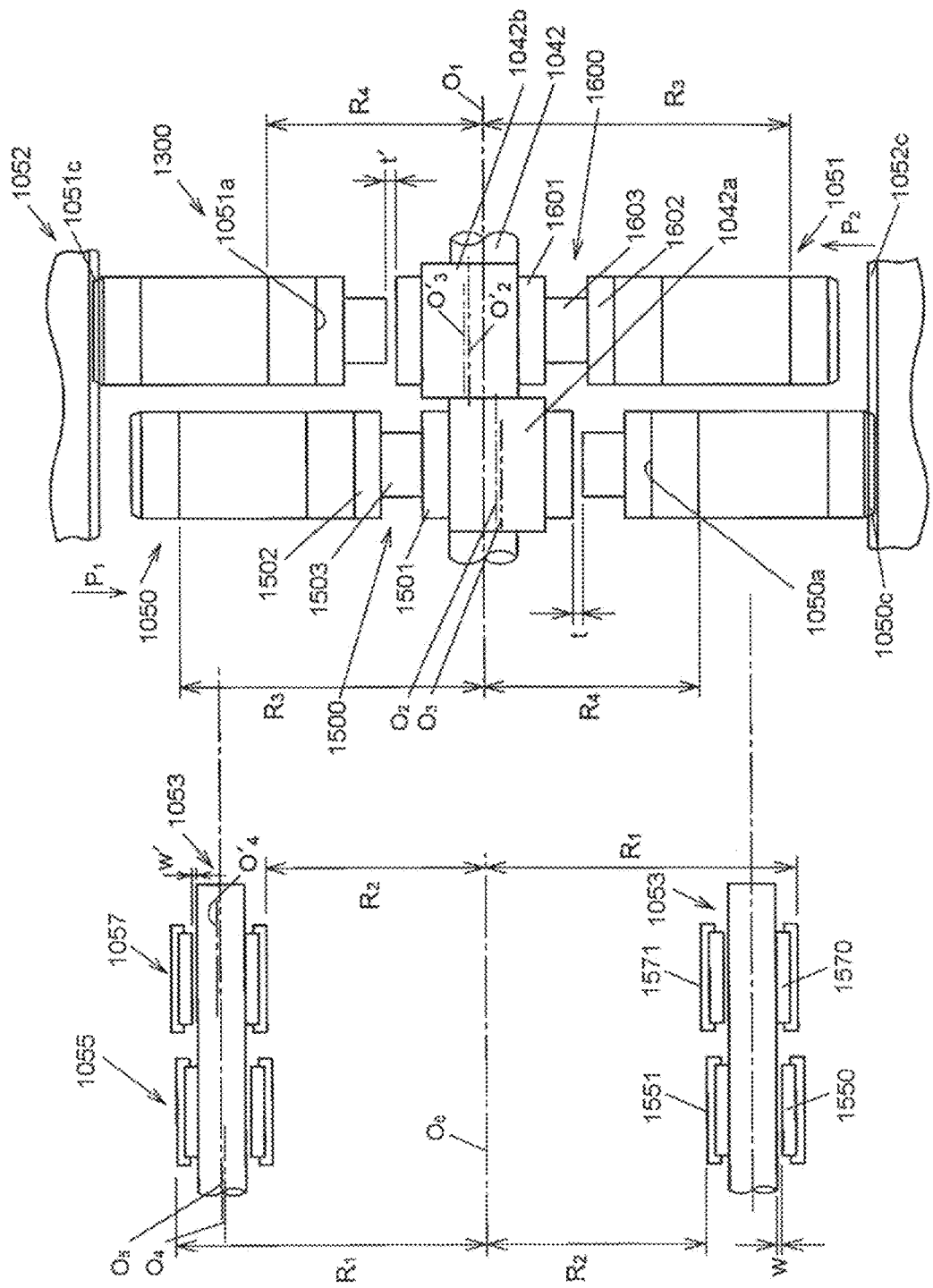
FIG. 31 is a simplified sectional view showing a state where the input members are supported by the respective eccentric portions of the speed reduction mechanism and a state where the second bearings are fitted to the respective output members in a motor torque transmission device in an eight modified example according to the eighth embodiment of the invention.

Next, a speed reduction mechanism in a motor torque transmission device according to an eighth embodiment of the invention will be described with reference to FIG. 27. FIG. 27 shows a state where input members are supported and a state where second bearings are fitted. In FIG. 27, the members having the functions which are the same as or equivalent to those in FIG. 20 are denoted by the same reference numerals are those in FIG. 20, and the detailed description is omitted.

As shown in FIG. 27, a reduction-transmission mechanism 1300 (partially shown) according to the eighth embodiment of the invention is characterized in that the inner rings 1540, 1560 of the ball bearings 1054, 1056 are fitted to the outer peripheries of the eccentric portions 1042a, 1042b by interference fit. In addition, the reduction-transmission mechanism 1300 is characterized in that the outer rings 1541, 1561 are fitted to the inner peripheries of the input members 1050, 1051, which define the center holes 1050a, 1051a, by interference fit.

Therefore, on the input member 1050 side, if the operating clearance of the radial internal clearance in the ball bearing 1054 is t, the size S (shown in FIG. 23A and FIG. 23B) is set to S=t.

In addition, if the operating clearance of the radial internal clearance in the needle roller bearing 1055 is w, the internal clearance $S_2$ (shown in FIG. 22A and FIG. 22B) is set to $S_2$=w.

Similarly, on the input member 1051 side, if the operating clearance of the radial internal clearance in the ball bearing 1056 is t', the size S is set to S=t'.

In addition, if the operating clearance of the radial internal clearance in the needle roller bearing 1057 is w', the internal clearance $S_2$ is set to $S_2$=w'.

In the thus configured reduction-transmission mechanism 1300, when the input member 1050 moves in the direction of the centrifugal force $P_1$ upon reception of a load due to the centrifugal force $P_1$ that is generated on the basis of the circular motion of the input member 1050, the load due to the centrifugal force $P_f$ from the input member 1050 is dispersed and then received by the plurality of needle roller bearings 1055.

In addition, when the input member 1051 moves in the direction of the centrifugal force $P_2$ upon reception of a load due to the centrifugal force $P_2$ that is generated on the basis of the circular motion of the input member 1051, the load due to the centrifugal force $P_2$ from the input member 1051 is dispersed and then received by the plurality of needle roller bearings 1057.

Therefore, in the present embodiment, as in the case of the fifth embodiment, application of the load due to the centrifugal force $P_1$ from the input member 1050 to the ball bearing 1054 and application of the load due to the centrifugal force $P_2$ from the input member 1051 to the ball bearing 1056 are suppressed. As a result, it is no longer necessary to employ bearings having high durability as the ball bearings 1054, 1056

According to the above-described eighth embodiment, similar advantageous effects to those of the fifth embodiment are obtained.

In the present embodiment, the description is made on the case where the ball bearing 1054 that is formed of the inner ring 1540 arranged radially outward of the eccentric portion 1042a, the outer ring 1541 arranged radially outward of the inner ring 1540 and the rolling elements 1542 interposed between the outer ring 1541 and the inner ring 1540 is used as the first bearing and the ball bearing 1056 that is formed of the inner ring 1560 arranged radially outward of the eccentric portion 1042b, the outer ring 1561 arranged radially outward of the inner ring 1560 and the rolling elements 1562 interposed between the outer ring 1561 and the inner ring 1560 is used as the first bearing. However, the invention is not limited to this configuration. Ball bearings each of which has an inner ring raceway surface formed on the outer periphery of the eccentric portion and an outer ring raceway surface formed on the inner periphery of the input member, which defines the center hole, and each of which is formed of rolling elements interposed between the outer ring raceway surface and the inner ring raceway surface may be used as the first bearings.

In addition, in the present embodiment, the description is made on the case where the size S' is set to $S'=S_1+S_2$. However, the invention is not limited to this configuration. The size S' may be set to $S'=S_2$.

As described above, the speed reduction mechanism according to the invention and the motor torque transmission device that includes the speed reduction mechanism are described on the basis of the above-described embodiments. However, the invention is not limited to the above-described embodiments. The invention may be implemented in various other embodiments without departing from the scope of the invention, and, for example, the following modified examples are also possible.

(1) In the above-described embodiments, the eccentric portion 42a (1042a) and the eccentric portion 42b (1042b) are arranged on the outer periphery of the motor shaft 42 (1042) such that the distance from the axis $O_2$ to the rotation axis $O_1$ and the distance from the axis $O'_2$ to the rotation axis O are equal to each other and the distance between the axis $O_2$ and the axis $O'_2$ in one of the circumferential directions around the rotation axis $O_1$ and the distance between the axis $O_2$ and the axis $O'_2$ in the other circumferential direction around the rotation axis O are equal to each other, and the pair of input members 50, 51 (1050, 1051) are arranged on the portions that are formed on the motor shaft 42 (1042) of the electric motor 4 (1004) so as to be apart from each other in the circumferential direction around the axis (rotation axis $O_1$) of the motor shaft 42 (1042) at equal intervals (180°). However, the invention is not limited to this configuration, and the number of the input members may be appropriately changed.

That is, when the number of the input members is n (n≥3), the axis of the first eccentric portion, the axis of the second eccentric portion, . . . , and the axis of the nth eccentric portion are sequentially arranged in one direction around the axis of the motor shaft, on an imaginary plane perpendicular to the axis of the electric motor (motor shaft). Then, the eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion, . . . , and the nth eccentric portion is set to 360°/n. Furthermore, the n input members are arranged on the motor shaft at portions that are apart from each other at intervals of 360°/n around the axis of the motor shaft.

For example, when the number of the input members is three, the axis of the first eccentric portion, the axis of the second eccentric portion and the axis of the third eccentric portion are sequentially arranged in one direction around the axis of the motor shaft, on an imaginary plane perpendicular to the axis of the motor shaft. The eccentric portions are arranged on the outer periphery of the motor shaft such that the distance from the axis of each eccentric portion to the axis of the motor shaft is equal to one another and an angle formed between line segments that connect the axis of the motor shaft to the respective axes of adjacent two eccentric portions among the first eccentric portion, the second eccentric portion and the third eccentric portion is set to 120°. Furthermore, the three input members are arranged on the motor shaft at portions that are apart from each other at intervals of 120° around the axis of the motor shaft.

(2) In the above-described embodiments, the description is made on the case where the needle roller bearings 55, 57 (1055, 1057) that serve as the second bearings are respectively formed of the outer rings 550, 570 (1550, 1570) and the needle rollers 551, 571 (1551, 1571). However, the invention is not limited to this configuration. The needle roller bearings each may be formed of an inner ring arranged radially outward of the output member, an outer ring arranged radially outward of the inner ring and needle rollers interposed between the outer ring and the inner ring. In this case, the size S' is set to one of $S'=S_0+S_1+S_2$, $S'=S_0+S_2$, $S'=S_1+S_2$, and $S'=S_2$.

(3) In the above-described embodiments, the description is made on the case where the invention is applied to the four-wheel drive vehicle 101 (1101) that uses the engine 102 (1102) and the electric motor 4 (1004) as the driving sources. However, the invention is not limited to this configuration. The invention may also be applied to an electric vehicle, which is a four-wheel drive vehicle or a two-wheel drive vehicle, using only an electric motor as a driving source. In addition, the invention may also be applied to a four-wheel drive vehicle having first drive shafts that are driven by an engine and an electric motor and second drive shafts that are driven by an electric motor as in the case of the above-described embodiments.

(4) In the above-described embodiments, the description is made on the case where the ball bearings 54, 56 (1054, 1056) that are deep groove ball bearings are used as first bearings between the inner peripheries of the input members 50, 51 (1050, 1051), which define the center holes 50a, 51a (1050a, 1051a), and the outer peripheries of the eccentric portions 42a, 42b (1042a, 1042b) such that the input members 50, 51 (1050, 1051) are rotatably supported on the eccentric portions 42a, 42b (1042a, 1042b). However, the invention is not limited to this configuration, and ball bearings or roller bearings, other than deep groove ball bearings, may be used as first bearings instead of the deep groove ball bearings. Such a ball bearing or a roller bearing may be, for example, an angular contact ball bearing, a needle roller bearing, a long cylindrical roller bearing, a cylindrical roller bearing, a tapered roller bearing, a spherical roller bearing, or the like. In addition, the first bearing according to the invention may be a plain bearing instead of a rolling bearing.

For example, as shown in FIG. 12 to FIG. 15, and FIG. 28 to FIG. 31, when a needle roller bearing 500 (an inner ring 501, an outer ring 502, and rolling elements 503) (a needle roller bearing 1500 (an inner ring 1501, an outer ring 1502, and rolling elements 1503)) and a needle roller bearing 600 (an inner ring 601, an outer ring 602, rolling elements 603) (a needle roller bearing 1600 (an inner ring 1601, an outer ring 1602, rolling elements 1603)) are used, the input member 50 (1050) is rotatably supported by the eccentric portion 42a (1042a) via the needle roller bearing 500 (1500), and the input member 51 (1051) is rotatably supported by the eccentric portion 42b (1042b) via the needle roller bearing 600 (1600). In this case, FIG. 12, FIG. 13, FIG. 14, FIG. 15, FIG. 28, FIG. 29, FIG. 30 and FIG. 31 respectively correspond to FIG. 5, FIG. 9, FIG. 10, FIG. 11, FIG. 20, FIG. 25, FIG. 26 and FIG. 27, the needle roller bearing 500 (1500) instead of the ball bearing 54 (1054) described in the above-described embodiments is interposed between the inner periphery of the input member 50 (1050), which defines the center hole 50a (1050a), and the outer periphery of the eccentric portion 42a (1042a), and the needle roller bearing 600 (1600) instead of the ball bearing 56 (1056) described in the above-described embodiments is interposed between the inner periphery of the input member 51 (1051), which defines the center hole 51a (1051a), and the outer periphery of the eccentric portion 42b (1042b).

(4) In the above-described embodiments, the description is made on the case where the needle roller bearing 55 (1055) that serves as the second bearing and that is able to contact the inner periphery of the input member 50 (1050), which defines a corresponding one of the pin insertion holes 50b (1050b), is fitted on the outer periphery of each of the output members 53 (1053) at a portion between the threaded portion 53a (1053a) and the head 53b (1053b) and the needle roller bearing 57 (1057) that serves as the second bearing and that is able to contact the inner periphery of the input member 51 (1051), which defines a corresponding one of the pin insertion holes 51b (1051b), is fitted on the outer periphery of each of the output members 53 (1053) at a portion between the threaded portion 53a (1053a) and the head 53b (1053b). However, the invention is not limited to this configuration, and a roller bearing or a ball bearing, other than a needle roller bearing, may be used instead of the needle roller bearing. Such a ball bearing or a roller bearing may be, for example, a deep groove ball bearing, an angular contact ball bearing, a cylindrical roller bearing, a long cylindrical roller bearing, a tapered roller bearing, a spherical roller bearing, or the like. In addition, the second bearing according to the invention may be a plain bearing instead of a rolling bearing.

Figure 32:
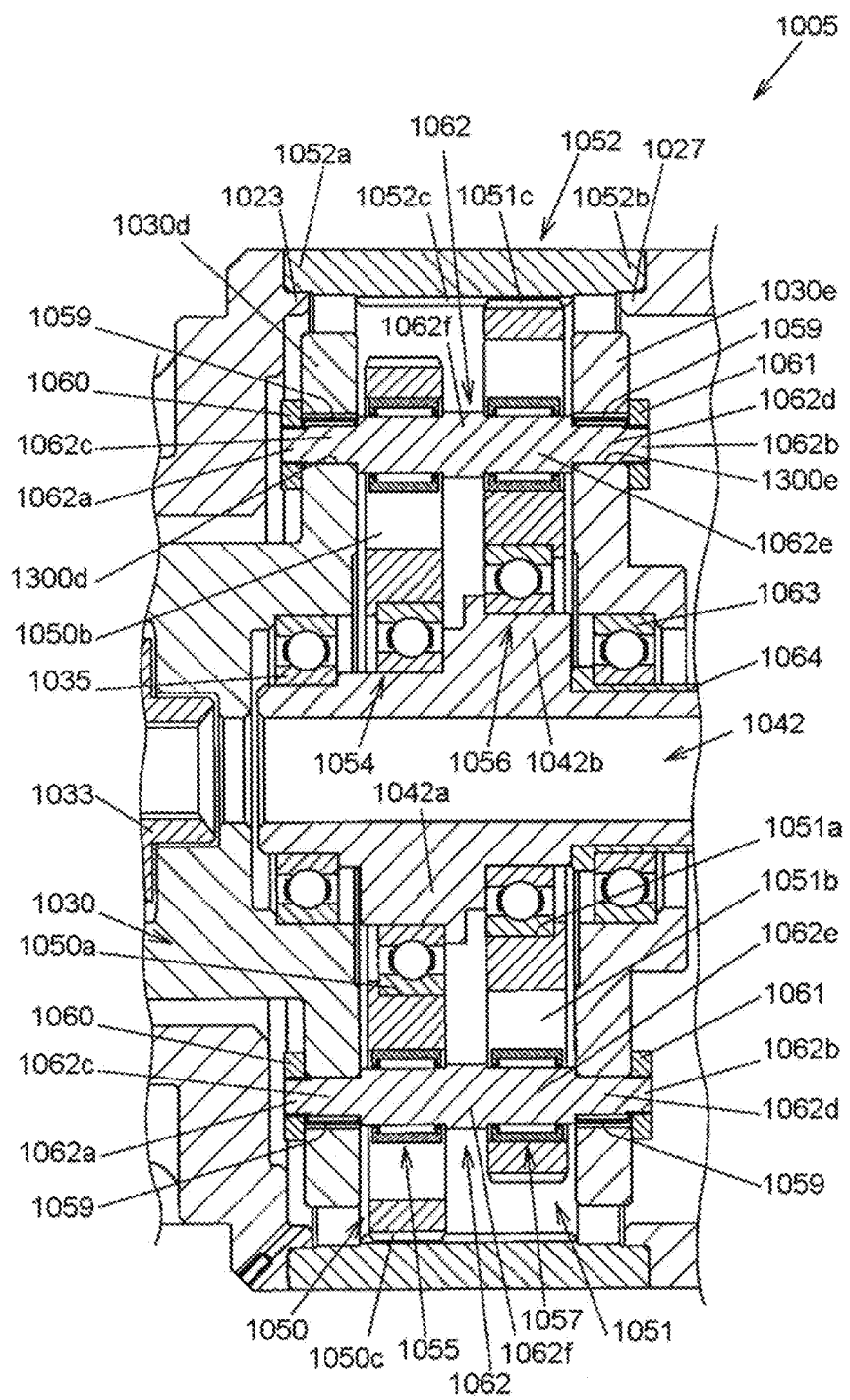
FIG. 32 is a schematic sectional view for illustrating the main portions of the speed reduction mechanism in a motor torque transmission device in a modified example according to the embodiments of the invention.

(5) In the above-described embodiments, the description is made on the case where each of the output members 53 (1053) is a bolt that has the threaded portion 53a (1053a) at one end portion and the head 53b (1053b) at the other end portion. However, the invention is not limited to this configuration. As shown in FIG. 32 (modified example), a plurality of output members 1062 each may be formed of a bolt that has threaded portions 1062a, 1062b, to which nuts 1060, 1061 are screwed, at respective end portions.

In FIG. 32, the output members 1062 each have, in addition to the threaded portions 1062a, 1062b, shaft portions 1062c, 1062d that are respectively passed through a pair of rib portions 1030d, 1030e (hole portions 1300d, 1300e) which serve as components of the differential case 1030 and face to each other via the input members 1050, 1051, an intermediate portion 1062e interposed between the shaft portions 1062c and 1062d and a partitioning portion 1062f that partitions the intermediate portion 1062e into two portions in the axial direction, and the output members 1062 each are formed of a stepped round shaft member. In each output member 1062 (the shaft portions 1062c, 1062d, the intermediate portion 1062e, and the partitioning portion 1062f), the outside diameter of the partitioning portion 1062f is set to the maximum outside diameter, the outside diameter of each of the shaft portions 1062c, 1062d is set to the minimum outside diameter, and the outside diameter of the intermediate portion 1062e is set to a value between the outside diameter of the partitioning portion 1062e and the outside diameter of each of the shaft portions 1062c, 1062d. Then, the elastic members 1059 are interposed between the outer peripheries of the shaft portions 1062c, 1062d and the inner peripheries of the rib portions 1030d, 1030e, which define the hole portions 1300d, 1300e, and the output members 1062 are arranged at such positions that the output members 1062 radially receive elastic force that is generated by the elastic members 1059 from the differential case 1030 side. The rib portion 1030d is rotatably supported on the outer periphery of the motor shaft 1042 via the ball bearing 1035, and the rib portion 1030e is rotatably supported on the outer periphery of the motor shaft 1042 via the ball bearing 1063 and a spacer 1064.

Note that, in the above-described modified example, the description is made on the case where a plurality of the elastic members 1059 is provided. Alternatively, a single elastic member may be provided instead of the elastic members 1059. In this case, the elastic member is formed of a cylindrical member that has a wave-shaped portion serving as an elastic force applying portion in the circumferential direction.

According to the invention, it is possible to reduce cost and extend the service life of each bearing.

What is claimed is:

1. A speed reduction mechanism, comprising:
a rotary shaft that rotates about a first axis and that has an eccentric portion of which a central axis is a second axis that is offset from the first axis;
an input member that is arranged radially outward of the rotary shaft, that has a center hole of which a central axis is a third axis and a plurality of through-holes arranged at equal intervals around the third axis, and that is formed of an external gear provided with a first bearing interposed between an inner periphery of the input member, which defines the center hole, and an outer periphery of the eccentric portion;
a rotation force applying member that is in mesh with the input member and that is formed of an internal gear having teeth the number of which is larger than the number of teeth of the external gear; and
a plurality of output members that receive rotation force applied to the input member by the rotation force applying member, that output the rotation force to an output target as torque of the output target, and that are passed through the respective through-holes with second bearings provided radially outward of the respective output members, wherein
the output members are arranged at such positions that a size S' that is a sum of a fitting clearance formed between an outer periphery of each of the output members and a corresponding one of the second bearings, a fitting clearance formed between the second bearing and an inner periphery of the input member, which defines a corresponding one of the through-holes, and a radial internal clearance in the second bearing is smaller than a size S that is a sum of a fitting clearance formed between the first bearing and the outer periphery of the eccentric portion, a fitting clearance formed between the first bearing and the inner periphery of the input member, which defines the center hole, and a radial internal clearance in the first bearing.

2. The speed reduction mechanism according to claim 1, wherein the output members are arranged with respect to the output target, at such positions that the output members receive elastic force generated by elastic members in a radial direction centering on a rotary shaft of the output target.

3. The speed reduction mechanism according to claim 2, wherein each of the output members is passed through a pair of rib portions that serve as components of the output target, which face each other via the input member, and each of which is arranged at a position at which the elastic members are interposed between the output member and the rib portions.

4. The speed reduction mechanism according to claim 3, wherein:
the first bearing includes an inner ring arranged radially outward of the eccentric portion, an outer ring arranged radially outward of the inner ring, and rolling elements interposed between the outer ring and the inner ring; and
where a size obtained by subtracting an outside diameter of the eccentric portion from an inside diameter of the inner ring is D, a size obtained by subtracting an outside diameter of the outer ring from an inside diameter of the input member, which defines the center hole, is d, and an operating clearance of the radial internal clearance in the first bearing is t, the size S is set to one of S=D+d+t, S=d+t, S=D+t, and S=t.

5. A motor torque transmission device, comprising:
an electric motor that generates motor torque; and
a speed reduction mechanism that reduces a speed of rotation output from the electric motor and that outputs driving force, wherein
the speed reduction mechanism is the speed reduction mechanism according to claim 3.

6. The speed reduction mechanism according to claim 2, wherein:
the first bearing includes an inner ring arranged radially outward of the eccentric portion, an outer ring arranged radially outward of the inner ring, and rolling elements interposed between the outer ring and the inner ring; and
where a size obtained by subtracting an outside diameter of the eccentric portion from an inside diameter of the inner ring is D, a size obtained by subtracting an outside diameter of the outer ring from an inside diameter of the input member, which defines the center hole, is d, and an operating clearance of the radial internal clearance in the first bearing is t, the size S is set to one of S=D+d+t, S=d+t, S=D+t, and S=t.

7. The speed reduction mechanism according to claim 2, wherein:

the first bearing has an inner ring raceway surface formed on the outer periphery of the eccentric portion, and includes an outer ring arranged radially outward of the inner ring raceway surface, and rolling elements interposed between the outer ring and the inner ring raceway surface; and where a size obtained by subtracting an outside diameter of the outer ring from an inside diameter of the input member, which defines the center hole, is d, and an operating clearance of the radial internal clearance in the first bearing is t, the size S is set to S=d+t, or S=t.

8. The speed reduction mechanism according to claim 2, wherein:

the first bearing has an outer ring raceway surface formed on the inner periphery of the input member, which defines the center hole, and includes an inner ring arranged radially inward of the outer ring raceway surface and rolling elements interposed between the inner ring and the outer ring raceway surface; and where a size obtained by subtracting an outside diameter of the eccentric portion from an inside diameter of the inner ring is D and an operating clearance in the radial internal clearance in the first bearing is t, the size S is set to S=D+t, or S=t.

9. The speed reduction mechanism according to claim 2, wherein:

the first bearing has an inner ring raceway surface formed on the outer periphery of the eccentric portion and an outer ring raceway surface formed on the inner periphery of the input member, which defines the center hole, and includes rolling elements interposed between the outer ring raceway surface and the inner ring raceway surface; and where an operating clearance of the radial internal clearance in the first bearing is t, the size S is set to S=t.

10. The speed reduction mechanism according to claim 2, wherein:

each of the second bearings has an inner ring raceway surface formed on the outer periphery of a corresponding one of the output members, and includes an outer ring arranged radially outward of the inner ring raceway surface, and rolling elements interposed between the outer ring and the inner ring raceway surface; and where a fitting clearance formed between an outer periphery of the outer ring and the inner periphery of the input member, which defines a corresponding one of the plurality of through-holes, is $S_1$ and an operating clearance of the radial internal clearance is $S_2$, the size S' is set to S'=$S_1$+$S_2$, or S'=$S_2$.

11. The speed reduction mechanism according to claim 2, wherein:

each of the second bearings includes an inner ring arranged radially outward of a corresponding one of the output members, an outer ring arranged radially outward of the inner ring, and rolling elements interposed between the outer ring and the inner ring, and where a fitting clearance formed between the outer periphery of the output member and an inner periphery of the inner ring is $S_0$, a fitting clearance formed between an outer periphery of the outer ring and the inner periphery of the input member, which defines a corresponding one of the plurality of through-holes, is $S_1$, and an operating clearance of the the radial internal clearance is $S_2$, the size S' is set to one of S'=$S_0$+$S_1$+$S_2$, S'=$S_0$+$S_2$, S'=$S_1$+$S_2$, and S'=$S_2$.

12. A motor torque transmission device, comprising:
an electric motor that generates motor torque; and
a speed reduction mechanism that reduces a speed of rotation output from the electric motor and that outputs driving force, wherein
the speed reduction mechanism is the speed reduction mechanism according to claim 2.

13. The speed reduction mechanism according to claim 1, wherein:

the first bearing includes an inner ring arranged radially outward of the eccentric portion, an outer ring arranged radially outward of the inner ring, and rolling elements interposed between the outer ring and the inner ring; and where a size obtained by subtracting an outside diameter of the eccentric portion from an inside diameter of the inner ring is D, a size obtained by subtracting an outside diameter of the outer ring from an inside diameter of the input member, which defines the center hole, is d, and an operating clearance of the radial internal clearance in the first bearing is t, the size S is set to one of S=D+d+t, S=d+t, S=D+t, and S=t.

14. A motor torque transmission device, comprising:
an electric motor that generates motor torque; and
a speed reduction mechanism that reduces a speed of rotation output from the electric motor and that outputs driving force, wherein
the speed reduction mechanism is the speed reduction mechanism according to claim 13.

15. The speed reduction mechanism according to claim 1, wherein:

the first bearing has an inner ring raceway surface formed on the outer periphery of the eccentric portion, and includes an outer ring arranged radially outward of the inner ring raceway surface, and rolling elements interposed between the outer ring and the inner ring raceway surface; and where a size obtained by subtracting an outside diameter of the outer ring from an inside diameter of the input member, which defines the center hole, is d, and an operating clearance of the radial internal clearance in the first bearing is t, the size S is set to S=d+t, or S=t.

16. The speed reduction mechanism according to claim 1, wherein:

the first bearing has an outer ring raceway surface formed on the inner periphery of the input member, which defines the center hole, and includes an inner ring arranged radially inward of the outer ring raceway surface and rolling elements interposed between the inner ring and the outer ring raceway surface; and where a size obtained by subtracting an outside diameter of the eccentric portion from an inside diameter of the inner ring is D and an operating clearance in the radial internal clearance in the first bearing is t, the size S is set to S=D+t, or S=t.

17. The speed reduction mechanism according to claim 1, wherein:

the first bearing has an inner ring raceway surface formed on the outer periphery of the eccentric portion and an outer ring raceway surface formed on the inner periphery of the input member, which defines the center hole, and includes rolling elements interposed between the outer ring raceway surface and the inner ring raceway surface; and where an operating clearance of the radial internal clearance in the first bearing is t, the size S is set to S=t.

18. The speed reduction mechanism according to claim 1, wherein:

each of the second bearings has an inner ring raceway surface formed on the outer periphery of a corresponding one of the output members, and includes an outer ring arranged radially outward of the inner ring raceway surface, and rolling elements interposed between the outer ring and the inner ring raceway surface; and where a fitting clearance formed between an outer periphery of the outer ring and the inner periphery of the input member, which defines a corresponding one of the plurality of through-holes, is $S_1$ and an operating clearance of the radial internal clearance is $S_2$, the size S' is set to $S'=S_1+S_2$, or $=S_2$.

19. The speed reduction mechanism according to claim 1, wherein:

each of the second bearings includes an inner ring arranged radially outward of a corresponding one of the output members, an outer ring arranged radially outward of the inner ring, and rolling elements interposed between the outer ring and the inner ring, and where a fitting clearance formed between the outer periphery of the output member and an inner periphery of the inner ring is $S_0$, a fitting clearance formed between an outer periphery of the outer ring and the inner periphery of the input member, which defines a corresponding one of the plurality of through-holes, is $S_1$, and an operating clearance of the radial internal clearance is $S_2$, the size S' is set to one of $S'=S_0+S_1+S_2$, $S'=S_0+S_2$, $S'=S_1+S_2$, and $S'=S_2$.

20. A motor torque transmission device, comprising:

an electric motor that generates motor torque; and a speed reduction mechanism that reduces a speed of rotation output from the electric motor and that outputs driving force, wherein the speed reduction mechanism is the speed reduction mechanism according to claim 1.

* * * * *